(12) United States Patent
Ishibashi

(10) Patent No.: US 8,239,681 B2
(45) Date of Patent: Aug. 7, 2012

(54) INFORMATION PROCESSING DEVICE AND METHOD, RECORDING MEDIUM, PROGRAM AND INFORMATION PROCESSING SYSTEM

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 532 days.

(21) Appl. No.: 12/419,730

(22) Filed: Apr. 7, 2009

(65) Prior Publication Data
US 2009/0259850 A1    Oct. 15, 2009

(30) Foreign Application Priority Data

Apr. 14, 2008 (JP) ............................... P2008-105023

(51) Int. Cl.
*H04L 29/06* (2006.01)
(52) U.S. Cl. ............. 713/169; 713/168; 726/10; 726/29
(58) Field of Classification Search .................. 713/169; 726/10, 29
See application file for complete search history.

(56) References Cited

U.S. PATENT DOCUMENTS

| | | | |
|---|---|---|---|
| 6,061,692 A * | 5/2000 | Thomas et al. ............... | 707/613 |
| 6,363,455 B2 | 3/2002 | Kusakabe et al. | |
| 6,747,546 B1 * | 6/2004 | Hikita et al. ............... | 340/10.31 |
| 2002/0116622 A1 * | 8/2002 | Okaue et al. .................. | 713/189 |
| 2003/0140238 A1 * | 7/2003 | Turkboylari .................. | 713/193 |
| 2003/0174839 A1 * | 9/2003 | Yamagata et al. ............ | 380/270 |
| 2004/0034774 A1 * | 2/2004 | Le Saint ........................ | 713/169 |
| 2005/0086501 A1 * | 4/2005 | Woo et al. ..................... | 713/189 |
| 2006/0098821 A1 * | 5/2006 | Tomiyasu ...................... | 380/200 |
| 2007/0262138 A1 * | 11/2007 | Somers et al. ................. | 235/380 |
| 2008/0137862 A1 * | 6/2008 | Morita et al. .................. | 380/270 |

FOREIGN PATENT DOCUMENTS

| | | |
|---|---|---|
| JP | 10-327142 | 12/1998 |
| JP | 2002-278838 | 9/2002 |
| JP | 2005-135251 | 5/2005 |
| JP | 3702923 | 7/2005 |

OTHER PUBLICATIONS

Espacenet Search Results, Espacenet Result List, Jul. 25, 2011.*
T. Kimura, "Application construction guide using FeliCa, Abstract of non-contact chip card technology FeliCa", Computer & Network LAN vol. 23 No. 1, pp. 10-14 (2005).

* cited by examiner

*Primary Examiner* — Jung Kim
*Assistant Examiner* — Shan Elahi
(74) *Attorney, Agent, or Firm* — Finnegan, Henderson, Farabow, Garrett & Dunner, L.L.P.

(57) ABSTRACT

An information processing device regarding which access to data held by the information processing device itself, in multiple regions, is requested from another information processing device, includes: an authenticating unit to perform authenticating processing of the other information processing device; a receiving unit to receive an access license ticket including an access code and a check digit; an access license ticket generating key generating unit to generate an access license ticket generating key, which is key information for computing a check digit using data held beforehand, a root key, an access control key, and other key information which is key information to manage data of a region other than the predetermined region, corresponding to an access code; check digit computing unit to compute a check digit corresponding to the access code described in the access license ticket; and access license ticket validating unit to validate the access license ticket.

8 Claims, 30 Drawing Sheets

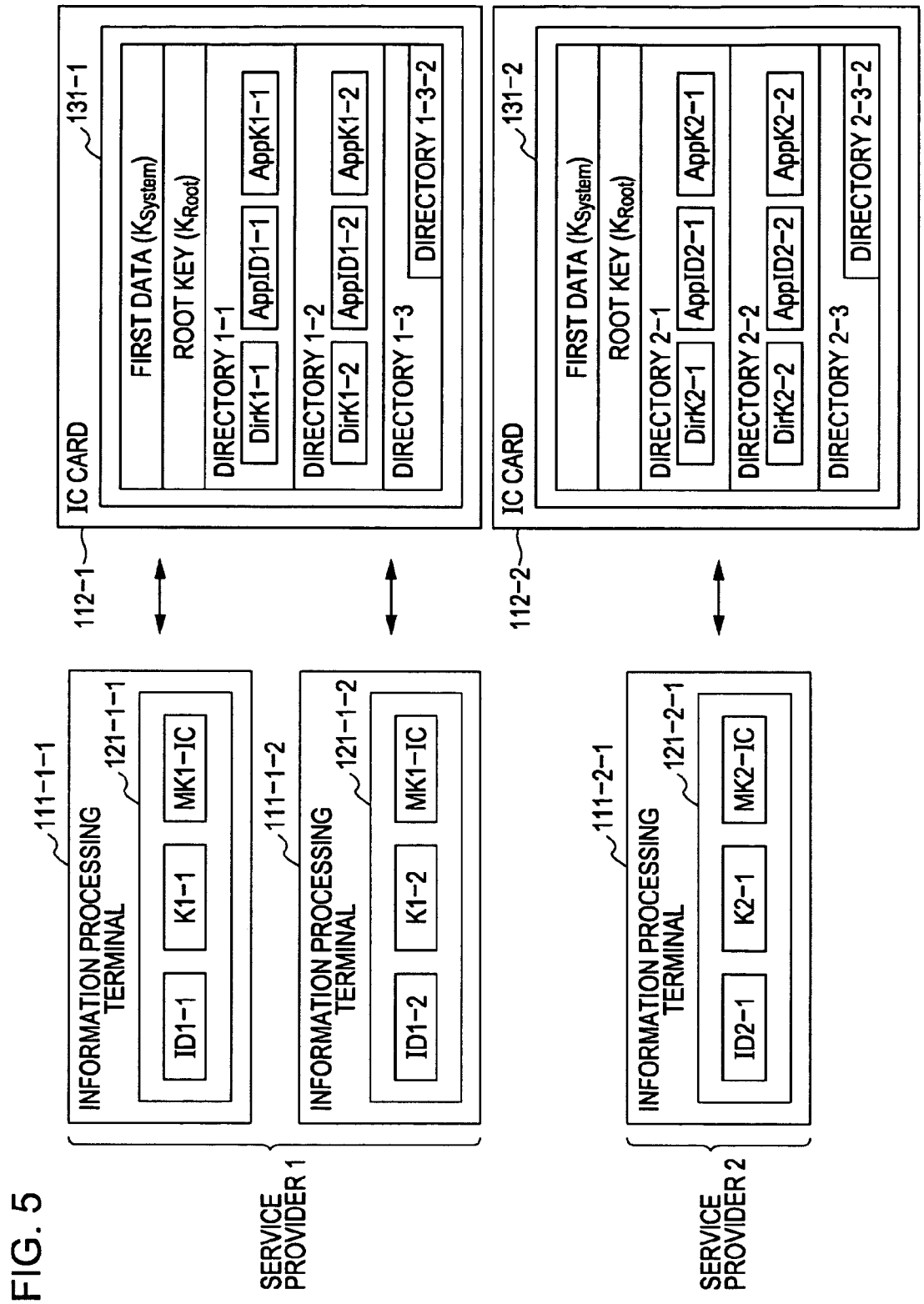

FIG. 6

| LOGICAL ADDRESS | BYTES | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| ----h | \multicolumn{32}{l}{User Block} |
| ----h | | | | | | | | | | | | | | | | | | | | | | | | | | | | | | | | |
| ----h | FFh | 01h | Block Code | | Start Address | | | | Total Block | | FFh | FFh | FFh | FFh | FFh | FFh | \multicolumn{16}{l}{Integrity Check Value(ICV)} |
| ----h | FFh | 00h | Block Code | | Start Address | | | | Total Block | | ICV Format | | FFh | FFh | \multicolumn{18}{l}{N/A} |
| ----h | Access Mode | | Access Code | | Start Address | | End Address | | Directory Code | | Directory Code | | \multicolumn{20}{l}{Access Control Symmetric Key} |
| ----h | Access Mode | | Access Code | | Start Address | | End Address | | Directory Code | | Key Version | | \multicolumn{20}{l}{Application Symmetric Key} |
| ----h | 00h | FFh | \multicolumn{4}{l|}{Application ID} | Start Address | | End Address | | Directory Code | | Key Version | | \multicolumn{18}{l}{Directory Symmetric Key without Sub-Directory} |
| ----h | 00h | 02h | Directory Code | | Start Address | | End Address | | Directory Code | | Key Version | | \multicolumn{18}{l}{Application Symmetric Key} |
| ----h | 00h | FFh | \multicolumn{4}{l|}{Application ID} | Start Address | | End Address | | Directory Code | | Key Version | | \multicolumn{18}{l}{Directory Symmetric Key with Sub-Directory} |
| ----h | 00h | 01h | Directory Code | | Start Address | | End Address | | Total Block | | Key Format | | Key Version | | \multicolumn{18}{l}{Root Directory Symmetric Key} |
| ----h | 00h | 00h | 00h | 00h | 00h | | | | | | | | | | | | | | | | | | | | | | | | | | | |
| ----h | | | | | | | | | | | | | | | | | \multicolumn{16}{l}{System Public Key} |
| FFFCh | FFh | FDh | Key Size | | Param. Size | | Param. Size | | Total Block | | Key Format | | Key Version | | \multicolumn{18}{l}{System Key for Access Control Ticket} |
| FFFDh | FFh | FEh | \multicolumn{4}{l|}{} | \multicolumn{4}{l|}{N/A} | Key Format | | Key Version | | \multicolumn{18}{l}{System Key for Authentication} |
| FFFEh | FFh | FFh | \multicolumn{4}{l|}{System Code} | - | - | - | - | Key Format | | Key Version | | | | | | | | | | | | | | | | | |
| FFFFh | \multicolumn{8}{l|}{Device ID} | | | | | | | | | \multicolumn{16}{l}{Device Parameter} |
| ----h | \multicolumn{32}{l}{Extended Memory (EXTERNAL MEMORY)} |

ROOT KEY ENCODED WITH SYSTEM KEY

Ticket1-1

USER OF THIS TICKET: ID1-1

ACCESS CODE: 1-2

ACCESS CODE: 2-2

ACCESS CODE: 2-3

ACCESS CODE: 3-1

CHECK DIGIT: MAC

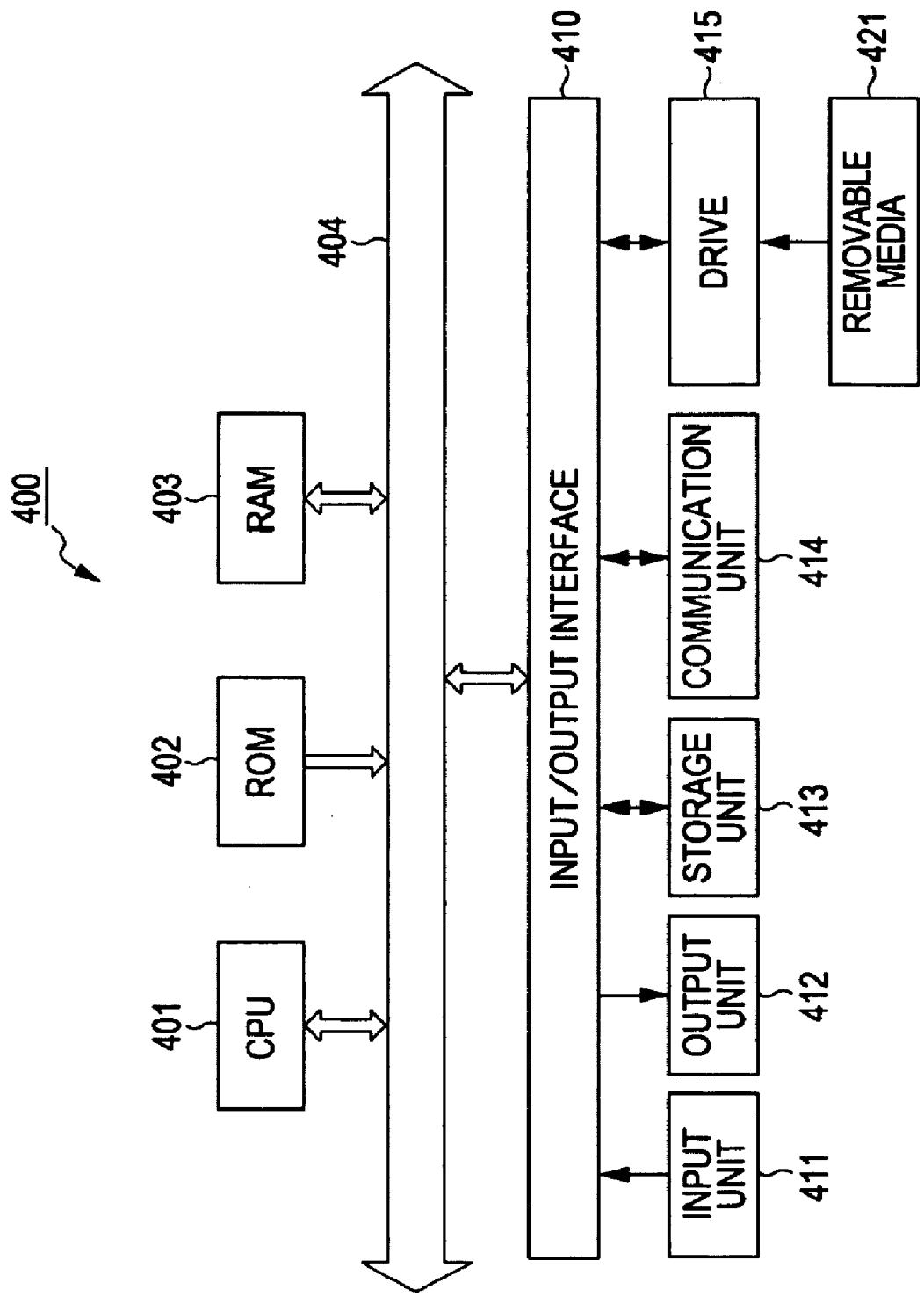

INFORMATION PROCESSING DEVICE AND METHOD, RECORDING MEDIUM, PROGRAM AND INFORMATION PROCESSING SYSTEM

BACKGROUND OF THE INVENTION

1. Field of the Invention

The present invention relates to an information processing device and method, recording medium, program, and information processing system, and in particular relates to an information processing device and method, recording medium, program, and information processing system which can perform mutual authentication and access control safely and surely as to multiple secure management regions.

2. Description of the Related Art

Recently, non-contact IC (Integrated Circuit) cards, of which electronic money is a representative form, have come to be used in many areas. Particularly, store facilities such as a reader/writer and non-contact IC cards held by users are widely held, and have become a basic infrastructure of daily lives (e.g. see Japanese Patent No. 3702923).

Even with such a lifestyle, the capabilities of current non-contact IC cards are often insufficient, and technology improvement is expected. For example, improvements are expected in areas such as processing speed, communication distance, information security, and so forth.

However, with the technology so widely used, a system may not be readily changed in a brief space of time. Thus, for the present time, so a conceivable solution would be, as with the related art, to establish dual systems, and then gradually transition.

SUMMARY OF THE INVENTION

However, it is normal that information security level and method differ between a method of related art and a new method, meaning that simultaneously accessing both regions has been difficult. A particularly difficult area has been to validate a processing only when completed at both.

On the other hand, with related art, processing has been performed wherein, in the event of performing processing such as reducing the amount of remaining electronic money and writing an electronic ticket with which a purchase is made into the IC card, if the electronic ticket cannot be written the electronic money remainder amount becomes invalid.

However, in a case wherein electronic money in a region managed with a new management system is to be transferred to electronic money in a region managed with an old management system, the transfer amount is first withdrawn from the new electronic money, the value thereof is held in a system or the like, and the transfer is made back to the old electronic money again. This is because the respective authentication methods and information management methods are different. However, there remains the problem that, in the case that the IC card is removed from the communicable region before the value is transferred to the old electronic money, the electronic money to be transferred has nowhere to go.

There has been realized demand to enable performing mutual authentication and access control safely and surely as to multiple secure management regions.

According to an embodiment of the present invention, an information processing device which is requested access as to data in multiple regions wherein information managing methods mutually differ from that held by the information processing device itself, from another information processing device, includes: an authenticating unit to perform authenticating processing of the other information processing device by an information managing method of the predetermined regions, with regard to the access destination as to a predetermined region within the multiple regions, out of the access destinations of the other information processing device; a receiving unit to receive an access license ticket including an access code indicating data for the other information processing device to access and a check digit, from the other information processing device that is authenticated by the authenticating unit as a valid partner; an access license ticket generating key generating unit to generate an access license ticket generating key, which is key information for computing a check digit, using predetermined data held beforehand in the predetermined region and a root key that is key information corresponding to a root directory of the predetermined region, an access control key that is key information to control an access method to data within the predetermined region, corresponding to an access code described in the access license ticket received by the receiving unit, and other key information used for authentication processing with the information managing method of the region, which is key information to manage data of a region other than the predetermined region, corresponding to an access code described in the access license ticket received by the receiving unit; a check digit computing unit to compute a check digit corresponding to the access code described in the access license ticket received by the receiving unit, using the access license ticket generating key generated with the access license ticket generating key generating unit; and an access license ticket validating unit to validate the access license ticket received by the receiving unit, using the check digit computed by the check digit computing unit.

The access license ticket generating key generating unit may use an area key that is key information corresponding to the region and a service key to control the access method of data that is the access destination, as the other key information.

The access license ticket generating key generating unit may organize the key information such that, in the case that key bit length is different between the access control key and the service key, the shorter of the key bit length is made to match the longer of the key bit length.

The access license ticket generating key may encrypt the predetermined data with the root key, and may further encrypt the encryption results with other key information, and further encrypts the encryption results thereof, each with an access control key, thereby degenerating the key information and generating the access license ticket generating key.

According to an embodiment of the present invention, an information processing method of an information processing device which is requested access as to data in multiple regions wherein information managing methods mutually differ from that held by the information processing device itself, from another information processing device, includes the steps of: performing authenticating processing of the other information processing device by an information managing method of the predetermined regions, with regard to the access destination as to a predetermined region within the multiple regions, out of the access destinations of the other information processing device; receiving an access license ticket including an access code indicating data for the other information processing device to access and a check digit, from the other information processing device that is authenticated as a valid partner; generating an access license ticket generating key to generate an access license ticket generating key, which is key information for computing a check digit, using predetermined data held beforehand in the predetermined region and a root key that is key information corresponding to a root directory of the predetermined region, an access control key that is key information to control an access method to data within the predetermined region, corresponding to an access code described in the received access license ticket, other key information used for authentication processing with the information managing method of the region, which is and key information to manage data of a region other than the predetermined region, corresponding to an access code described in the received access license ticket; computing a check digit corresponding to the access code described in the access license ticket, using the generated access license ticket generating key; and validating the access license ticket, using the computed check digit.

According to an embodiment of the present invention, a recording medium has a computer-readable program recorded therein, and such program controls an information processing device regarding which access as to data held by the information processing device itself, in multiple regions wherein information managing methods mutually differ, is requested from another information processing device, the program including the steps of: performing authenticating processing of the other information processing device by an information managing method of the predetermined regions, with regard to the access destination as to a predetermined region within the multiple regions, out of the access destinations of the other information processing device; receiving an access license ticket including an access code indicating data for the other information processing device to access and a check digit, from the other information processing device that is authenticated as a valid partner; generating an access license ticket generating key, which is key information for computing a check digit, using predetermined data held beforehand in the predetermined region and a root key that is key information corresponding to a root directory of the predetermined region, an access control key that is key information to control an access method to data within the predetermined region, corresponding to an access code described in the received access license ticket, and other key information used for authentication processing with the information managing method of the region, which is key information to manage data of a region other than the predetermined region, corresponding to an access code described in the received access license ticket; computing a check digit corresponding to the access code described in the access license ticket, using the generated access license ticket generating key; and validating the access license ticket, using the computed check digit.

According to an embodiment of the present invention, a program to cause a computer to execute information processing which is requested access as to data held by the information processing device itself, in multiple regions wherein information managing methods mutually differ, is requested from another information processing device, includes the steps of: performing authenticating processing of the other information processing device by an information managing method of the predetermined regions, with regard to the access destination as to a predetermined region within the multiple regions, out of the access destinations of the other information processing device; receiving an access license ticket including an access code indicating data for the other information processing device to access and a check digit, from the other information processing device that is authenticated as a valid partner; generating an access license ticket generating key, which is key information for computing a check digit, using predetermined data held beforehand in the predetermined region, a root key that is key information corresponding to a root directory of the predetermined region, an access control key that is key information to control an access method to data within the predetermined region, corresponding to an access code described in the received access license ticket, and other key information used for authentication processing with the information managing method of the region, which is key information to manage data of a region other than the predetermined region, corresponding to an access code described in the received access license ticket; computing a check digit corresponding to the access code described in the access license ticket, using the generated access license ticket generating key; and validating the access license ticket, using the computed check digit.

With the above configuration, authenticating processing of another information processing device is performed with an information managing method of the predetermined regions for the access destination as to a predetermined region within the multiple regions, out of the access destinations of the other information processing device; an access license ticket including an access code indicating data for the other information processing device to access and a check digit is received from the other information processing device that is authenticated as a valid partner; an access license ticket generating key, which is key information for computing a check digit, is generated using predetermined data held beforehand in the predetermined region, a root key that is key information corresponding to a root directory of the predetermined region, an access control key that is key information to control an access method to data within the predetermined region, corresponding to an access code described in the received access license ticket, and other key information used for authentication processing with the information managing method of the region, which is key information to manage data of a region other than the predetermined region, corresponding to an access code described in the received access license ticket; a check digit is computed corresponding to the access code described in the access license ticket, using the generated access license ticket generating key; and an access license ticket is validated using the computed check digit.

According to an embodiment of the present invention, in an information processing system, a first information processing device requests access as to data held by a second information processing device, in multiple regions wherein information managing methods mutually differ, the first information processing device including: a first mutual authenticating unit to perform mutual authentication processing with the second information processing device; and a transmitting unit to transmit an access license ticket including an access code indicating the data to access, and a check digit to the second information processing device; and the second information processing device including authenticating unit to perform authenticating processing of the first information processing device by an information managing method of the predetermined regions, with regard to the access destination as to a predetermined region within the multiple regions, out of the access destinations of the first information processing device; a receiving unit to receive an access license ticket, from the first information processing device that is authenticated by the authenticating unit as a valid partner; an access license ticket generating key generating unit to generate an access license ticket generating key, which is key information for computing a check digit, using predetermined data held beforehand in a predetermined region, a root key that is key information corresponding to and a root directory of the predetermined region, an access control key that is key information to control an access method to data within the predetermined region, corresponding to an access code described in the access license ticket received by the receiving unit, and other key information, used for authentication processing with the information managing method of a region, which is key information to manage data of a region other than the predetermined region, corresponding to an access code described in the access license ticket received by the receiving unit; a check digit computing unit to compute a check digit corresponding to the access code described in the access license ticket received by the receiving unit, using the access license ticket generating key generated with the access license ticket generating key generating unit; and an access license ticket validating unit to validate the access license ticket received by the receiving unit, using the check digit computed by the check digit computing unit.

According to the above configuration, with the first information processing device, mutual authentication processing is performed with the second information processing device, an access license ticket including an access code indicating data to be accessed and a check digit is transmitted to the second information processing device, and at the second information processing device, authentication processing of the first information processing device is performed with an information management method for a predetermined region, with regard to, of access destinations of the first information processing device, an access destination with regard to a predetermined region in multiple regions, an access license ticket is received from the first information processing device that is authenticated as a valid partner; an access license ticket generating key is generated, which is key information for computing a check digit, using predetermined data held beforehand in the predetermined region, a root key that is key information corresponding to and a root directory of the predetermined region, an access control key that is key information to control an access method to data within the predetermined region, corresponding to an access code described in the access license ticket, and other key information, used for authentication processing with the information managing method of the region, which is key information to manage data of a region other than the predetermined region, corresponding to an access code described in the access license ticket; a check digit is computed corresponding to the access code described in the access license ticket, using the generated access license ticket generating key; and an access license ticket is validated using the computed check digit.

According to an embodiment the present invention, authentication processing and access control can be performed. In particular, mutual authentication and access control can be provided safely and quickly as to multiple secure managed regions.

BRIEF DESCRIPTION OF THE DRAWINGS

FIG. 5 is a diagram to illustrate an example of information held by each device;

FIG. 6 is a schematic diagram to describe a configuration example of a storage region of a storage unit of an IC card;

FIG. 8 is a diagram illustrating a configuration example of a data string;

FIG. 22 is a schematic diagram illustrating a description example of an access license ticket;

FIG. 34 is a block diagram illustrating a configuration example of a personal computer to which the present invention has been applied.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

Figure 28:
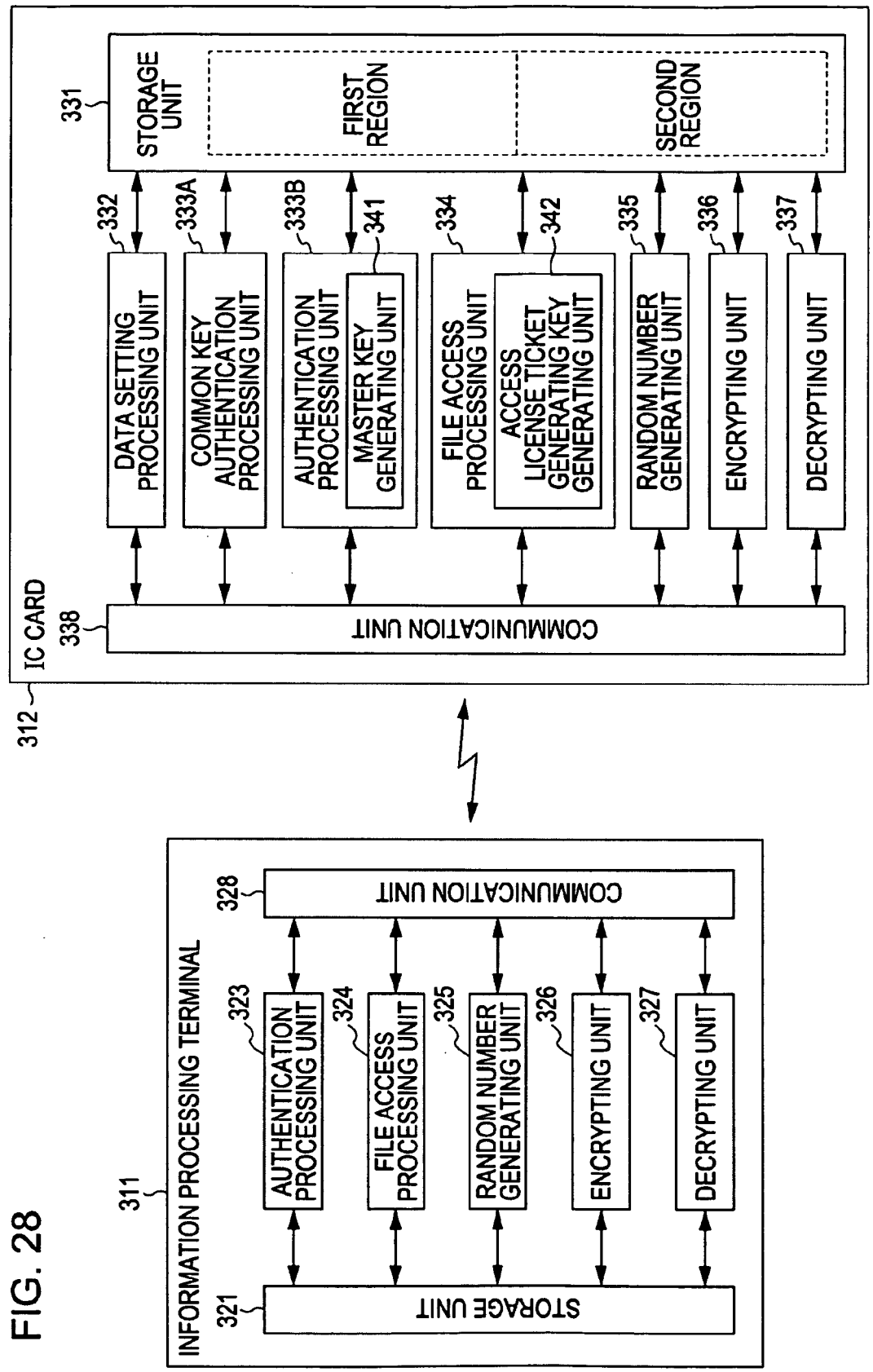
FIG. 28 is a block diagram illustrating a configuration example of a communication system to which the present invention is applied.
Figure 31:
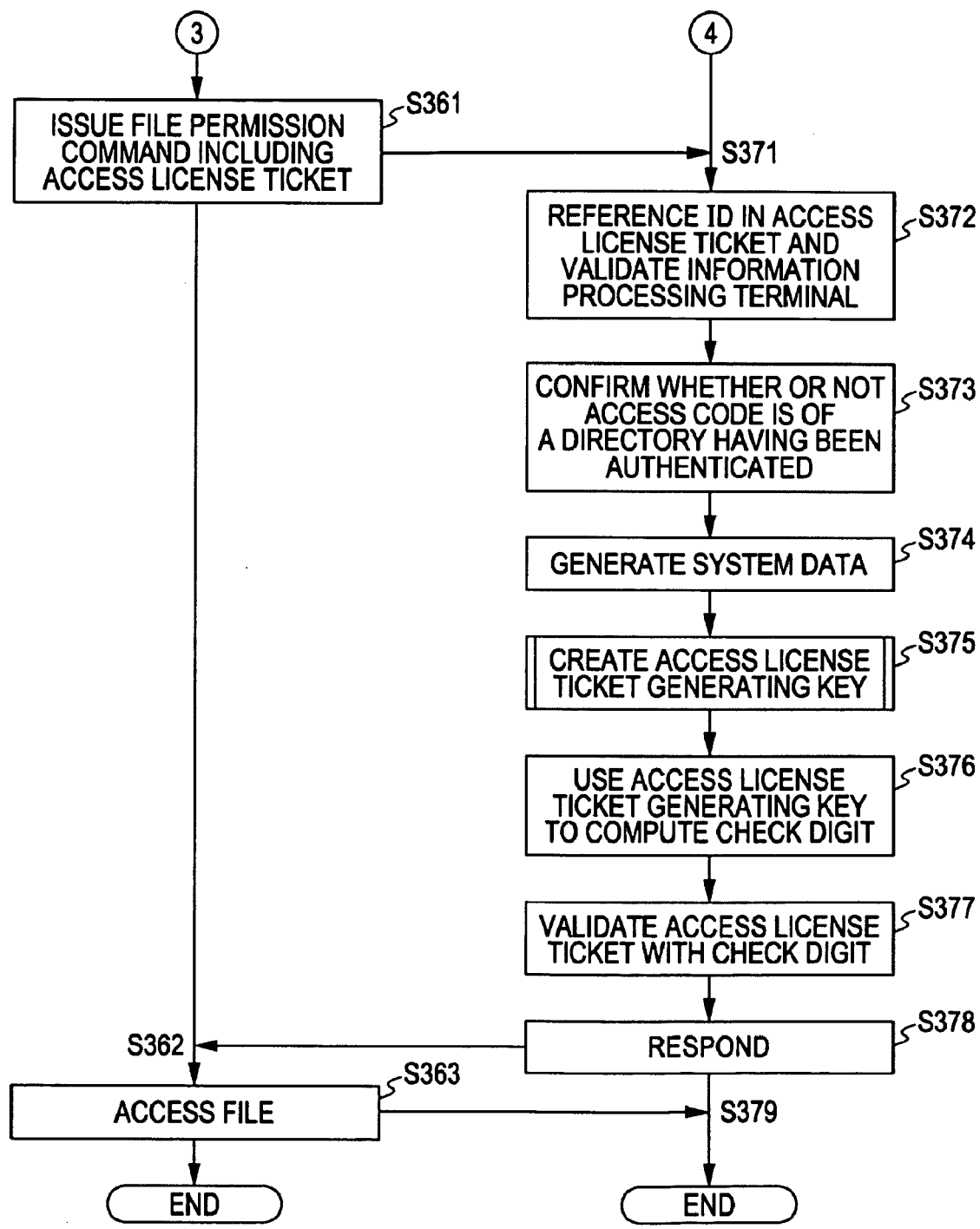
FIG. 31 is a flowchart continuing from FIG. 30 to describe a configuration example of flow of mutual authentication processing and access control processing.

According to an embodiment of the present invention, an information processing device (e.g., an IC card 312 in FIG. 28) regarding which is requested access as to data held by the information processing device itself, in multiple regions wherein information managing methods mutually differ from that, from another information processing device (e.g., an information processing terminal 311 in FIG. 28), includes: an authenticating unit (e.g., an authentication processing unit 323 in FIG. 28) to perform authenticating processing of the other information processing device by an information managing method of the predetermined regions, with regard to the access destination as to a predetermined region within the multiple regions, out of the access destinations of the other information processing device; a receiving unit (e.g., a communication unit 338 in FIG. 28 which performs the processing of step S371 in FIG. 31) to receive an access license ticket including an access code indicating data for the other information processing device to access and a check digit, from the other information processing device that is authenticated by the authenticating unit as a valid partner; an access license ticket generating key generating unit (e.g., an access license ticket generating key generating unit 342 in FIG. 28 which performs the processing of step S375 in FIG. 31) to generate an access license ticket generating key, which is key information for computing a check digit, using predetermined data held beforehand in the predetermined region, a root key that is key information corresponding to and a root directory of the predetermined region, an access control key that is key information to control an access method to data within the predetermined region, corresponding to an access code described in the access license ticket received by the receiving unit, and other key information, used for authentication processing with the information managing method of the region, which is key information to manage data of a region other than the predetermined region, corresponding to an access code described in the access license ticket received by the receiving unit; a check digit computing unit (e.g., a file access processing unit 334 in FIG. 28 which performs the processing of step S376 in FIG. 31) to compute a check digit corresponding to the access code described in the access license ticket received by the receiving unit, using the access license ticket generating key generated with the access license ticket generating key generating unit; and an access license ticket validating unit (e.g., a file access processing unit 334 in FIG. 28 which performs the processing of step S377 in FIG. 31) to validate the access license ticket received by the receiving unit, using the check digit computed by the check digit computing unit.

The access license ticket generating key generating unit may use an area key (e.g., AK1 in FIG. 27) that is key information corresponding to the region and a service key (e.g., SK1-1 in FIG. 27) to control the access method of data that is the access destination, as the other key information.

According to an embodiment of the present invention, an information processing method, recoding medium, or program, of the information processing device (e.g., an IC card 312 in FIG. 28) regarding which is requested access as to data held by the information processing device itself in multiple regions wherein information managing methods mutually differ, is requested from another information processing device (e.g., the information processing terminal 311 in FIG. 28), includes the steps of: performing authenticating processing (e.g., authentication processing in FIGS. 29 and 30) of the other information processing device by an information managing method of the predetermined regions, with regard to the access destination as to a predetermined region within the multiple regions, out of the access destinations of the other information processing device; receiving (e.g., step S371 in FIG. 31) an access license ticket including an access code indicating data for the other information processing device to access and a check digit, from the other information processing device that is authenticated as a valid partner; generating (e.g., step S375 in FIG. 31) an access license ticket generating key, which is key information for computing a check digit, using predetermined data held beforehand in the predetermined region, a root key that is key information corresponding to a root directory of the predetermined region, an access control key that is key information to control an access method to data within the predetermined region, corresponding to an access code described in the received access license ticket, and other key information used for authentication processing with the information managing method of the region, which is key information to manage data of a region other than the predetermined region, corresponding to an access code described in the received access license ticket; computing (e.g., step S376 in FIG. 31) a check digit corresponding to the access code described in the access license ticket, using the generated access license ticket generating key; and validating (e.g., step S377 in FIG. 31) the access license ticket, using the computed check digit.

Embodiments of the present invention will be described below. A method will be described below wherein mutual authentication and access control can be performed safely and surely as to multiple secure management regions having different management methods, and in the event that data re-writing in both regions, the consistency of data can be readily assured between both regions, but first, methods for each of mutual authentication and file access control will be described.

Figure 1:
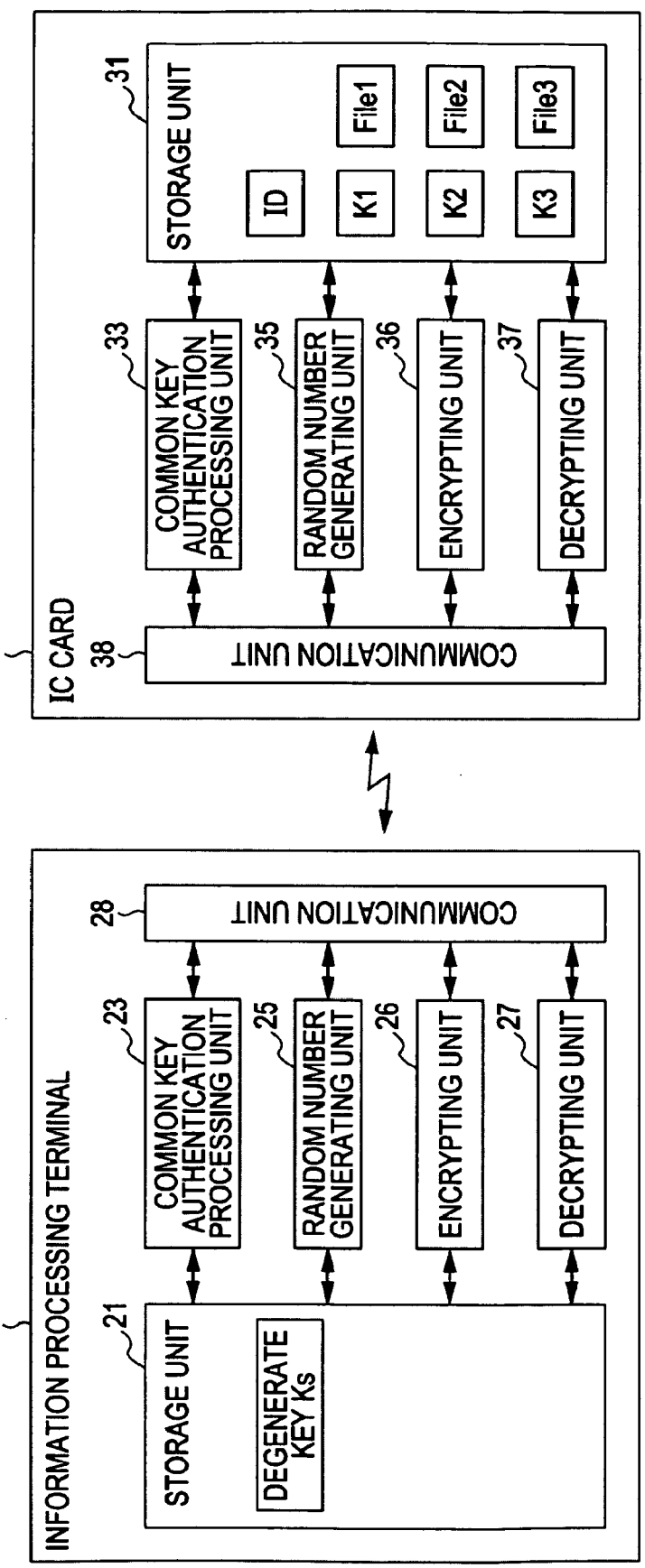
FIG. 1 is a block diagram illustrating a primary configuration example of a communication system to perform authentication with a first method.

FIG. 1 is a block diagram illustrating a primary configuration example of a communication system to perform mutual authentication and file access control with a first method. The communication system 1 shown in FIG. 1 is made up of two devices of an information processing terminal 11 having a communication function and an IC (Integrated Circuit) card 12, and is a system wherein the information processing terminal 11 and IC card 12 perform mutual communication and exchange information. The information processing terminal 11 is an information processing device having a reading/writing function of the IC card 12 such as a train station turn stile or a vending machine, supplies and stores information in the IC card 12, and reads the information stored in the IC card 12. The IC card 12 is a card-shaped device wherein an IC chip, loop antenna, or the like is embedded that has a non-volatile memory or communication circuit built therein, for example, and is a so-called non-contact type IC card which performs near-distance wireless communication with the information processing terminal 11 where the communicable range is roughly 10 cm, and exchanges information therewith.

As shown in FIG. 1, the information processing terminal 11 has a function block made up of a storage unit 21, common key authentication processing unit 23, random number generating unit 25, encrypting unit 26, decrypting unit 27, and communication unit 28. The storage unit 21 is made up of a non-volatile memory device such as a flash memory or hard disk, for example, and stores various types of information such as an ID or key information for encrypting. The common key authentication processing unit 23 is made up of a computing processing device such as a CPU (Central Processing Unit), for example, and performs a common key method of authentication to authenticate mutually using a common key, in the event of starting communication between the information processing terminal 11 and IC card 12. The random number generating unit 25 is made up of a computing processing device such as a CPU for example, and generates random numbers used for the common key method authentication processing or the like. The encrypting unit 26 is made up of a computing processing device such as a CPU for example, and encrypts the information supplied to the IC card 12 via the communication unit 28 as appropriate. The decrypting unit 27 is made up of a computing processing device such as a CPU for example, and decrypts the encrypted information supplied to the IC card 12 via the communication unit 28 as appropriate. The communication unit 28 is made up of an IC chip or loop antenna including a communication circuit or the like, performs near-distance wireless communication with the IC card 12 positioned within communicable range, and exchanges information therewith. It goes without saying that the information processing terminal 11 may have a functional block other than these.

Note that in FIG. 1, illustrations of arrows are omitted, but the common key authentication processing unit 23 performs information exchange also with the random number generating unit 25, encrypting unit 26, and decrypting unit 27, as appropriate.

The IC card 12 has a function block made up of a storage unit 31, common key authentication processing unit 33, random number generating unit 35, encrypting unit 36, decrypting unit 37, and communication unit 38. The storage unit 31 is made up of a non-volatile memory device such as a flash memory or hard disk, for example, and stores various types of information such as information supplied by an external device such as the information processing terminal 11 or the like. The common key authentication processing unit 33 is made up of a computing processing device such as a CPU for example, and performs common-key method authentication processing to mutually authenticate using a common key in the event of starting communication between the information processing terminal 11 and IC card 12. The random number generating unit 35 is made up of a computing processing device such as a CPU for example, and generates a random number used for the common-key method authentication processing or the like. The encrypting unit 36 is made up of a computing processing device such as a CPU for example, and encrypts the information supplied to the information processing terminal 11 via the communication 38 as appropriate. The decrypting unit 37 is made up of a computing processing device such as a CPU for example, and decrypts the encrypted information supplied to the information processing terminal 11 via the communication 38 as appropriate. The communication unit 38 is made up of an IC chip or loop antenna or the like including a communicating circuit or the like, performs near-distance wireless communication with the information processing terminal 11 positioned within communicable range, and exchanges information therewith. It goes without saying that the IC card 12 may have a functional block other than these.

Note that in FIG. 1, illustrations of arrows are omitted, but the common key authentication processing unit 33 performs information exchange also with the random number generating unit 35, encrypting unit 36, and decrypting unit 37, as appropriate.

An entity relating to the above-described communication system 1 will be described. Hereafter, an entity to provide (or sell and manage) the IC card 12 to a user will be called a system administrator, and an entity to obtain a license from the system administrator thereof, generate a directory in a storage region of the storage unit 31 of the IC card 12 and provide service will be called a service provider. It goes without saying that the system administrator can also be a service provider.

In order for the information processing terminal 11 to access a file (or directory) provided in the storage unit 31 of the IC card 12, the information processing terminal itself has to be authenticated using predetermined key information. Also, the key information used for each file (or directory) at the access destination differs. The storage unit 21 of the information processing terminal 11 has a degenerate key Ks which is key information for authentication.

An ID unique to the IC card 12, three files (File 1, File 2, and File 3), and key information (K1, K2, and K3) for authentication corresponding to each file are stored in the storage unit 31 of the IC card 12.

Figure 2:
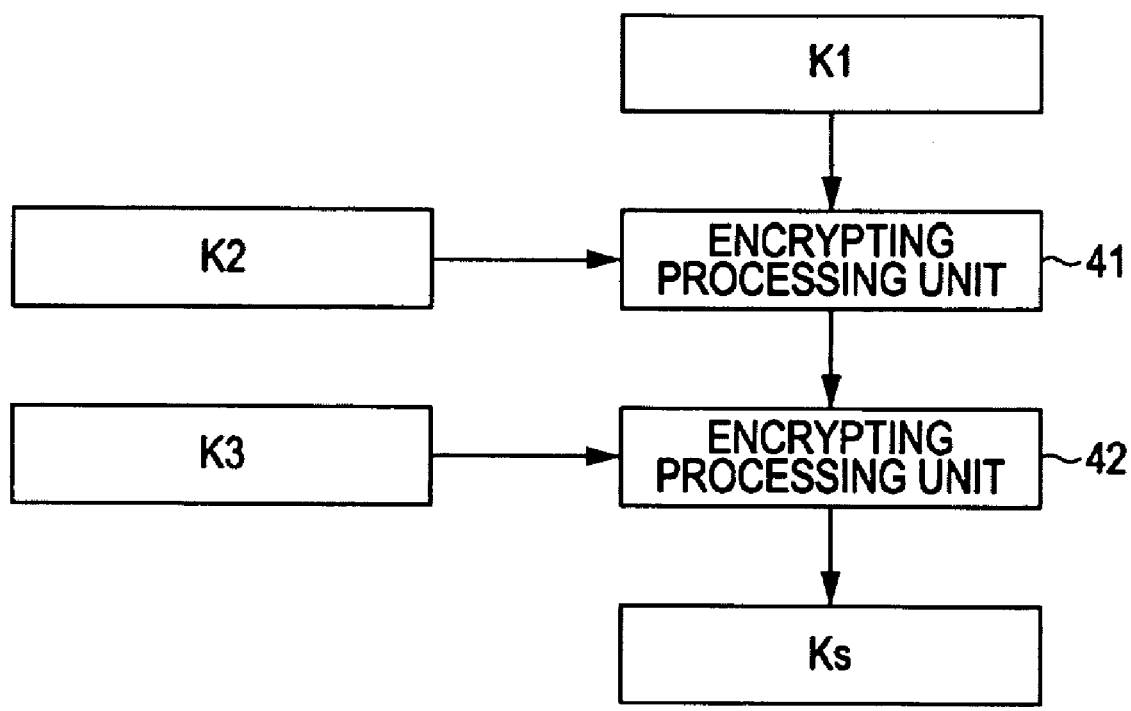
FIG. 2 is a schematic view describing a generating method of a degenerate key.

The degenerate key Ks is a result of degenerating the keys K1, K2, and K3, and is used for authentication processing to access all of the File 1, File 2, and File 3. Degenerating refers to integrating multiple key information into one with some method or another. For example, as shown in FIG. 2, the encrypting processing unit 41 may encrypt K1 using K2 with a predetermined encrypting method such as AES (Advanced Encryption Standard) or DES (Data Encryption Standard) or the like, and the encrypting processing unit 42 further encrypts the encrypting results thereof using K3, thereby generating the degenerate key Ks.

That is to say, the information for all of the K1, K2, and K3 are included in the degenerate key Ks, whereby the information processing terminal 11 can perform authentication processing using the degenerate key Ks, thereby performing authentication as to all of the three files (File 1, File 2, and File 3) with processing one time.

Figure 3:
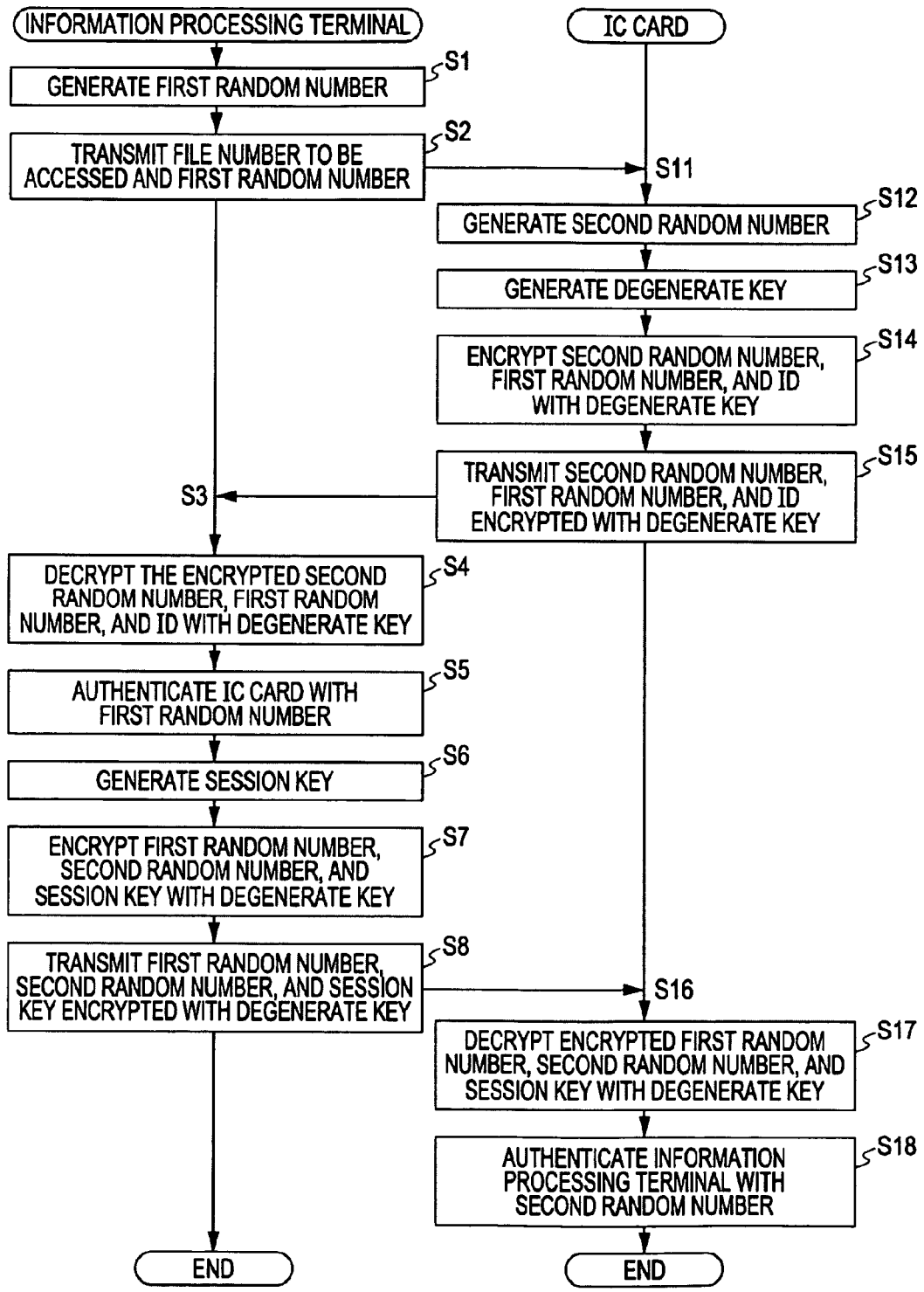
FIG. 3 is a flowchart describing an example of flow of common key authentication processing.

An example of specific flow of the authentication processing herein will be described with reference to the flowchart in FIG. 3.

In step S1, the common key authentication processing unit 23 of the information processing terminal 11 controls the random number generating unit 25 to generate a first random number. In step S2, the common key authentication processing unit 23 controls the communication unit 28 to transmit a file number specifying the file at the access destination and the first random number to the IC card 12. In step S11, the communication unit 38 of the IC card 12 receives the file number and first random number thereof.

In step S12, the common key authentication processing unit 33 of the IC card 12 controls the random number generating unit 35 to generate a second random number, and in step S13 obtains, from the storage unit 31, key information (K1, K2, and K3) of the files (File 1, File 2, and File 3) specified as the access destination with the file number, uses the key information thereof to degenerate K1, K2, and K3 as shown in FIG. 2, and generates the degenerate key Ks.

In step S14, the common key authentication processing unit 33 obtains the ID of the IC card 12 stored in the storage unit 31, controls the encrypting unit 36 to encrypt the second random number, first random number, and the ID of the IC card 12 thereof with the degenerate key Ks.

In step S15, the common key authentication processing unit 33 controls the communication unit 38, to transmit the second random number, first random number, and the ID encrypted with the degenerate key Ks to the information processing terminal 11. In step S3, the communication unit 28 of the information processing terminal 11 obtains the second random number, first random number, and ID encrypted with the degenerate key thereof.

In step S4, the common key authentication processing unit 23 of the information processing terminal 11 controls the decrypting unit 27 to decrypt the encrypted second random number, first random number, and ID with the degenerate day Ks read from the storage unit 21. In step S5, the common key authentication processing unit 23 compares the first random number obtained by decrypting with the first random number generated in step S1, thereby authenticating the IC card 12. In the case that the first random number obtained by decrypting does not match the first random number generated in step S1, the common key authentication processing unit 23 determines that the IC card 12 transmitting the encrypted second random number, first random number, and ID is an invalid IC card 12, thereby force-quitting the authentication processing. In the event that the first random number obtained by decoding matches the first random number generated in step S1, the common key authentication processing unit 23 authenticates the IC card 12 as being valid, and the flow is advanced to the processing in step S6.

The common key authentication processing unit 23 controls the random number generating unit 25 in step S6, to generate a session key, controls the encrypting unit 26 in step S7 to encrypt the first random number, second random number, and session key with the degenerate key Ks, and controls the communication unit 28 in step S8 to transmit the first random number, second random number, and session key encrypted with the degenerate key Ks to the IC card 12. In step S16, the communication unit 38 of the IC card 12 obtains the first random number, second random number, and session key encrypted with the degenerate key Ks.

The common key authentication processing unit 33 of the IC card 12 controls the decrypting unit 37 in step S17 to decrypt the encoded first random number, second random number, and session key with the degenerate key Ks generated in step S13.

In step S18, the common key authentication processing unit 33 compares the second random number obtained by decrypting with the second random number generated in step S12, thereby authenticating the information processing terminal 11. In the case that the second random number obtained by decrypting does not match the second random number generated in step S12, the common key authentication processing unit 33 determines that the information processing terminal 11 transmitting the encrypted first random number, second random number, and session key is an invalid information processing terminal 11, thereby force-quitting the authentication processing. In the case that the second random number obtained by decrypting matches the second random number generated in step S12, the common key authentication processing unit 33 determines that the information processing terminal 11 is valid, and normally ends the authentication processing.

Upon the authentication processing normally ending, the information processing terminal 11 and IC card 12 encrypt the information to be transmitted with the session key, then transmit the information.

Upon successful mutual authentication, for example the information processing terminal 11 issues as write-in command as to the IC card 12. For example, let us say that processing is performed wherein a predetermined amount of money is decreased from File 1, a ticket is written in File 2 at the same time thereof, and history is retained in File 3. In the case of individually performing authentication processing and access processing of a file as to File 1 through File 3, if an error occurs during such processing, the data may not be able to be consistent between files.

Also, in the case that the authentication processing as to File 1 through File 3 are individually performed while the access processing to each of the files is performed at once, not only is the number of sessions key worth the amount of authentication processing generated, but a problem remains of which of the session keys is to be used when transmitting and receiving commands and data. Further, generally IC card resources are insufficient, and handling multiple session keys has become very difficult.

Conversely, in the case of using a degenerate key as described above to perform authentication processing, only when the access processing as to the three files is completed does the above-described writing processing result become valid, whereby data consistency can be secured. That is to say, simultaneous writing can be assured, and data consistency between files can be secured.

Also, by performing such authentication, the authentication processing used for the information processing terminal 11 to simultaneously access the three files of the IC card 12 can be performed at one time. Note that upon all of the keys of the IC card 12 being detected, the information securing system collapses, and the communication system 1 may not maintain communication safety. However, in the case that only the degenerate key of the information processing terminal 11 being detected, only access to the file corresponding to such degenerate key is exposed to risk, and access as to the other files is safe.

Figure 4:
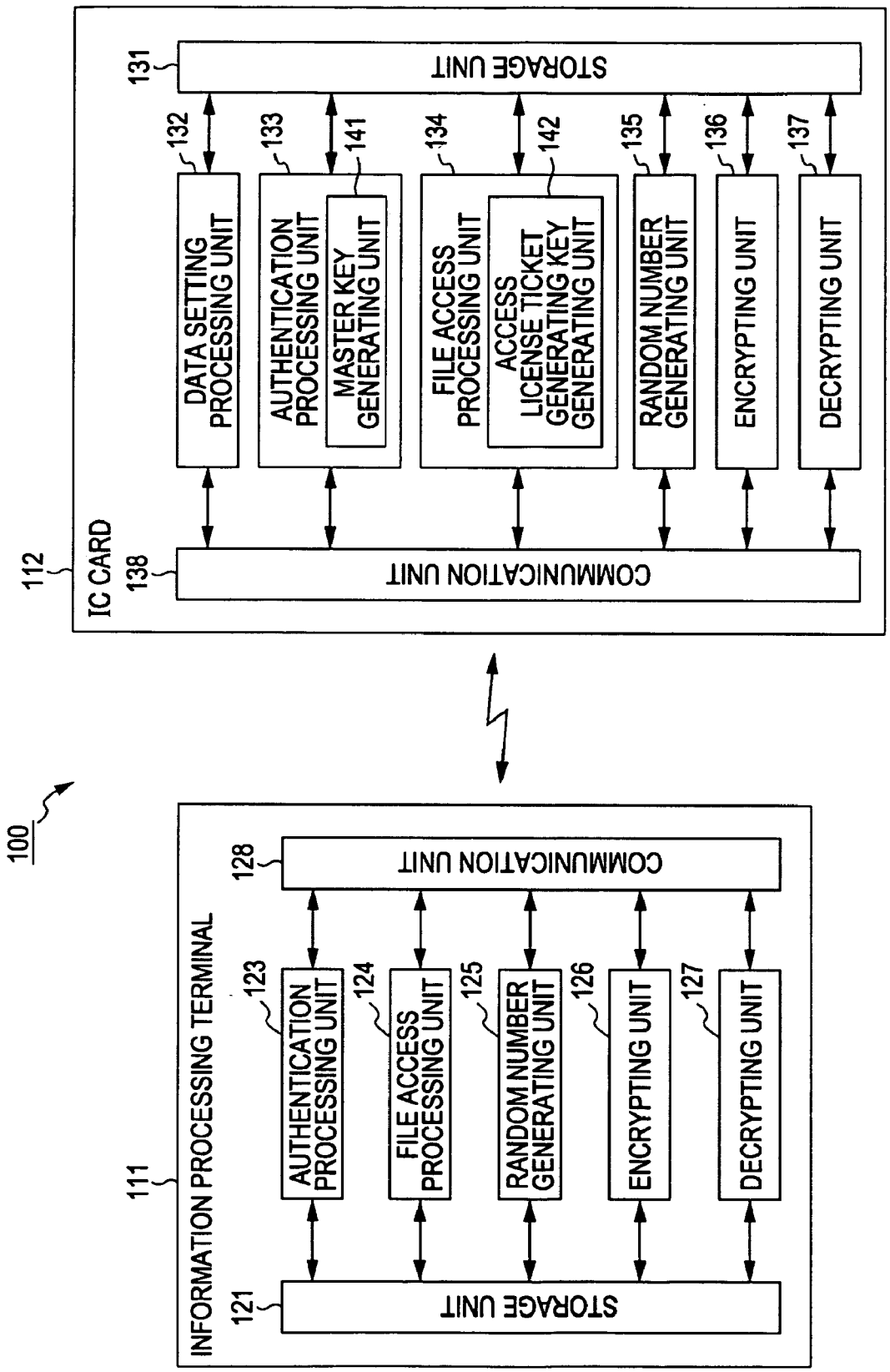
FIG. 4 is a block diagram illustrating a primary configuration example of a communication system to perform authentication and access control with a second method.

The above description is a first method of mutual authentication and file access control. Next, a second method will be described. FIG. 4 is a block diagram illustrating a primary configuration example of the communication system to perform mutual authentication and file access control with the second method.

The communication system 100 shown in FIG. 4 is made up of two devices of an information processing terminal 111 having a communication function and an IC card 112, and is a system wherein the information processing terminal 111 and IC card 112 perform mutual communication and exchange information. Similar to the information processing terminal 11 in FIG. 1, the information processing terminal 111 is an information processing device having a reading/writing function of the IC card 112, and supplies and stores information in the IC card 112 and reads the information stored in the IC card 112. Similar to the IC card 12 in FIG. 1, the IC card 112 is a card-shaped device wherein an IC chip, loop antenna, or the like is embedded that has a non-volatile memory or communication circuit built therein, for example, and is a so-called non-contact type IC card which performs near-distance wireless communication with the information processing terminal 111 where the communicable range is roughly 10 cm, and exchanges information therewith.

As shown in FIG. 4, the information processing terminal 111 has a function block made up of a storage unit 121, authentication processing unit 123, file access processing unit 124, random number generating unit 125, encrypting unit 126, decrypting unit 127, and communication unit 128. The storage unit 121 is made up of a non-volatile memory device such as a flash memory or hard disk, for example, and stores various types of information such as an ID or key information for encrypting. The authentication processing unit 123 is made up of a computing processing device such as a CPU, for example, and performs authentication processing to authenticate mutually in the event of starting communication between the information processing terminal 111 and IC card 112. The file access processing unit 124 is made up of a computing processing device such as a CPU for example, and performs processing to obtain an access license to a file, as to the IC card 112 with which mutual authentication has been performed. The random number generating unit 125 is made up of a computing processing device such as a CPU for example, and generates random numbers used for the authentication processing or the like. The encrypting unit 126 is made up of a computing processing device such as a CPU for example, and encrypts the information supplied to the IC card 112 via the communication unit 128 as appropriate. The decrypting unit 127 is made up of a computing processing device such as a CPU for example, and decrypts the encrypted information supplied to the IC card 112 via the communication unit 128 as appropriate. The communication unit 128 is made up of an IC chip or loop antenna including a communication circuit or the like, or the like, performs near-distance wireless communication with the IC card 112 positioned within a communicable range, and exchanges information therewith. It goes without saying that the information processing terminal 111 may have a functional block other than these.

Note that in FIG. 4, illustrations of arrows are omitted, but the authentication processing unit 123 and file access processing unit 124 perform information exchange also with the random number generating unit 125, encrypting unit 126, and decrypting unit 127, as appropriate.

The IC card 112 has a function block made up of a storage unit 131, data setting processing unit 132, authentication processing unit 133, file access processing unit 134, random number generating unit 135, encrypting unit 136, decrypting unit 137, and communication unit 138. The storage unit 131 is made up of a non-volatile memory device such as a flash memory or hard disk, for example, and stores various types of information such as information supplied by an external device such as the information processing terminal 111 or the like.

The data setting processing unit 132 is made up of a computing processing device such as a CPU or the like, and performs data setting processing to create directories and files in a storage region of the storage unit 131 and write setting information such as key information and IDs based on commands and information and the like supplied from devices external to the IC card 112. The authentication processing unit 133 is made up of a computing processing device such as a CPU or the like, and performs authentication processing to mutually authenticate the information processing terminal 111 and IC card 112 in the event of starting communication therebetween. The authentication processing unit 133 has a master key generating unit 141 which generates a master key for the information processing terminal 111, to generate a key unique to the information processing terminal 111. The file access processing unit 134 is made up of a computing processing device such as a CPU for example, and performs processing relating to control access to a file written in the storage unit 131 of the information processing terminal 111.

The file access processing unit 134 has an access license ticket generating key generating unit 142 to generate an access license ticket generating key which is key information that can create information similar to the access license ticket, in order to perform validation of the access license ticket supplied by the information processing terminal 111. The random number generating unit 135 is made up of a computing processing device such as a CPU for example, and generates random numbers used for the authentication processing or the like. The encrypting unit 136 is made up of a computing processing device such as a CPU for example, and encrypts the information supplied from the information processing terminal 111 via the communication unit 138 as appropriate. The decrypting unit 137 is made up of a computing processing device such as a CPU for example, and decrypts the encrypted information to be supplied to the information processing terminal 111 via the communication unit 138 as appropriate. The communication unit 138 is made up of an IC chip, loop antenna including a communication circuit or the like, or the like, performs near-distance wireless communication with the information processing terminal 111 positioned within a communicable range, and exchanges information therewith. It goes without saying that the IC card 112 may have a functional block other than these.

Note that in FIG. 4, illustrations of arrows are omitted, but the data setting processing unit 132, authentication processing unit 133, and file access processing unit 134 each perform information exchange also with the random number generating unit 135, encrypting unit 136, and decrypting unit 137, as appropriate.

The entities relating to the above-described communication system 100 are similar to the case of the communication system 1 in FIG. 1, and an entity to provide (or sell and manage) the IC card 112 to a user will be called a system administrator, and an entity to obtain a license from the system administrator thereof, generate a directory in a storage region of the storage unit 131 of the IC card 112 and provide service will be called a service provider. It goes without saying that the system administrator can also be a service provider.

The system administrator writes a first data and a root key which is key information to manage a root directory in the IC card 112, and provides the IC card 112 to the user. Accordingly, the same first data and root key is written in all of the storage regions 131 of IC cards 112 under governance of the same system administrator. In other words, IC cards of mutually different system administrators have mutually different first data and root keys stored therein.

Next, the mutual authentication performed between the information processing terminal 111 and IC card 112 will be described. FIG. 5 is a diagram showing an example of information relating to the mutual authentication processing stored in the storage unit 121 of the information processing terminal 111 and the storage unit 131 of the IC card 112.

With the example shown in FIG. 5, the communication system 100 is made up of three information processing terminals 111 and two IC cards 112. One (one company, one group, etc) system administrator (includes a business, group, etc) exists that provides the communication system 100 (i.e. a unique system administrator exists), two (two companies or two groups) service providers (includes a business, group, etc) that provides the service using the communication system 100 exists (i.e. two units of service providers exits), and two users (two companies or two groups) receiving the service using the communication system 100 exists (i.e. two units of users exist). A service provider 1 has an information processing terminal 111-1-1 and information processing terminal 111-1-2, and a service provider 2 has an information processing terminal 111-2-1. An IC card 112-1 is held by one user not shown in the diagram, and an IC card 112-2 is held by another user not shown in the diagram. Note that in the case that the information processing terminal 111-1-1, information processing terminal 111-1-2, and information processing terminal 111-2-1, do not have to be distinguished one from another for description, these will simply be called information processing terminal 111. Similarly, in the case that the IC card 112-1 and IC card 112-2 do not have to be distinguished one from another, these will simply be called IC card 112.

A system administrator writes the first data ($K_{System}$) and root key ($K_{Root}$) in the storage unit 131-1 of the IC card 112-1, at the time of shipping, for example. Similarly, the system administrator writes the first data ($K_{System}$) and root key ($K_{Root}$) in the storage unit 131-2 of the IC card 112-2, at the time of shipping, for example.

The service provider 1 obtains a license from the system administrator and creates a directory for each service provided (directory 1-1, directory 1-2, directory 1-3, and directory 1-3-2) in the storage unit 131-1 of the IC card 112-1. Note that with the present example, we will say that the directory 1-3 is not accessed. Also, the directory 1-3-2 is a sub-directory under the directory 1-3 (i.e. this is not directly under the root).

Similarly, the service provider 2 obtains a license from the system administrator and creates a directory for each service provided (directory 2-1, directory 2-2, directory 2-3, and directory 2-3-2) in the storage unit 131-2 of the IC card 112-2. Note that with the present example, we will say that the directory 2-3 is not accessed. Also, the directory 2-3-2 is a sub-directory under the directory 2-3 (i.e. this is not directly under the root).

In the event of creating a directory, the service provider writes into the directory a directory key (DirK) which is key information for each service managing the directory of such service, an application ID (AppID) for identifying the directory of the IC card 112, and an application key (AppK) which is key information that manages the directory of the IC card 112.

For example, upon creating the directory 1-1, the service provider 1 writes the directory key (DirK1-1), application ID (AppID1-1), and application key (AppK1-1) into the directory 1-1. Similarly, upon creating the directory 1-2, the service provider 1 writes the directory key (DirK1-2), application ID (AppID1-2), and application key (AppK1-2) into the directory 1-2.

Similarly, upon creating the directory 2-1, the service provider 2 writes the directory key (DirK2-1), application ID (AppID2-1), and application key (AppK2-1) into the directory 2-1. Similarly, upon creating the directory 2-2, the service provider 2 writes the directory key (DirK2-2), application ID (AppID2-2), and application key (AppK2-2) into the directory 2-2.

In the case of the directory key DirK, even if the IC card 112 at the writing destination is different (i.e. a card held by a different user) (e.g. in the case of the IC card 112-1 and the case of the IC card 112-2), if the provided services have the same directory, the same key is written in for both IC cards 112. Conversely, in the case of the application ID (AppID) or application key (AppK), even if the services have the same directory, if the IC cards are different the values are different.

Also, for example, we will say that the application key AppK1-1 of the directory 1-1 can be generated from a master key MK1-IC and application ID (AppID1-1) held in the storage unit 121-1-1 of the information processing terminal 111-1-1. That is to say, although not shown in the diagram, different application IDs (AppID) (this becomes the user ID) and application keys (AppK) are written into the directory that the service provider 1 generates in the other IC card 112 (i.e. a card held by a different user). However, the directory key (DirK) is common therebetween. Similarly, the service provider 2 writes a directory key (DirK), application ID (AppID), and application key (AppK) into each directory.

The storage unit 121-1-1 of the information processing terminal 111-1-1 has written therein identifying information (ID1-1) unique to the information processing terminal 111-1-1, a key (K1-1) unique to the information processing terminal 111-1-1, and a master key (MK1-IC) for generating the application key (AppK) stored in the storage unit 131-1 of the IC card 112-1. This key is different for each service provider, so within the same service provider, the key is the same. Note that an arrangement may be made wherein the master key is changed for each directory. With the present example, the key is unique for each service provider. In this case, a master key has to be held for each directory to be accessed.

Similarly, the storage unit 121-1-2 of the information processing terminal 111-1-2 has written therein identifying information (ID1-2) unique to the information processing terminal 111-1-2, a key (K1-2) unique to the information processing terminal 111-2-1, and a master key (MK1-IC) for generating the application key (AppK) stored in the storage unit 131-1 of the IC card 112-1. Similarly, the storage unit 121-2-1 of the information processing terminal 111-2-1 has written therein identifying information (ID2-1) unique to the information processing terminal 111-2-1, a key (K2-1) unique to the information processing terminal 111-2-1, and a master key (MK2-IC) for generating an application key (AppK) stored in the storage unit 131-2 of the IC card 112-2.

Next, a specific configuration example of the data stored in the storage unit 131 of the IC card 112 will be described. FIG. 6 is a diagram describing a configuration example of information (address map) written in the storage region of the storage unit 131. In FIG. 6, first regarding the number of bytes in one block, 32 bytes is assumed where the key length is 16 bytes or longer. It goes without saying that a key length may be 8 bytes and one block may be 16 bytes, or one block may be 64 bytes. System data such as key data is written in the storage unit 131 from an upper level address in the memory. Conversely, user data is written from a lower level address. As a result, the central region of the storage unit 131 constantly becomes an empty region. An IC chip having this data (an IC chip including the storage unit 131) is hereafter called a security IC.

The block (32 bytes) of the logical address FFFFh of the storage unit 131 has a Device ID and Device Parameter stored therein. The Device ID indicates an ID unique to a device, i.e. the ID of the IC card 112. This data is either written by the IC vendor or written by the system administrator. The data is arranged so as to not be able to be read out without predetermined procedures followed, and cannot be used with a normal application. Thus, it is expected that invasion of privacy and so forth can be prevented. Also, the Device Parameter regulates various parameters such as response time or the like.

The leading two bytes (FFFFh and FFFEh) of each block are data regulating the block type. A system block starting with the leading two bytes of FFFFh or FFFEh (the two blocks of logical address FFFEh and logical address FFFDh) is first assigned to the storage unit 131 by the system administrator, and stored System Key information which is key information to manage the entire system. The System Key has a System Key for Authentication (later-described first data) which is data that is the basis for generating System Data, and a System Key for Access Control Ticket (later-described third data). Note that an arrangement may be made wherein the System Key herein only has one or the other set, and the other is generated according to predetermined logic using the one set, or an arrangement may be made wherein both are the same.

The Key Format included in the two blocks here regulate the common key encryption algorithm/key length in the case of using the System Key as an encryption key, and is not applicable in the case of using the System Key as data. Also, Key Version indicates version information of the System Key of the block therein.

A system block starting with the leading two bytes of 00 00h has information for a Root Directory stored therein. The 3rd byte through 6th byte (00 00 00 00h) indicates the Directory Code (name of directory) of the Root Directory. The Start Address normally starts from 00 00h, and the End Address indicates one prior to the system block. Note that this address is not a physical address, but relates to a logical block number. A Total Block number can be calculated from the Start Address and End Address and so is not indispensable, but is secured in memory. A Key Format regulates a common key encryption algorithm/key length to be used, and is applicable to all of the common keys saved in other regions. A Key Version indicates the key version of the Root Directory Symmetric Key.

A system block starting with the leading two bytes of 00 01h has information relating to a Directory stored therein which can have a Sub-Directory configured on a lower level thereof, and a system block starting with the leading two bytes of 00 02h has information relating to a Directory stored therein which cannot have a Sub-Directory configured on a lower level thereof. The Directory Code of the system block should indicate the name of the Directory herein which differs from other Codes. However, the values "FF FF FF FFh" and "00 00 00 00h" cannot be used for the Code. Also, the Start Address and End Address of the system block are similar to the case of the system block relating to the above-described Root Directory. The second Directory Code indicates the Directory Code of the root directory. Normally, "00 00 00 00h" is written into the Directory Code since this belongs to the Root Directory, but with a Directory of a lower level the Directory Code of the parent Directory is described. Also, the Key Version of the system block herein is similar to the case of the system block relating to the above-described Root Directory. The Directory Key of a system block starting with the leading two bytes of 00 01h (Directory Symmetric Key with Sub-Directory) is a Directory Key for a Directory that can be configured with a lower level Sub-Directory. Also, the Directory Key of a system block starting with the leading two bytes of 00 02h (Directory Symmetric Key with Sub-Directory) is a Directory Key for a Directory that cannot be configured with a lower level Sub-Directory.

A system block starting with the leading two bytes of 00 FFh indicates Application Information as to the Directory. The Application ID of the system block herein indicates identification information (ID) that the service provider managing the directory thereof has assigned to the IC card 112, and the Application Symmetric Key indicates a key computed from the Application ID and Master Application Key. Also, the Directory Code indicates a Directory Code corresponding to the Application Information herein.

In the case that the leading two bytes (depending on block type) are 01 00n through FE FFh, the values thereof indicate an Access Mode, i.e. an access method for access to a File. The Access Code of this block shows the name of the File. However, the value thereof should differ from other Codes. Also, the Start Address and End Address of the block herein are similar to the case of the system block relating to the above-described Root Directory. The Directory Code of the block herein indicates the name of the Directory to which the File to be accessed belongs. Further, in the case that the value of the Key Version of the block herein is other than "FF FFh", an Access Control Symmetric Key which is a key for access control is valid. Conversely, in the case that the value of the Key Version is "FF FFh", the key information of the block herein, i.e. the Access Control Symmetric Key is invalid. That is to say, the value of the Key Version being "FF FFh" indicates that an encrypting processing function is not used.

Note that a system block starting with the leading two bytes of 00 FEh can be indicated as a Revocation List. At this time, the ID of the information processing terminal to be Revoked is described in the region where the key is normally written.

Figure 7:
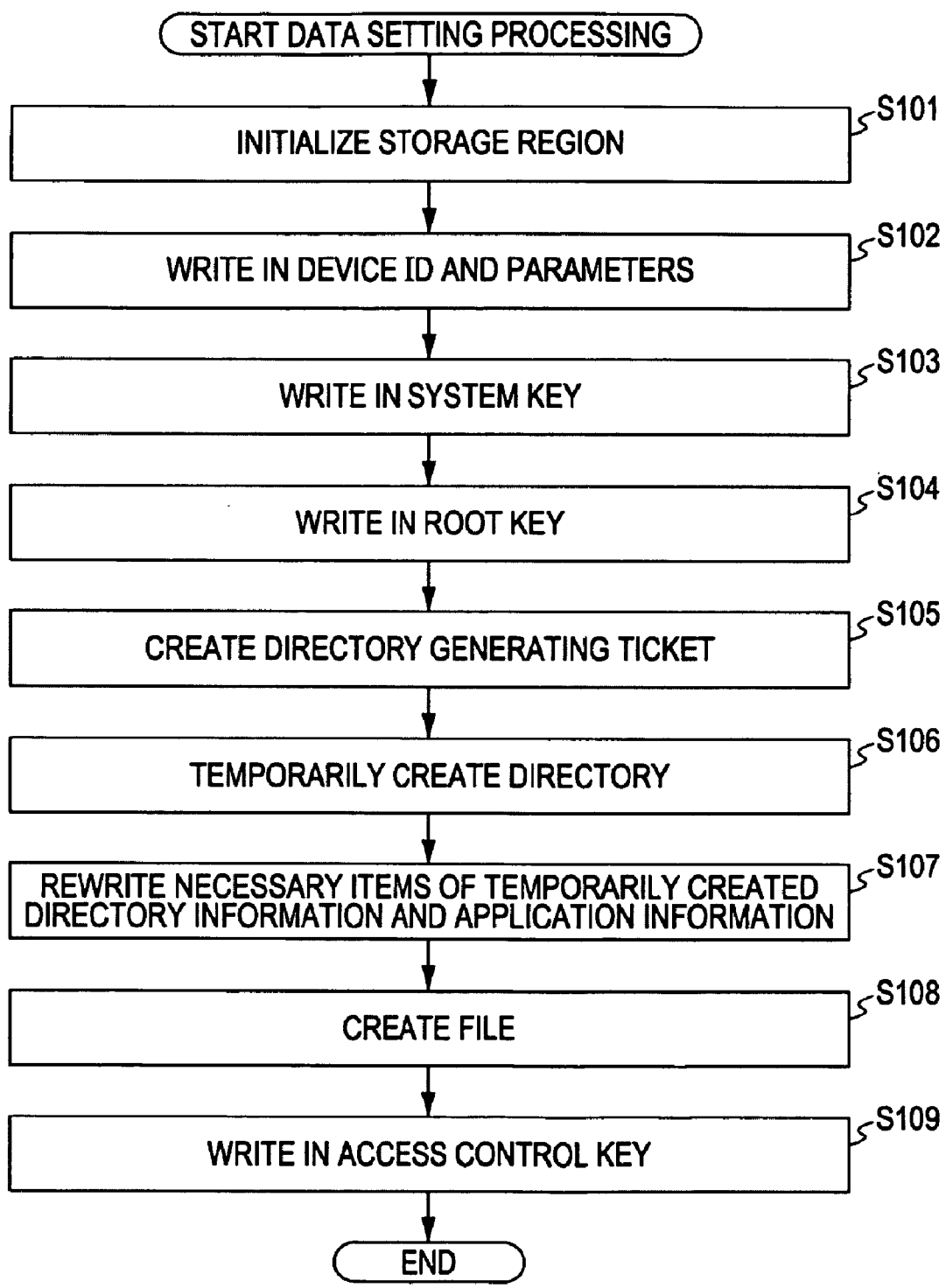
FIG. 7 is a flowchart to describe an example of flow of data setting processing.
Figure 8:
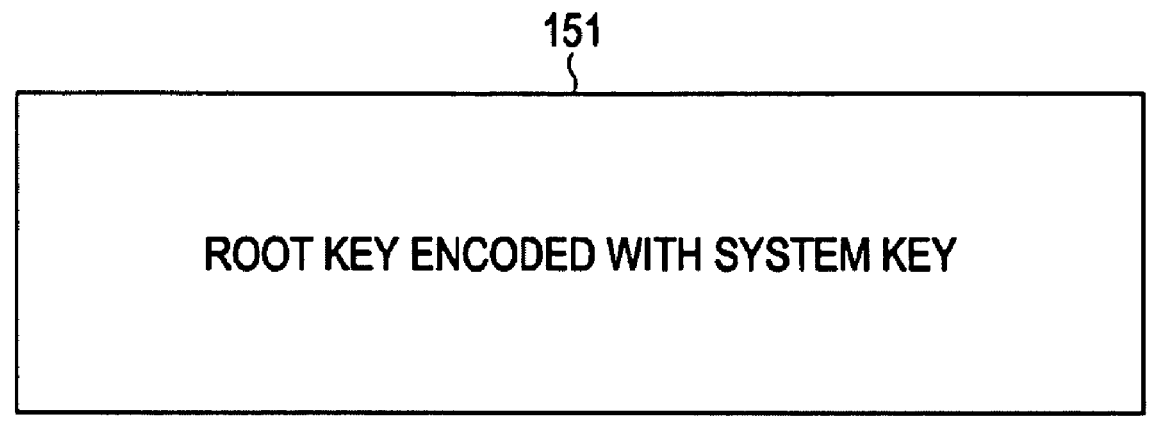
Figure 9:
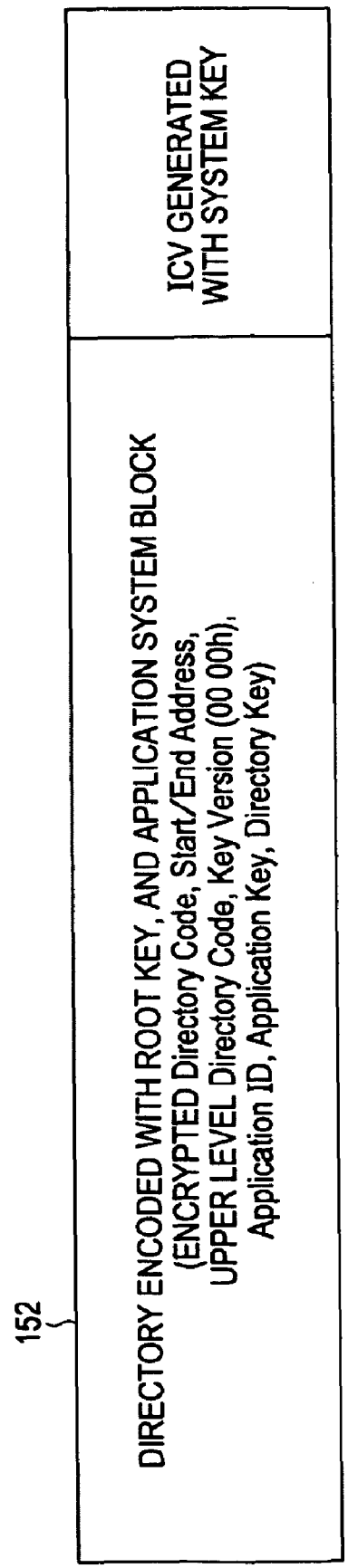
FIG. 9 is a diagram illustrating a configuration example of a data string.

Next, a setting method is stipulated for data within such a security IC (data written in the storage unit 131). An example of data setting processing flow to perform data setting is described with reference to the flowchart in FIG. 7. FIGS. 8 and 9 are referenced as appropriate in this description.

In step S101, upon receiving instructions from a chip vendor (including the product manufacturer that creates the IC card 112), the data setting processing unit 132 initializes a storage region in the storage unit 131. That is to say, immediately after manufacturing the chip, the chip vendor requests a security IC to initialize all of the memory data to FFh using a device (e.g. security IC testing device) other than the IC card 112. Subsequently, the IC card with the security IC built therein is manufactured.

In step S102, the data setting processing unit 132 writes the device ID and parameters supplied from a device that is external as to the IC card 112, based on instructions (specific commands) from the chip vendor in the storage unit 131. Note that the device ID and parameters can only be written in the case that the entire memory area of the storage unit 131 is FFh (or only the region of the device ID (Device ID) and Device Parameter is FFh). Note that at this point in time, readout of values (specific commands) should be able to be performed freely. Also, an arrangement is made such that numerous modifications can be made. Further, we will say that in the case of modifying, an overwriting sequence similar to that described above is used, whereby the previous data is deleted and overwritten. Also, in the case that only the region of the Device ID and Device Parameter is FFh, the data setting processing unit 32 initializes another region to FFh.

In step S103, the data setting processing unit 132 writes the system key supplied from a device that is external as to the IC card 112 in the storage unit 131 based on instructions from the system administrator. Note that the system administrator writes the System Key unique to the system administrator, whereby the chip vendor writes a temporary system key in the storage unit 131 at the time of shipping. Writing of the system key is conditioned upon the Device ID and Device Parameter being written in. Also, in a normal case, the System Key can only be written in once, and rewriting demands following predetermined modification procedures. However, in this case also, conditions for rewriting the System Key are that the Device Id and Device Parameter are written and that the data other than that of the System Key region is initialized (is FFh). Also, an old system key encryption method used for an update herein follows a Key Format written in the memory. The Key Format has an encryption method, other than an encryption algorithm or key bit length, described therein such as subjecting a predetermined value to Exor (Exclusive OR) and encrypting, repeating encryption a predetermined number of times, encrypting only once, and so forth.

In a state that writing processing is advanced thereafter, modifications to the System Key cannot be made. With the actual writing method, data according to a predetermined format is sent from an external device to the security IC, and based on this the System Key, System Code, Key Format, and Key Version are written. The writing sequence is similar to the case of the above-described device ID and parameters, but an optimal method may be set as appropriate. Note that transfer data at this time is not encrypted.

In step S104, the data setting processing unit 132 writes the root key supplied from a device that is external as to the IC card 112 in the storage unit 131, based on instructions from the system administrator. Note that this Root Key can only be written in a case that the System Key has been written. This is because the System Key is used for the initial writing of the Root Key. With the actual writing method, data according to a predetermined format is sent to the security IC from a device that is external as to the IC card 112, and based on this the Rood Key is written. The command is the same as the case of the above-described other step, but as shown in FIG. 8 the data string 151 included in the command includes the Root Key encrypted with the System Key. Let us say that the encryption method follows the Key Format of the System Key. Note that in the case of updating the Root Key, only the Root Key before updating is used. That is to say, the System Key is not used (as a key) at the time of updating the Root Key.

The processing up to this point can be expected to perform processing at a relatively safe place, since the system administrator or chip vendor gives the instructions, and until the processing advances to this point the product itself that the root key is built in does not operate. If in a case that the Root Key is built in to the product without being installed therein, the Root Key can be securely written in at a safe place thereafter. Therefore, the mechanism for writing a key is comparatively easy.

In step S105, the service provider desiring to create a directory requests the system administrator to create a directory generating ticket. In the directory generating ticket is included data used for setting directory information and application information which has been encrypted with a root key, and an ICV (Integrity Check Value) generated using the System Key. The reason for this is that at this point in time, mutual authentication cannot be made, and so as not to enable creating a directory directly under the root without license from the system administrator. Note that the Key Version is 00 00h, and the Directory Key, Application ID, and Application Key are fixed data. We will say that the service provider rewrites as appropriate in step S107.

In step S106, the service provider desiring to provide a service accepts the directory generating ticket generated by the system administrator in step S105, and temporarily creates a directory by sending the directory generating ticket to the data setting processing unit 132. Thus, a directory for providing one's own service is created in the IC card 112.

The data setting processing unit 132 validates the ICV of the accepted directory generating ticket with the system key, and determines whether or not the ICV is valid. In the case determination is made that the ICV is not valid, the directory is not generated. In the case determination is made that the ICV is valid, the directory information and application information written in the directory generating ticket is decrypted with the root key, and the data herein is written into the storage unit 131.

In step S107, a service provider desiring to provide a service performs processing to rewrite the information used (Directory Key, Application ID, and Application Key) for the directory temporarily created.

Thus, first, mutual authentication between the information processing terminal 111 and IC card 112 is performed. The method for mutual authentication will be described later. Upon ending the mutual authentication, a Directory Key modification command is transmitted from the information processing terminal 111 to the IC card 112. The Directory Key modification command includes, as appended data, a Key Version for the new key, and a new Directory Key that is encrypted with the old Directory Key. The IC card 112 having received this reads the Directory Key from the updated directory, and decrypts the data attached to the command with the key therein. The old Directory Key is then rewritten with the obtained new Directory Key, and the Key Version is updated.

Similarly, mutual authentication is performed between the information processing terminal 111 and IC card 112, and upon ending the mutual authentication processing, an application information modification command is transmitted from the information processing terminal 111 to the IC card 112. The application information modification command includes a Key Version, Application ID, and Application Key for a new key serving as appended data. However, we will say that the Application ID is newly assigned with the information processing terminal 111, and an Application Key corresponding to the Application ID is generated from this ID and the master key for generating the Application Key.

Next, the IC card 112 receiving this rewrites the received Application ID and Application Key, and updates the Key Version. Note that normally, the information processing terminal 111 is a terminal dedicated for key modification processing, and modifies keys of multiple IC cards and manages the information thereof. Accordingly, the information processing terminal 111 can systematically assign and manage the Application ID. Also, description is given above to mutually authenticate separately at the time of application information modification processing, but this can be omitted the case of continuing to perform the Directory Key modification processing.

On the other hand, as described later, the information processing terminal 111 and IC card 112 which have completed mutual authentication can have the communication path hereafter be encrypted with the session key and kept confidential, and a consistency check is performed to protect messages from tampering. Thus, even if the new directory key for updating is held in the information processing terminal 111, leaking into the communication path should not be a concern. However, there is no guarantee that the information processing terminal 111 is safely managed, so we will say that the new directory key updated with the old directory key is encrypted as a precautionary measure. On the other hand, the new application key is not encrypted with the old application key. This is because the master key for generating the application key is stored in the information processing terminal 111 and the application key is generated at the time of key updating (encryption cannot be performed beforehand with the old application key), and in the case that the information processing terminal 111 is not safely managed, the master key is revealed, so the advantages thereof are weak even with such measures.

Also, in the case that an upper level Directory is generated, even if not directly below the root directory, the service provider can generate a new Sub-Directory under the upper-level Directory thereof. At this time, the Directory Key and Application ID of the Sub-Directory are also written therein. The actual writing method performs mutual authentication with the System Key and Root Key and the Directory Key of the upper level directory and the Application Key of the upper level directory, and the data according to a predetermined format is sent to the security IC to perform writing. The Sub-Directory Key of the sub-directory is encrypted with the Directory Key of the upper level directory so is relatively safe. Setting the Application ID and Application Key of the sub-directory beforehand is difficult, so encryption beforehand with the Directory Key of the upper level directory cannot be performed. Thus, we will say that the keys are protected with a session key.

Note that with the present example, a predetermined format command is used for generating a sub-directory, but an arrangement may be used wherein the access license ticket for generating the sub-directory is defined as appropriate, which is used to perform sub-directory generation. However, with the access license ticket, regardless of generation beforehand being an assumption, generating an application key beforehand is difficult, whereby a method using a predetermined format command can be more readily realized.

In the case of using a predetermined format command, after mutual authentication, the application ID is generated, the application key is generated with the master key, and the directory key of the sub-directory encrypted with the upper level directory key and the application ID, application key, and other used information (version, etc) are made confidential with the session key and sent to the IC card.

Conversely, in the case of using an access ticket, the application ID is generated beforehand, and an application key corresponding thereto is also created from the master key. The string of data and the directory key of the sub-directory are encrypted with the directory key of the upper level directory, and an access license ticket encompassing these is created. However, what to use for the key that generates the ICV attached to the access license ticket should be researched. Normally, the access control key is used, but the directory does not have such a key (because the key is created as to the file). Accordingly, a method can be conceived wherein the ICV is also generated with the directory key of the upper level.

In step S108, the data setting processing unit 132 creates a File within the directory based on instructions by the service provider. If the directory is created, the service provider can regulate the file access method, and causes the data corresponding thereto to be written into the storage unit 131 as a file. The actual file generating method is performed by performing mutual authentication using the System Key, Root Key, Directory Key, and Application Key, and sending the data according to a predetermined format to a security IC. Note that the access control key is encrypted with the directory key, so is relatively safe. Also, the system block information (access mode, access code, start/end address, directory code, etc) which includes the access control key encrypted with the directory key is encrypted with the session key and sent in.

Note that similar to the time of generating the sub-directory, an arrangement may be used wherein the access license ticket for generating a file is defined as appropriate, which is used to perform file generation.

In step S109, the data setting processing unit 132 writes the access control key based on instructions by the service provider. As described in step S108, we will say that the Access Control Key is encrypted with the Directory Key of the directory to which the generated file belongs. Thus, as shown in FIG. 5 for example, various types of data are written in the storage unit 131.

Figure 10:
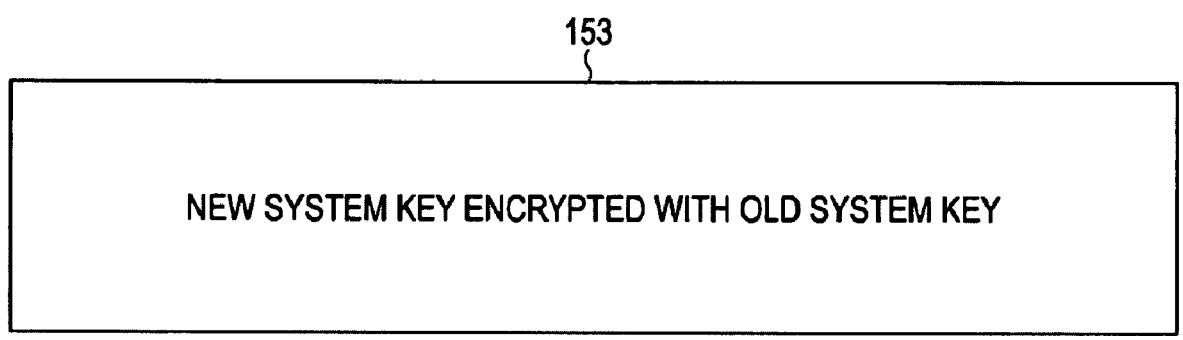
FIG. 10 is a diagram illustrating a configuration example of a data string.

Next, an updating method (modification method) of various types of information described above which is stored in the storage unit 131 will be described. Modifying the System Key demands that nothing except the Device ID, Device Parameter, and System Key region is written therein. Actually, in the state wherein nothing is written in other than the predetermined regions, data according to a predetermined format is sent to the security IC from a device that is external as to the IC card 112, and the System Key is modified based on such data. The command at this time is defined as a key-modifying command. Also, as shown in FIG. 10, a key that the new System Key has been encrypted with the old System Key is included in the data string 153 included in the command thereof. The encryption method of the old System Key is used according to the Key Format of the System Key written in the memory of the IC card 112. Note that the data appended to the key-modifying command includes not only the new system key but also the Key format and Key Version of the new system. Hereafter, all of the key modifying commands are the same.

Figure 11A:
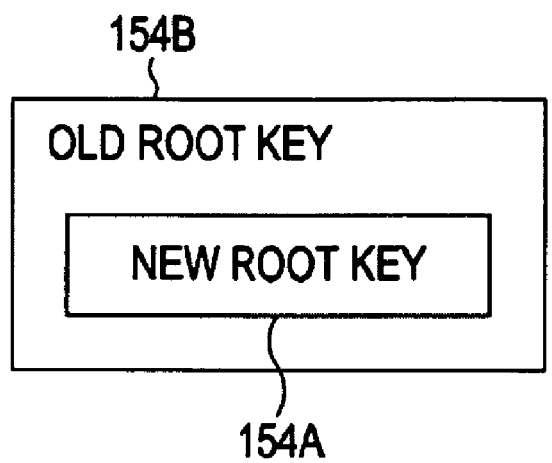
FIG. 11 is a diagram illustrating a configuration example of a data string.
Figure 11B:
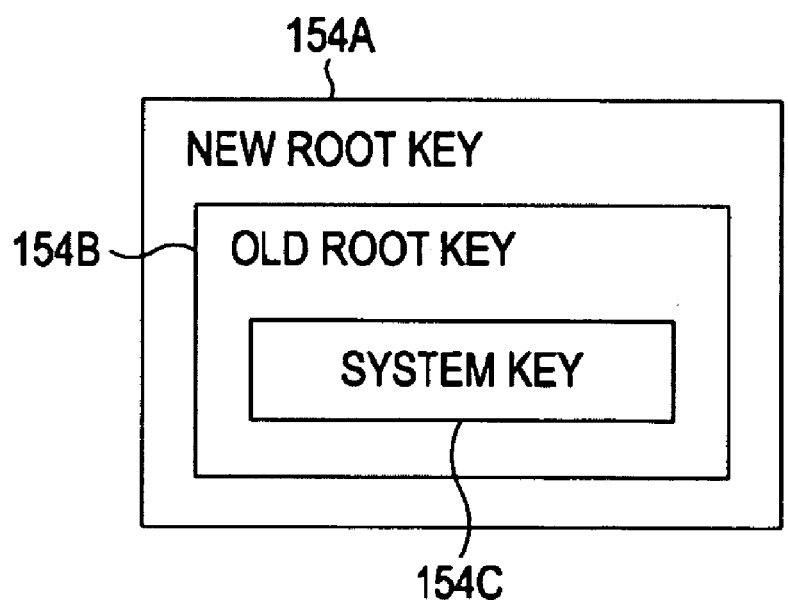

Modifying the Root Key demands writing in the Root Key. This key can be modified with the condition that the Root Key is written in. Actually, in this state the data according to a predetermined format is sent to the security IC from a device that is external as to the IC card 112, and based on this the Root Key is modified. At this time the command is defined as a key-modifying command. Also, the data string included in the command thereof includes first data wherein the new Root Key 154A is encrypted with the old Rood Key 154B as shown in FIG. 11A, and second data wherein the System Key 154C is encrypted with the old Root Key 154B and this is further encrypted again with the new Root Key 154A, as shown in FIG. 11B, for example. The encryption method of the old Root Key is used according to the Key Format of the Root Key written in the memory of the IC card 112. The encryption method of the new Root Key is used according to the Key Format of the new Root Key appended to the key updating command. Note that the data appended to the key-modifying command includes not only the new root key but also the Key Format and Key Version of the new root key, but since the Directory Code "00 00 00 00h", the starting address, ending address, and total number of blocks and so forth are not assumed to be modified, so do not have to be included. However, this data may be included with no problem whatsoever.

Incidentally, the reason for using the two sets of encrypted data is that mutual authentication cannot be used for Root Key modification, and that an access license ticket cannot be used. Therefore, if a malicious third party uses a reader/writer or the like to send appropriate data to the IC card as "a key that the new Root Key is encrypted with the old Root Key", the IC card cannot determines whether the data is correct or not, resulting in a risk of modifying into an invalid key. Thus, the System Key is encrypted with the old Root Key (the system administrator and the like know this), the result thereof is further encrypted with the new Root Key (the system administrator and the like know this also), and this data is also attached. With the security IC, the first data is decrypted with the old Root Key to obtain a new Root Key, the second data is decrypted with this key, and the output thereof is decrypted again with the old Root Key. In the case that the result thereof matches the System Key, determination is made that the correct system administrator is performing processing, and the key is modified.

Figure 12:
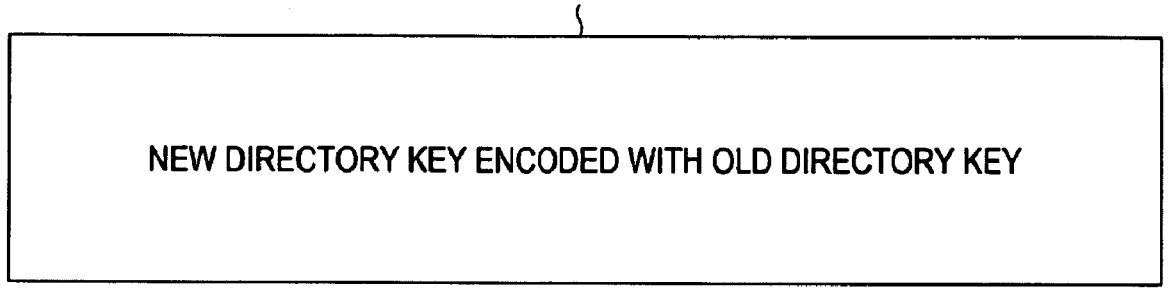
FIG. 12 is a diagram illustrating a configuration example of a data string.

Also, the Directory Key can be modified if the directory is generated. Actually, the authentication key (using the System Key, Root Key, Directory Key, Application Key) is generated in this state, and data to be used is sent in to the security IC to perform modification. The command is defined as a directory key modifying command, and as shown in FIG. 12, the data string 155 included in the command includes a key that the new Directory Key is encrypted with the old Directory Key.

Also, a Key Version of the new key may also be included herein as appropriate. The IC card 112 receiving the data herein reads the Directory Key of the directory to be modified and decrypts the data appended to the command with the key herein. The old Directory Key is then rewritten with the obtained new Directory Key, and updates the Key Version.

Similarly, the Application ID and Application Key can be modified if the directory is generated (normally modification is not made to only one or the other). Actually, the authentication key (using the System Key, Root Key, Directory Key, Application Key) is generated in this state, and data to be used is sent in to the security IC to perform modification. The command is defined as an application key modifying command, and the data string included in the command includes a non-encrypted Application ID and non-encrypted Application Key. Also, the Key Version of the new key may be included as appropriate. However, let us say that the Application ID is newly assigned to a device that is external as to the IC card 112, and an Application Key corresponding to the Application ID is generated from the ID herein and the master key for generating the Application Key.

Next, the IC card 112 receiving this data rewrites the received Application ID and Application Key, and updates the Key Version. Note that normally, the device that is external as to the IC card 112 is a dedicated terminal for key modifying processing, which modifies the keys of multiple IC cards and manages this information. Accordingly, the dedicated terminal for key modification processing herein can systematically assign the Application ID to manage.

Also, description is given as the authentication key being generated at the time of application information modifying processing, but this can be omitted the case of continuing the Directory Key modification processing.

On one hand, as described later, the dedicated terminal for key modifying processing and the IC card 112 having ended the mutual authentication can have the communication path hereafter be encrypted with the session key and kept confidential, and a consistency check is performed to protect messages from tampering. Thus, even if the new directory key for updating is held in the dedicated terminal for key modifying processing, leaking into the communication path should not be a concern. However, there is no guarantee that the dedicated terminal for key modifying processing is safely managed, so the new directory key updated with the old directory key may be encrypted as a precautionary measure. On the other hand, the new application key is not encrypted with the old application key. This is because the master key for generating the application key is stored in the dedicated terminal for key modifying processing and the application key is generated at the time of key updating (encryption cannot be performed beforehand with the old application key), and in the case that the dedicated terminal for key modifying processing is not safely managed, the master key is revealed, so the advantages thereof are weak even with such measures.

Note that predetermined format commands are used for various types of key modifications, but an arrangement may be made wherein the access license ticket for various types of modifications is defined as appropriate, which is used to perform key modifying.

Figure 13:
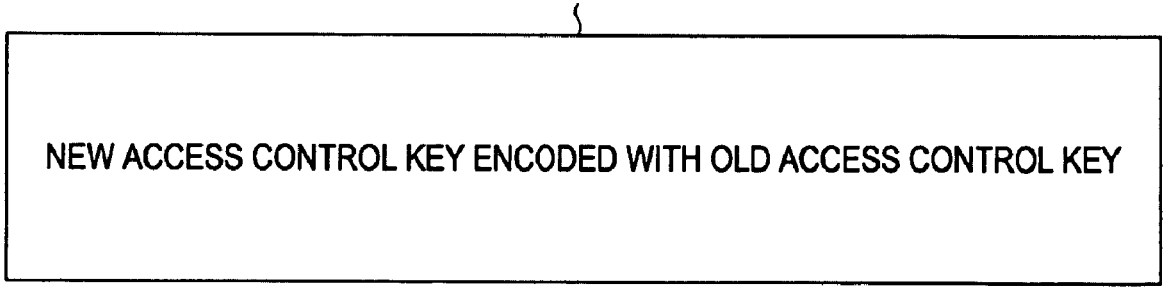
FIG. 13 is a diagram illustrating a configuration example of a data string.

Modifying the Access Control Key can be executed if a file is generated. Actually, the authentication key (using the System Key, Root Key, Directory Key, and Application Key) is generated in this state, and data to be used is sent in to the security IC to perform modification. The command is defined as an access control key modifying command, and as shown in FIG. 13, the data string 156 included in the command includes key that is the new Access Control Key encrypted with the old Access Control Key. Also, the Key Version of the new key may be included as appropriate. The IC card 112 having received this data reads the Access Control Key of the file to be modified, and decrypts the data appended to the command with the key herein. The old Access Control Key is then rewritten with the new obtained Access Control Key, and the Key Version is updated. Note that the data remains encrypted, as the modification of the Access Control Key differs from the time of modification of the Application Key, and the data string can be prepared beforehand and there is a physical security risk therein. Therefore, with the present example, a predetermined format command is used for access control key modifying, but an access license tickets for access control key modification is defined as appropriate, which can be used to perform modification (the ticket thereof can be created beforehand).

After mutual authentication, a session key is shared between the information processing terminal 111 and IC card 112. The packets to be communicated are all encrypted with the session key, and data for message authentication is added as prevention of tampering. OMAC (One-Key CBC MAC) is a modified type of CBC MAC (Cipher Block Chaining Message Authentication Code). Alternatively, a CCM (Counter with CBC-MAC) may be used.

With the communication system 100 in FIG. 4, the information processing terminal 111 and IC card 112 establish a session in order to perform communication. At the time of starting communication the information processing terminal 111 and IC card 112 perform mutual authentication processing to authenticate one another in order to establish such session.

An example of flow of the mutual authentication processing will be described with reference to the flowcharts in FIGS. 14 and 15. Note that description will be given with reference to FIGS. 16 through 19 as appropriate. Also, an example of the case that the information processing terminal 111-1-1 and IC card 112-1 perform mutual authentication processing is described for the ease of description.

Upon mutual authentication processing starting, the authentication processing unit 123 of the information processing terminal 111-1-1 controls the random generating unit 125 in step S121 to generate the first random number.

In step S122, the authentication processing unit 123 controls the communication unit 128, to transmit a first mutual authentication starting command to the IC card 112-1 along with the ID of the information processing terminal 111-1-1 (ID1-1), the access destination directory information indicating the directory to access, and the first random number generated in the processing in step S121. Note that for the access destination directory information, for example the access destination directory is shown with a Directory Code. Of course, if the information can identify the access destination directory, information other than the Directory Code may be used. Note that description is given here wherein a directory 1-1 and directory 1-2 are specified as an example of an access destination directory.

In step S131, the communication unit 138 of the IC card 112-1 obtains the first mutual authentication starting command and so forth. Upon obtaining the first mutual authentication starting command, in step S132 the master key generating unit 141 of the authentication processing unit 133 performs processing to generate the master key (in this case, master key MK1-IT) which is key information to generate a key (in this case, key K1-1) unique to the information processing terminal 111 (in this case, information processing terminal 111-1-1) serving as a partner for the mutual authentication. The master key is generated by degenerating the first data, root key, and the directory key of the directory specified in the access destination.

Figure 16:
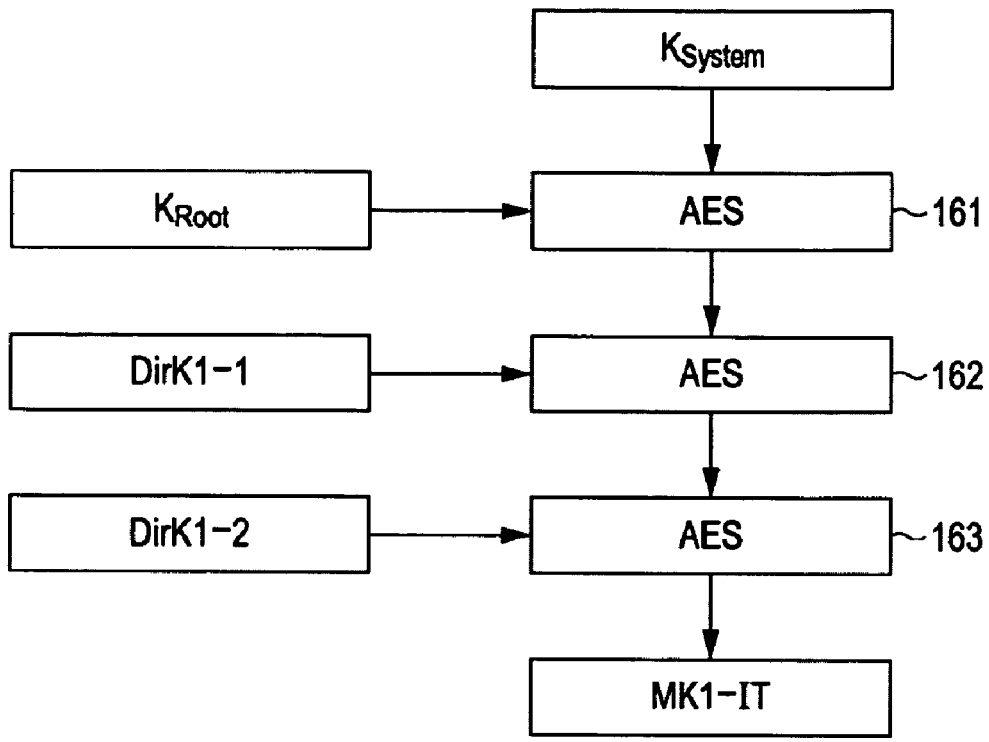
FIG. 16 is a functional block diagram to describe a detailed configuration example of mutual authentication processing.

A more specific example is shown in FIG. 16. As shown in FIG. 16, the master key generating unit 141 has a functional block of an encrypting processing unit (AES) 161 through encrypting processing unit (AES) 163. The encrypting processing unit (AES) 161 controls the encrypting unit 136 to encrypt the system key ($K_{System}$) using the root key ($K_{Root}$) serving as the first data, and generates the second data. The encrypting processing unit (AES) 162 controls the encrypting unit 136 to encrypt the second data with an AES method, using the directory key (DirK1-1) of the directory 1-1. The encrypting processing unit (AES) 163 controls the encrypting unit 136 to encrypt the results of the encryption by the encrypting processing unit (AES) 162 with the AES method, using the directory key (DirK1-2) of the directory 1-2, and generates the master key (MK1-IT). Note that instead of AES, another common key encrypting method may be used, such as DES or the like.

The detailed flow of the master key generating processing will be generated later. Upon the master key being generated, the authentication processing unit 133 controls the encrypting unit 136 in step S133, to encrypt the ID (ID1-1) of the information processing terminal 111-1-1 using the master key (MK1-IT) generated with the processing in step S132, and generates the key (K1-1) unique to the information processing terminal 111-1-1.

Figure 17:
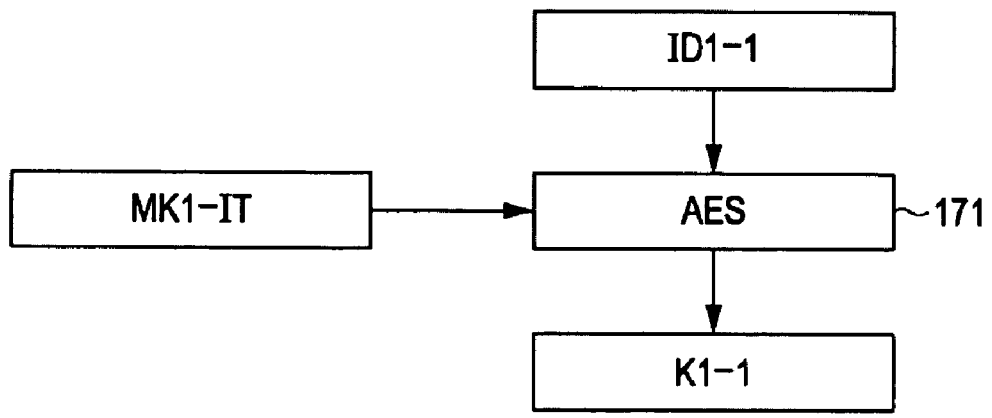
FIG. 17 is a functional block diagram to describe a detailed configuration example of mutual authentication processing.

A specific example is shown in FIG. 17. As shown in FIG. 17, the authentication processing unit 133 has a function block of an encrypting processing unit (AES) 171. The encrypting processing unit (AES) 171 controls the encrypting unit 136, to encrypt the ID (ID1-1) of the information processing terminal 111-1-1 using the master key (MK1-IT) with the AES method, and generates the key (K1-1) unique to the information processing terminal 111-1-1.

Note that in this case also, instead of AES, another common key encryption method such as DES or the like may be used. Also, the present example is described as performing encryption, but the information processing terminal 111-1-1 may be decrypted using the master key (MK1-IT) generated with the processing in step S132, to generate the key (K1-1) unique to the information processing terminal 111-1-1. Alternatively, upon computing such as subjecting a predetermined fixed value to EXOR as to the ID (ID1-1) of the information processing terminal 111-1-1, the key may be encrypted and generated using the master key (MK1-IT) generated with the processing in step S132. Thus, if the unique key (K1-1) held in the information processing terminal 111-1-1 can simply be restored, any type of computing method may be used.

The key K1-1 herein is a key unique to the information processing terminal 111-1-1. In the example in FIG. 5, an ID (ID1-2) which differs from the ID (ID1-1) assigned to the information processing terminal 111-1-1 is written into the information processing terminal 111-1-2 of the service provider 1, whereby even if the master key (MK1-IT) for the same information processing terminal is used, a key (K1-2) unique to the information processing terminal 111-1-2 which differs from the key (K1-1) unique to the information processing terminal 111-1-1, is generated.

In step S134, the authentication processing unit 133 controls the encrypting unit 136 to encode the application IDs (AppID1-1 and AppID1-2) written into the directory specified at the access destination with the key (K1-1) unique to the information processing terminal 111-1-1, and creates a first reply message. At this time, the usage sequence of the application ID (AppID) follows the access destination directory information supplied from the information processing terminal 111-1-1. Let us say that the encrypting method at this time uses an encryption usage mode such as a CBC (Cipher Block Chaining) mode or the like. Also, with the present example, encryption is illustrated, but decryption made be performed. In this case, on the information processing terminal 111-1-1 side having received the first reply message, the same key has to be used to encrypt.

Upon generating the first reply message, in step S135 the authentication processing unit 133 generates the authentication key ($K_{Auth}$) used for mutual authentication. The authentication processing unit 133 controls the encrypting unit 136 to encrypt the key (K1-1) unique to the information processing terminal 111-1-1 using the application keys (AppK1-1 and AppK1-2) written into the directory specified at the access destination and to generate the authentication key ($K_{Auth}$). Such processing is degeneration of the key.

Figure 18:
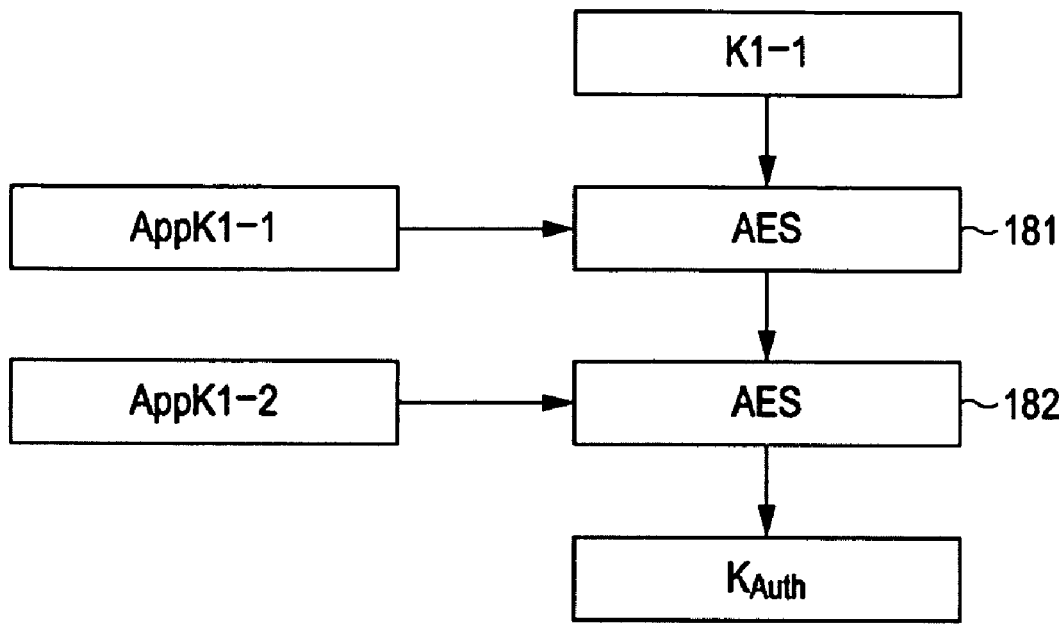
FIG. 18 is a functional block diagram to describe a detailed configuration example of mutual authentication processing.

A specific example is shown in FIG. 18. As shown in FIG. 18, the authentication processing unit 133 has a function block of an encrypting processing unit (AES) 181 and encrypting processing unit (AES) 182. The encrypting processing unit (AES) 181 controls the encrypting unit 136 to encrypt the key (K1-1) unique to the information processing terminal 111-1-1 with the AES method, using the application key (AppK1-1) written into the directory 1-1 specified at the access destination. The encrypting processing unit (AES) 182 controls the encrypting unit 136 to further encrypt the results of the encryption by the encrypting processing unit (AES) 181 with the AES method, using the application key (AppK1-2) written into the directory 1-2 specified as the access destination. The encryption results by the encrypting processing unit (AES) 182 becomes the authentication key ($K_{Auth}$).

Note that the usage sequence of the application key (AppK) follows the access destination directory information supplied from the information processing terminal 111-1-1. Also, in this case as well, instead of AES, another common key encrypting method may be used, such as DES or the like.

In step S136, the authentication processing unit 133 controls the random generating unit 135 to generate the second random number. In step S137, the authentication processing unit 133 uses the authentication key ($K_{Auth}$) as the encryption key, and controls the encrypting unit 136 to encrypt the second random number herein, the first random number sent from the information processing terminal 111-1-1, and ID (ID1-1) of the information processing terminal 111-1-1 with a predetermined encryption mode, and generates a second reply message. Note that the second random number, first random number, and ID (ID1-1) of the information processing terminal 111-1-1 are encrypted in a predetermined sequence determined beforehand.

Now, with the present example the first reply message is encrypted by the key (K1-1) unique to the information processing terminal 111-1-1 and generated, and the second reply message is encrypted with the authentication key ($K_{Auth}$), but the encrypted first reply message and the second reply message before encrypting may be encrypted all at once in a predetermined encryption mode, using the authentication key ($K_{Auth}$). Further, the second reply message includes the ID (ID1-1) of the information processing terminal 111-1-1, but other data other than this (the ID of the information processing terminal 111-1-1) may be used.

In step S138, the authentication processing unit 133 controls the communication unit 138, to reply with the first reply message and second reply message to the information processing terminal 111-1-1 as a response as to the mutual authentication starting command. Upon ending the processing in step S138, the authentication processing unit 133 of the IC card 112-1 advances the processing to step S151 in FIG. 15.

Figure 15:
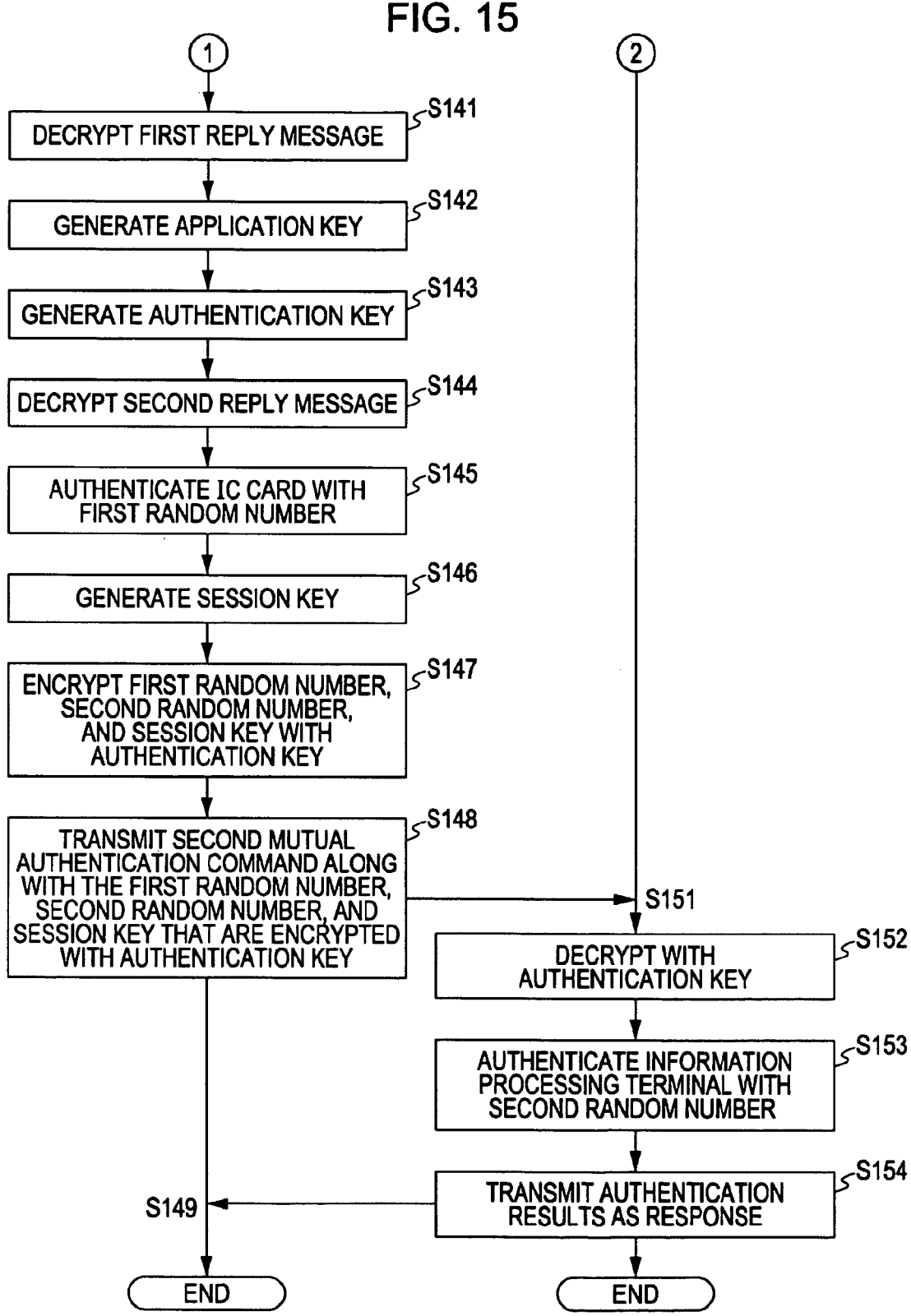
FIG. 15 is a flowchart to describe an example of flow of mutual authentication processing, which follows FIG. 14.

Also, upon receiving the response (first reply message and second reply message) in step S123, the communication unit 128 of the information processing terminal 111-1-1 advances the processing to step S141 in FIG. 15.

In step S141 in FIG. 15, the authentication processing unit 123 of the information processing terminal 111-1-1 controls the decrypting unit 127 to decrypt the first reply message with a decryption method corresponding to the encryption method used, using the key (K1-1) unique to the information processing terminal 111-1-1 stored in the storage unit 121 beforehand, and extracts the application IDs (AppID1-1 and AppID1-2). In step S142, the authentication processing unit 123 generates an application key (AppK1-1) by encrypting the application ID (AppID1-1) using the master key (MK1-IC) stored in the storage unit 121 beforehand, and further generates the application key (AppK1-2) by encrypting the application ID (AppID1-2) using the master key (MK1-IC).

Figure 19:
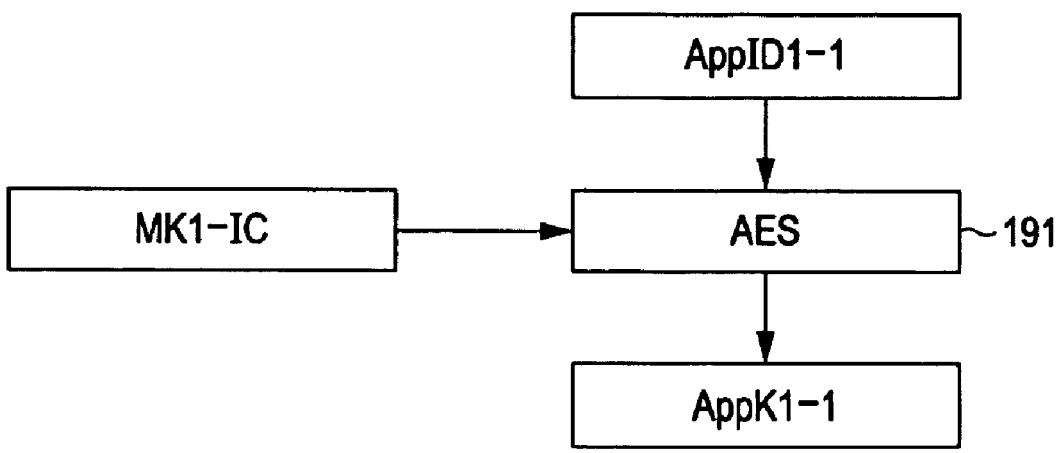
FIG. 19 is a functional block diagram to describe a detailed configuration example of mutual authentication processing.

A specific example is shown in FIG. 19. As shown in FIG. 19, the authentication processing unit 133 has a function block of an encrypting processing unit (AES) 191. The encrypting processing unit (AES) 191 controls the encrypting unit 126 to encrypt the application ID (AppID1-1) of the directory 1-1 with the AES method, using the master key (MK1-IC) and generates the application key (AppK1-1). Note that although not shown in the diagram, similar to the case of the application key (AppK1-1), the encrypting processing unit (AES) 191 controls the encrypting unit 136, to encrypt the application ID (AppID1-2) of the directory 1-2 with the AES method, using the master key (MK1-IC) and generates the application key (AppK1-2).

Note that in this case as well, instead of AES, another common key encrypting method may be used, such as DES or the like. Also, for example, in the case that the master key differs for each directory, the encryption of each application ID is performed using a master key of the direction corresponding to each application ID. That is to say, the method is such that the application key (AppK1-1) of the directory 1-1 generates the application ID (AppID1-1) of the directory 1-1, using the master key (MK1-IC1) for the directory 1-1, and the application key (AppK1-2) of the directory 1-2 generates the application ID (AppID1-2) of the directory 1-2, using the master key (MK1-IC2) for the directory 1-2.

In step S143, the authentication processing unit 123 controls the encrypting unit 126 to encrypt the key (K1-1) unique to the information processing terminal 111-1-1 using the application keys (AppK1-1 and AppK1-2) generated in step S142, and generates the authentication key ($K_{Auth}$). The generating method of the authentication key ($K_{Auth}$) is executed similar to the case of the processing in step S135 that is executed with the IC card 112. That is to say, the description performed with reference to FIG. 18 can be applicable to the description of the authentication key generation in step S143. That is to say, as shown in FIG. 18, the authentication processing unit 123 has a function block of an encrypting processing unit (AES) 181 and an encrypting processing unit (AES) 182. The encrypting processing unit (AES) 181 controls the encryption unit 126 to encrypt the key (K1-1) unique to the information processing terminal 111-1-1 with the AES method, using the application key (AppK1-1), and the encrypting processing unit (AES) 182 controls the encryption unit 126 to further encrypt the results of the encryption by the encrypting processing unit (AES) 181 with the AES method, using the application key (AppK1-2). The encryption results by the encrypting processing unit (AES) 182 becomes the authentication key ($K_{Auth}$).

Note that the usage sequence of the application key (AppK) becomes the sequence as defined with the access destination directory information (decrypted directory ID sequence). Also, in this case as well, instead of AES, another common key encrypting method may be used, such as DES or the like.

In step S144, the authentication processing unit 123 controls the decrypting unit 127 to decrypt the second reply message obtained with the IC card 121-1, and extract the ID (ID1-1) unique to the second random number, first random number, and information processing terminal 111-1-1.

In step S145, the authentication processing unit 123 performs authentication of the IC card 112-1 with the extracted first random number. In the case that for example the first random number obtained by decrypting the second reply message obtained with the IC card 112-1 matches (is the same as) the first random number supplied to the IC card 112-1, the same authentication key is generated with the IC card 112-1. That is to say, there is a high probability that the IC card 112-1 has the first data, root key ($K_{Root}$), directory keys (DirK1-1 and DirK1-2), and application keys (AppK1-1 and AppK1-2). Accordingly, the authentication processing unit 123 can determine that the partner (IC card 112-1) is permitted to be authenticated. Conversely, in a case that the first random number is not correct (does not match), the authentication processing unit 123 determines that the IC card 112-1 is invalid.

That is to say, the authentication processing unit 123 determines whether or not to authenticate the IC card 112-1 by determining whether or not the first random number obtained from the second reply message matches the first random number generated in step S121 in FIG. 10. In the case that the two first random number values are mutually the same, the authentication processing unit 123 authenticates the IC card 112-1. Conversely, in the case that the two first random number values are not mutually the same, the authentication processing unit 123 determines that the IC card 112-1 is invalid, and ends the mutual authentication processing as an error. That is to say, in this case, mutual authentication between the information processing terminal 111-1-1, and the IC card 112-1 is not performed, thereby failing to establish communication.

Upon the two first random number values being mutually the same, and the IC card 112-1 authenticated, the authentication processing unit 123 controls the random number generating unit 125 to generate a random number in step S146, and takes the random number thereof as the session key. The session key herein is used to protect the security of the communication path after the mutual authentication is completed.

In step S147, the authentication processing unit 123 encrypts the first random number, second random number, and the generated session key with the authentication key ($K_{Auth}$). The encryption is performed in a predetermined encryption mode. Note that the sequence of encryption is not limited to this, and is arbitrary.

In step S148, the authentication processing unit 123 controls the communication unit 128 to transmit the second mutual authentication command to the IC card 112-1 along with the first random number, second random number, and session key encrypted with the authentication key ($K_{Auth}$). In step S151, the communication unit 138 of the IC card 112-1 obtains the first random number, second random number, and session key encrypted with the authentication key ($K_{Auth}$).

In step S152, the authentication processing unit 133 of the IC card 112-1 controls the decrypting unit 137 to decrypt the first random number, second random number, and session key encrypted with the authentication key ($K_{Auth}$), using the authentication key ($K_{Auth}$).

In step S153, the authentication processing unit 133 performs authentication of the information processing terminal 111-1-1 with the extracted second random number. In the case for example that the second random number obtained with the information processing terminal 111-1-1 matches (is the same as) the second random number generated with the processing in step S136 in FIG. 14, the same authentication key is generated with the information processing terminal 111-1-1. That is to say, there is a high probability that the information processing terminal 111-1-1 has the key K1-1 unique to the information processing terminal 111-1-1 and the master key (MK1-IC) for the IC card 112-1. Accordingly, the authentication processing unit 133 can determine that the partner (information processing terminal 111-1-1) is permitted to be authenticated. Conversely, in the case that the second random number is not valid (does not match), the authentication processing unit 133 determines that the information processing terminal 111-1-1 is invalid.

Figure 14:
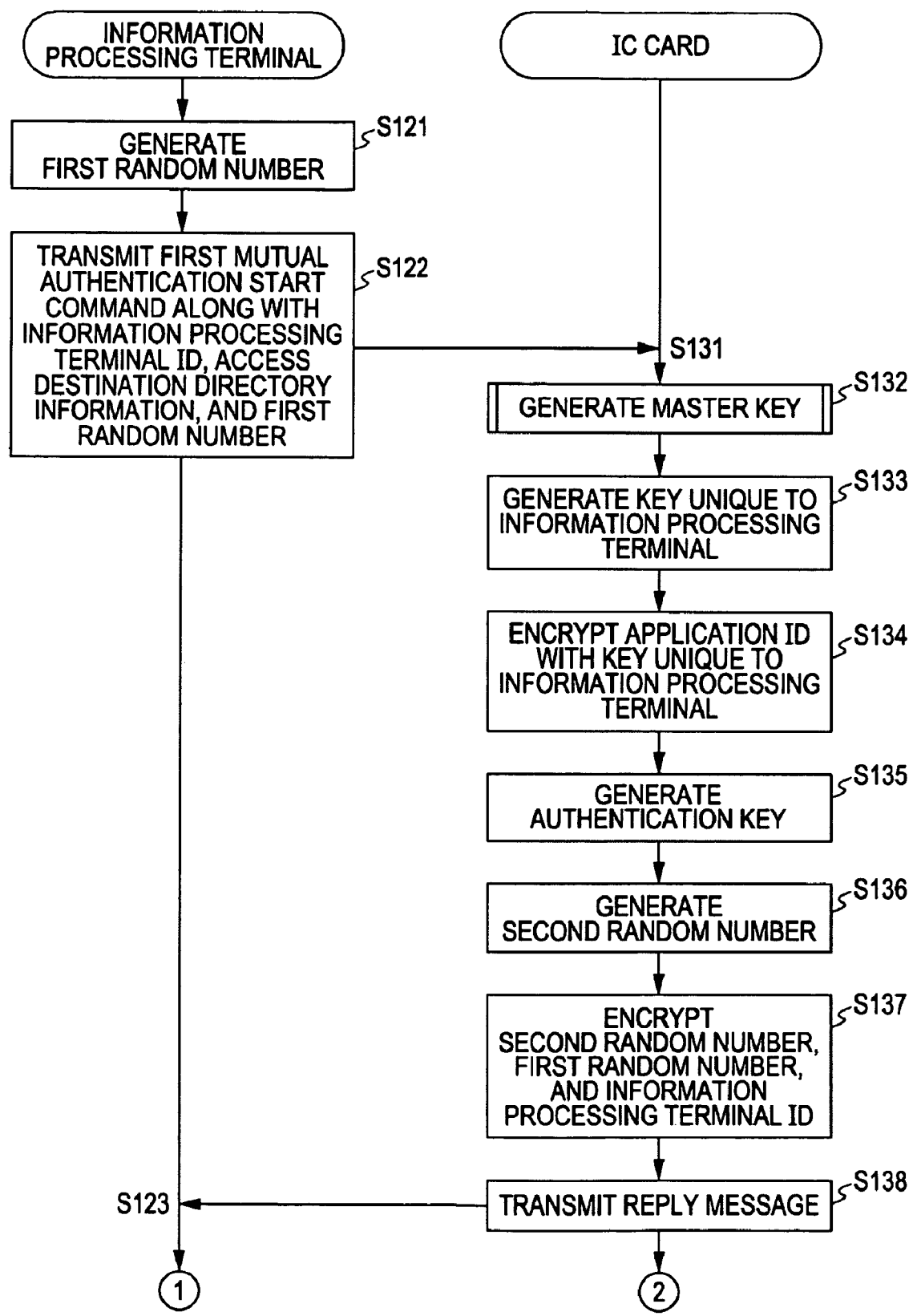
FIG. 14 is a flowchart to describe an example of flow of mutual authentication processing.

That is to say, the authentication processing unit 133 determines whether or not to authenticate the information processing terminal 111-1-1 by determining whether or not the second random number supplied along with the second mutual authentication command and the second random number generated with the step S136 in FIG. 14. In the case that the two second random number values mutually are the same, the authentication processing unit 133 authenticates the information processing terminal 111-1-1. Conversely, in the case that the two second random number values are not mutually the same, the authentication processing unit 133 determines that the information processing terminal 111-1-1 is invalid, and ends the mutual authentication processing as an error. That is to say, in this case, mutual authentication between the information processing terminal 111-1-1 and the IC card 112-1 is not performed, thereby failing to establish communication.

Upon the two second random numbers matching one another, and the information processing terminal 111-1-1 being authenticated, the authentication processing unit 133 controls the communication unit 138 in step S154 to transmit the authentication results thereof as a response, and ends the mutual authentication processing normally.

In step S149, the communication unit 128 of the information processing terminal 111-1-1 obtains the response thereof, comprehends the mutual authentication completed, and ends the mutual authentication processing normally. As described above, upon the partner being mutually authenticated, the telegraph thereafter is all encrypted with the session key and transmitted/received.

Figure 20:
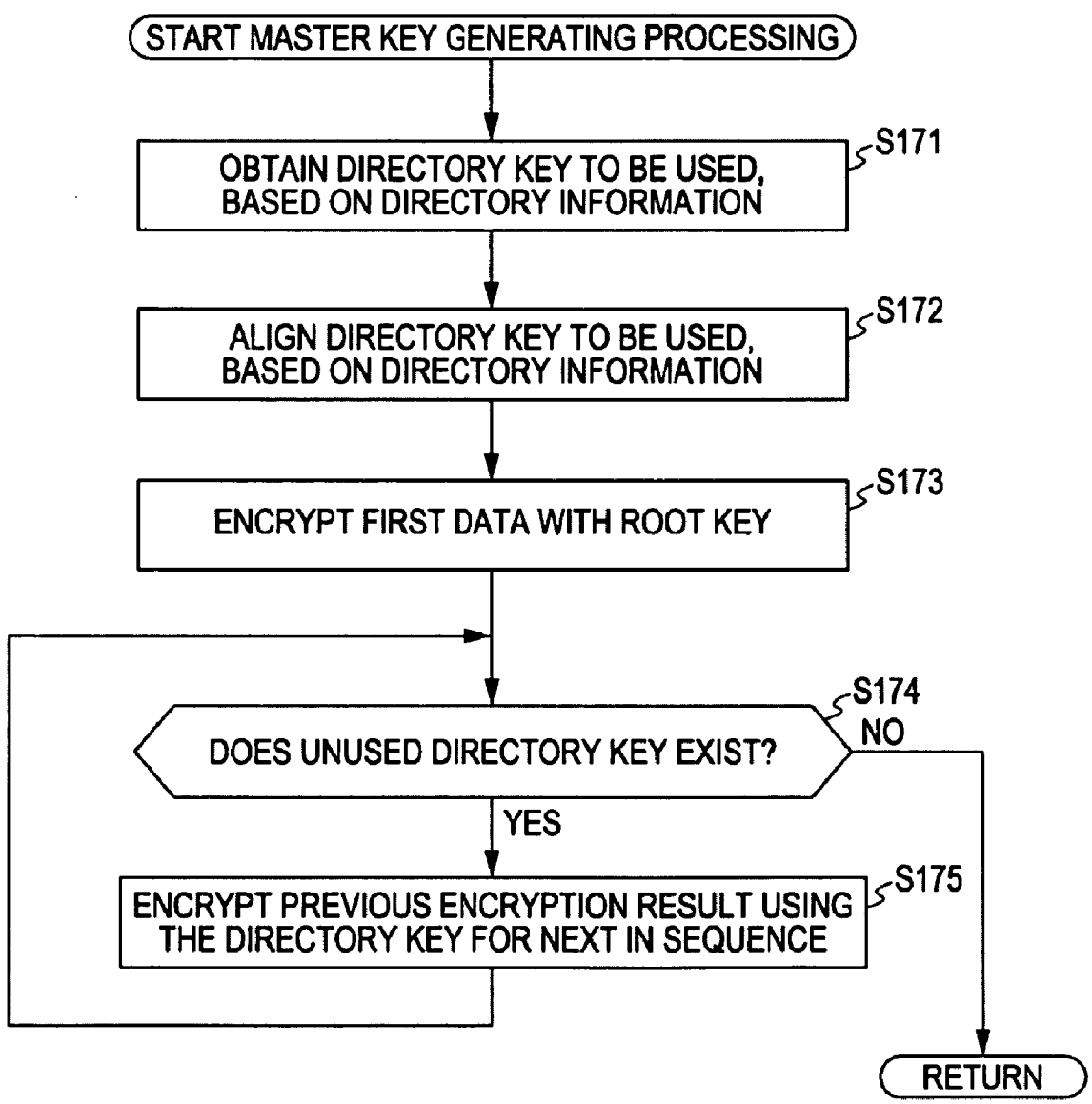
FIG. 20 is a flowchart to describe an example of flow of master key generating processing.

Next, a detailed flow example of the master key generating processing executed in step S132 in FIG. 14 will be described with reference to the flowchart in FIG. 20. Upon the master key generating process starting, in step S171 the master key generating unit 141 obtains the directory keys (DirK1-1 and DirK1-2) used to generate the master key (MK1-IT), based on the access destination directory information supplied from the information processing terminal 111-1-1. In step S172, the master key generating unit 141 arrays the directory keys (DirK1-1 and DirK1-2) used to generate the master key (MK1-IT), in the sequence shown in the access destination directory information. Upon completion of the array, in step S173 the master key generating unit 141 first encrypts the first data ($K_{System}$) with the root key ($K_{Root}$).

In step S174, the master key generating unit 141 determines whether or not there are any unused directory keys (DirK) in the directory keys (DirK) obtained in step S171. In the case determination is made that a key does exist, the processing is advanced to step S175, and the encryption results from the previous time are encrypted using the directory key that is next in sequence. Upon ending the encryption, the master key generating unit 141 returns the processing to step S174.

As described above, the master key generating unit 141 repeats the processing in steps S174 and S175, and repeats the encryption using all of the obtained directory keys. In the case determination is made in step S174 that all of the directory keys are used, the master key generating unit 141 ends the master key generating processing.

That is to say, by thus repeating the encryption, the master key generating unit 141 degenerates the system key ($K_{System}$) used as the first data, the root key ($K_{Root}$), and the obtained directory key, to generate the master key (MK1-IT).

Note that the mutual authentication processing between the information processing terminal 111-1-1 and IC card 112-1 is described above, but mutual authentication processing between other devices of the communication system 100, such as the information processing terminal 111-1-2, information processing terminal 111-2-1, IC card 112-2, and so forth, are similarly executed.

Thus, the storage unit 131 of the IC card 112 has an application ID provided thereto for each directory, and each ID is arranged so as to only be presented to a respectively corresponding valid service provider. Thus, the privacy of the user can be protected. That is to say, for example in the case that there is only one ID unique to the IC card, the same ID is read out at all valid information processing terminals (regardless of the service provider), whereby there has been a problem that the location of the user could be tracked by tracking the ID thereof.

However, with the communication system 100, the method herein assigns an ID (within a directory) to the user for each service provider, and further, the ID thereof encrypts and replies with a key that can only be known to the assigned service provider. Therefore, other service providers cannot decrypt the ID. That is to say, a service provider can only authenticate a user that is one's own customer, but cannot authenticate other customers, whereby tracking, including other customers, can be prevented.

Also, an individual key authentication technique far more excellent than common key authentication is introduced, while assuming access to multiple directories and using a master key to degenerate the directory key and the like according to the access destination directory, whereby processing can be performed with only one authentication sequence. Thus, authentication processing time can be greatly reduced.

Further, with the communication system 100, the ID of the information processing terminal 111 is used for authentication processing, so even if the information processing terminal 111 is analyzes and an invalid information processing terminal 111' is created, the ID of the information processing terminal 111' becomes the same as the information processing terminal 111, so by saving the ID thereof on the IC card 112 side as an ID to be revoked, the IC card 112 can prevent access by the information processing terminal 111'. That is to say, the communication system 100 (information processing terminal 111 and IC card 112) can safely and quickly perform mutual authentication processing.

With the above description, the mutual authentication is completed. Upon the mutual authentication completing, the information processing terminal 111 accesses a file written in the IC card 112. The file access method will be described. Note that multiple main components are shown with the present example but these are the same, so only the information processing terminal 111-1-1 and IC card 112-1 for service provider 1 are defined but it goes without saying that there may be other service providers, other information processing terminals 111, and other IC cards 112. Also, in a case that there is no misunderstanding, the information processing terminal 111-1-1 may be referenced as information processing terminal 111, and the IC card 112-1 may be referenced as IC card 112.

In order for the information processing terminal 111-1-1 to access a file, a file access license must be obtained from the IC card 112-1. A valid information processing terminal 111 has an access license ticket distributed therein which includes information used for an access license. The information processing terminal 111-1-1 requests a file access license by presenting the access license ticket to the IC card 112-1. The IC card 112-1 verifies the access license ticket, and if valid, provides an access license.

Next, the information relating to access control such that the information processing terminal 111-1-1 and IC card 112-1 each has will be described with reference to FIG. 21. In the example in FIG. 21, the storage unit 121-1-1 of the information processing terminal 111-1-1 has written therein an ID (ID1-1) of the information processing terminal 111, a key (K1-1) unique to the information processing terminal, a master key (MK1-IC) for all IC cards 112 by the service provider 1, and an access license ticket (Ticket1-1) assigned to the information processing terminal 111-1-1.

The storage unit 131-1 of the IC card 112-1 has first data ($K_{System}$), third data ($K_{System2}$), root key ($K_{Root}$) written therein. The third data ($K_{System2}$) is basically similar to the first data ($K_{System}$) but becomes the system key for a access license ticket generating key that is assigned by the system administrator. That is to say, the IC card 112 has two system keys registered therein which are the system key ($K_{System}$) for the authentication key and the system key ($K_{System2}$) for the access license ticket generating key. The formats of the two system keys herein are optional, and for example the encryption algorithm or key length may mutually differ, or may be coordinated. Also, the values of each system key may be independently determined, or one may be computed from the other whereby one of the system keys is not saved in the memory.

A directory 1-1 and directory 1-2 are further created in the storage unit 131-1 of the IC card 112-1. The directory 1-1 has a directory key (Dir1-1), application ID (AppID1-1), and application key (AppK1-1) written therein, and further, a file (File1) and access control keys (ACK1-1 and ACK1-2) to define the access method as to such file (File1) are written therein.

The access control key is to set permission as to the file as appropriate, and is key information to limit the operations as to the file by an accessing person such as reading/writing. That is to say, the first access control key (ACK1-1) is key information for permitting access with an access method 1-1 as to the file (File1), and the second access control key (ACK1-2) is key information for permitting access with an access method 1-2 as to the file (File1).

Also, the directory 1-2 has a directory key (Dir1-2), application ID (AppID1-2), and application key (AppK1-2) written therein, and further, files (File2 and File3), access control keys (ACK2-1, ACK2-2, and ACK2-3) to define the access method as the first of such files (File2), and access control keys (ACK3-1 and ACK3-2) to define the access method as the second file (File3) are written therein.

Figure 21:
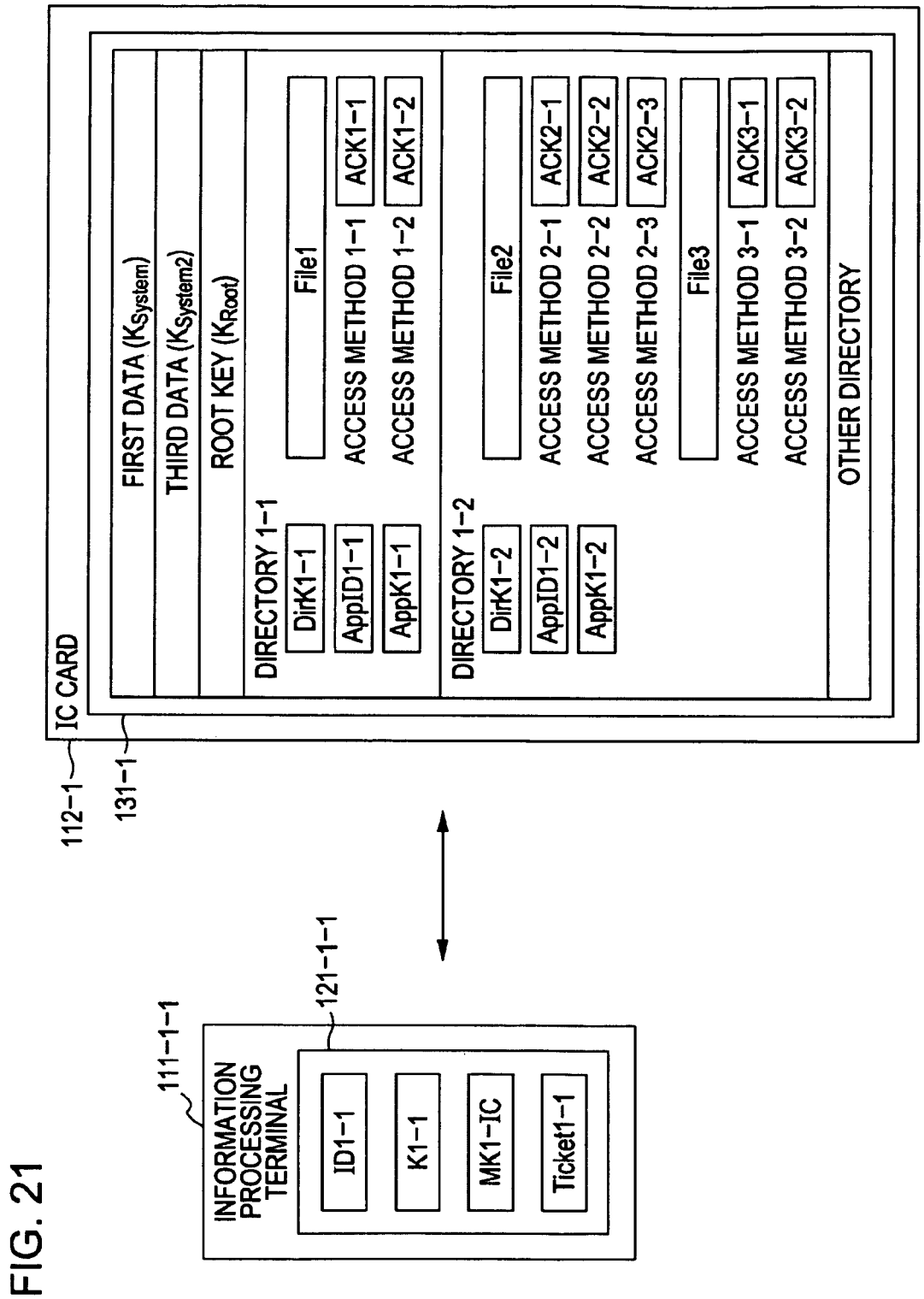
FIG. 21 is a diagram illustrating another example of information held by each device.

FIG. 22 shows a configuration example of the access control ticket (Ticket1-1) shown in FIG. 21. Described in an access license ticket 201 is an ID (ID1-1) of the information processing device 111-1-1 serving as information indicating the user of the ticket, a list of access codes (access code: 1-2, access code: 2-2, access code: 2-3, and access code: 3-1) indicating the access destination file and access method (i.e. access control key), and a check digit made up of a MAC.

That is to say, the information processing terminal 111-1-1 requesting a file access license transmits the access permission ticket 201 indicating who will perform what type of processing as to which file, to the IC card 112-1, and the IC card 112-1 verifies the access license ticket 201, and if valid, licenses the access method requested with the ticket.

Figure 24:
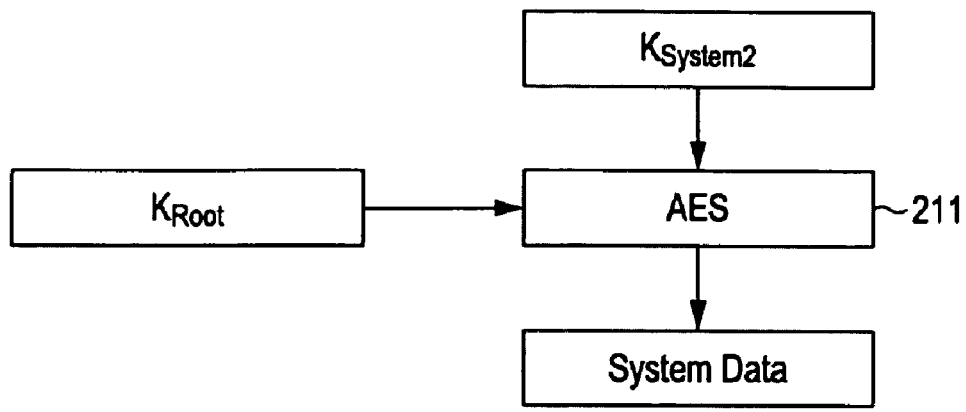
FIG. 24 is a functional block diagram to describe a detailed configuration example of a file access processing unit.
Figure 25:
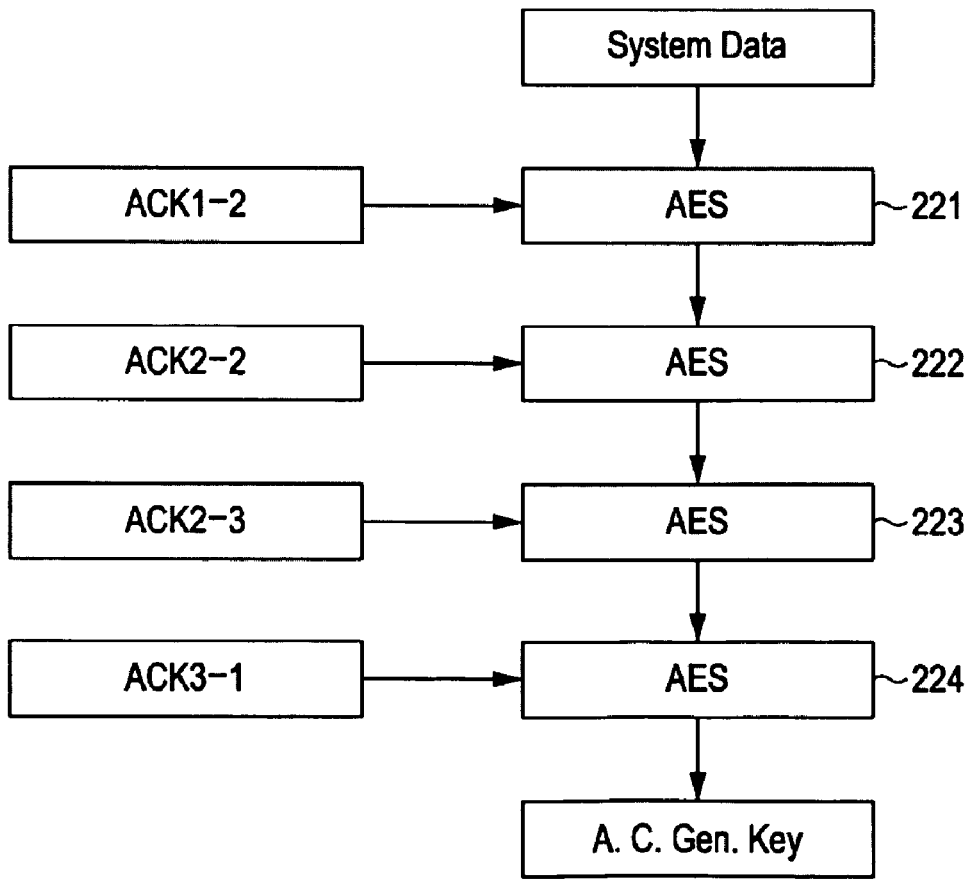
FIG. 25 is a functional block diagram to describe a detailed configuration example of an access license ticket generating key generating unit.

An example of flow of such access control processing will be described with reference to the flowchart in FIG. 23. FIGS. 24 and 25 will be referenced in the description as appropriate.

A file access processing unit 124 of the information processing device 111-1-1 requesting an access license controls the communication unit 128 in step S201 to issue a file permission command including an access license ticket (Ticket 1-1) as to the IC card 112-1. At this time, the command text may be encrypted with the session key. The communication unit 138 of the IC card 112-1 obtains the file permission command thereof in step S211.

Upon obtaining the file permission command, in step S212 the file access processing unit 134 of the IC card 112-1 verifies the ID of the user of the ticket described in the access license ticket (Ticket1-1). The information processing terminal 111-1-1 (ID1-1) has already been authenticated with the mutual authentication processing, so the file access processing unit 134 verifies whether the user ID described in the access license ticket (Ticket1-1) matches the already-authenticated ID, and only in the case that the IDs match is the user of the access license ticket (Ticket1-1) authenticated. In the case that the ID of the user of the access license ticket (Ticket1-1) does not match the already-authenticated ID, the file access processing unit 134 force-quits the access control processing, and denies the access license request. Thus, even if another information processing terminal ticket is invalidly used, access is denied.

Note that an arrangement may be made wherein, regardless of the already-authenticated ID, a special ID to license the user of the access control ticket (almighty ID) is provided. For example, a predetermined ID can be set as the almighty ID, and in the case that the ID of the user of the access license ticket is the almighty ID, the file access processing unit 134 of the ID card 112 only has to authenticate the user, regardless of whether or not the ID matches the already-authenticated ID. That is to say, the almighty ID is described as the ID of the user, whereby the access control ticket becomes a ticket that can be used with any information processing terminal 111.

Upon authenticating the user of the access control ticket (Ticket1-1), in step S213 the file access processing unit 134 confirms whether or not the access code described in the access control ticket (Ticket1-1) is of the already-authenticated directory as an access destination of the information processing terminal 111-1-1 with the mutual authentication processing. In the case that a access code for a directory other than the directory specified at the time of mutual authentication is included (i.e. in the case that access to a directory other than the directory specified at the time of mutual authentication is requested), the file access processing unit 134 force-quits the access control processing, and denies the access license request.

In the case that the access code described in the access control ticket (Ticket1-1) is of the already-authenticated directory as an access destination of the information processing terminal 111-1-1 with the mutual authentication processing, the file access processing unit 134 continues access control processing. Note that in the case that the access code for the already-authenticated directory and an access code for a directory not yet authenticated are both included, an arrangement may be made wherein the file access processing unit 134 force-quits the access control processing and denies the access license request, or only the access code of the directory not yet authenticated may be denied, and processing continued as to the access code for the already-authenticated directory.

In step S214, the file access processing unit 134 encrypts the third data ($K_{System}$) with the root key ($K_{Root}$) to generate a fourth data (System Data).

As shown in FIG. 24, the file access processing unit 134 has a function block of an encrypting processing unit (AES) 211. The encrypting processing unit (AES) 211 controls the encrypting unit 136 to encrypt the system key ($K_{System2}$) with the root key ($K_{Root}$) as third data by AES, and generates the fourth data (System Data). Note that the encrypting processing unit (AES) 211 may use another common key encryption method such as DES or the like, instead of AES.

Also, data that differs from the first data is used here, but the first data may be used. Note that the fourth data may be calculated beforehand and stored in the storage unit 131. In such a case, the processing in step S214 is omitted.

In step S215, the access license ticket generating unit 142 of the file access processing unit 134 performs processing to create an access license ticket generating key to compute the check digit (MAC) of the access license ticket from the fourth data. The access license ticket generating key generating unit 142 reads all of the access control keys corresponding to the access code described in the access control ticket (Ticket1-1) from the storage unit 131-1, and encrypts the fourth data in sequence using the keys herein.

In the case of the example in FIG. 22, an access code: 1-2, access code: 2-2, access code: 2-3, and access code: 3-1 are described in the access control ticket (Ticket-1). Accordingly, the access license ticket generating key generating unit 142 obtains ACK1-2, ACK2-2, ACK2-3, and ACK3-1 from the storage unit 131-1.

In this case, as shown in FIG. 25, the access license ticket generating key generating unit 142 has a function block of an encrypting processing units (AES) 221 through 224. The encrypting processing unit (AES) 221 controls the encrypting unit 136 to encrypt the fourth data (System Data) with the AES method, using ACK1-2. The encrypting processing unit (AES) 222 controls the encrypting unit 136 to encrypt the encryption results from the encrypting processing unit (AES) 221 with the AES method, using ACK2-2. The encrypting processing unit (AES) 223 controls the encrypting unit 136 to encrypt the encryption results from the encrypting processing unit (AES) 222 with the AES method, using ACK2-3. Further, the encrypting processing unit (AES) 224 controls the encrypting unit 136 to encrypt the encryption results from the encrypting processing unit (AES) 223 with the AES method, using ACK3-1, and generates an access license ticket generating key (A.C.Gen.Key). Note that with the encrypting processing units (AES) 221 through 224, instead of AES, another common key encrypting method may be used, such as DES or the like. Note that another method of access license ticket generating key generating processing will be described later (see FIG. 26).

Upon the access license ticket generating key being generated, in step S216 the file access processing unit 134 calculates the check digit (MAC value) of the access license ticket using the access license ticket generating key (e.g. uses a CBC mode of encryption mode).

In step S217, the file access processing unit 134 compares the generated check digit value with the check digit value of the access license ticket (Ticket1-1), and verifies the access license ticket (Ticket1-1). In the case that the generated check digit value does not match the check digit value described in the access license ticket (Ticket1-1), the file access processing unit 134 determines that the license ticket (Ticket1-1) is invalid (tampered), force-quits the access control processing, and denies the access license request. In the case that the values match, the file access processing unit 134 determines that the license ticket (Ticket1-1) is valid, and performs authentication.

To say that the ticket is valid is to say that the access license ticket generating key that generates the MAC value is correctly generating, i.e. there is a high probability that the service provider who knows all of the access control keys as to the third data, root key, and access method has generated the ticket. Also, this is to say that the information processing terminal is owned by a valid service provider.

Accordingly, the file access processing unit 134 permits file access according to the access license ticket (Ticket1-1), and in step S218 supplies a notification response to this effect to the information processing terminal 111-1-1 at the request source.

The communication unit 128 of the information processing terminal 111-1-1 obtains the response thereof in step S202. The file access processing unit 124 accesses the file in accordance with the access method for which an access license is obtained. For example, in the case that the access method 1-1 is read/write for File 1 and the access method 1-2 is read-only, even if a reading command for the FIG. 1 may be received at the IC card 112-1 from the information processing terminal 111-1-1, a rewriting command is rejected. Thus, multiple access controls can be set as to each file, whereby various types of usage methods can be safely realized.

Figure 26:
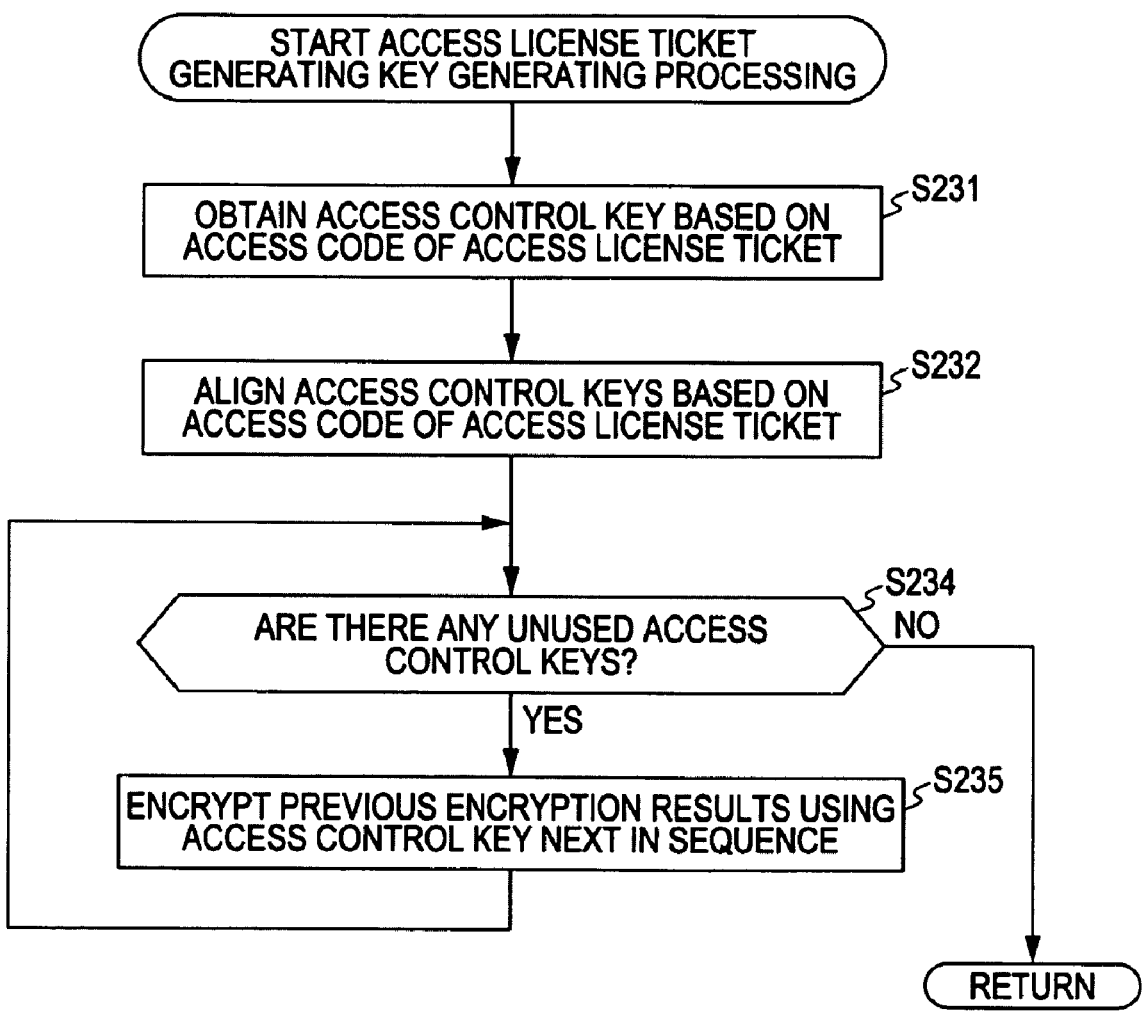
FIG. 26 is a flowchart to describe a flow example of access license ticket generating key generating processing.

Next, an example of flow of the access license ticket generating key generating processing executed in step S215 in FIG. 23 will be described with reference to the flowchart in FIG. 26. Note that hereafter a case of executing with the IC card 112-1 will be described, but the description below can be applied to the case of executing with other IC cards 112.

Upon the access license ticket generating key generating processing being started, in step S231 the access license ticket generating key generating unit 142 references a list of access codes described in the access license ticket (Ticket1-1) and obtains an access control key corresponding to the access code included in such list from the storage unit 131-1.

Upon obtaining the access control key, in step S232 the access license ticket generating key generating unit 142 arrays the obtained access control keys in the same sequence as the access code list described in the access license ticket (Ticket1-1).

In step S234, the access license ticket generating key generating unit 142 determines whether or not any unused access control keys exist in the obtained access control keys, and in the case determination is made that an unused key exists, the processing is advanced to step S235, and the encrypting unit 136 is controlled to further encrypt the encryption results from the previous time using the access control key that is next in the sequence. Note that in the case of the first encryption, the access license ticket generating key generating unit 142 controls the encrypting unit 136 to encrypt the fourth data (System Data) with the initial access control key. Upon the encryption ending, the access license ticket generating key generating unit 142 returns the processing to step S234. That is to say, by repeating the steps S234 and S235, the access license ticket generating key generating unit 142 generates an access license ticket generating key by degenerating all of the obtained access control keys in the arrayed sequence thereof.

Figure 23:
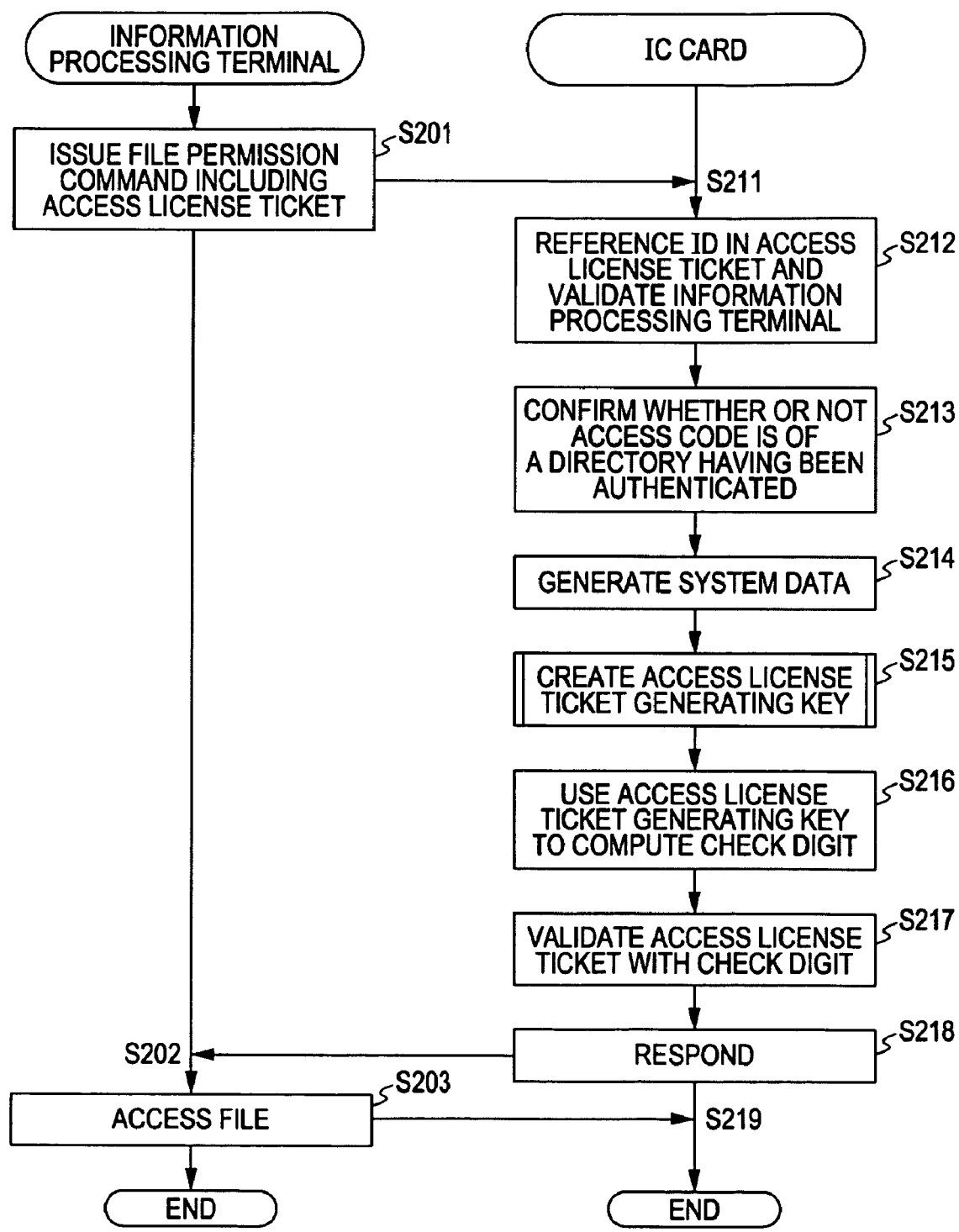
FIG. 23 is a flowchart to describe an example of a flow of the access control processing.

In the case determination is made in step S234 that no unused access control keys exist, the access license ticket generating key generating unit 142 ends the access license ticket generating key generating processing, returns the processing to step S215 in FIG. 23, and executes the processing thereafter.

By thus degenerating the access control keys and generating access license ticket generating keys, the file access processing unit 134 can perform verification of the access control ticket (Ticket1-1) more accurately and at a higher speed. That is to say, validation verification can be performed with multiple keys as to the access license ticket regulated with multiple file access methods, thereby preventing a decrease in security level, suppressing delays by repeating the transmission/reception of data multiple times via the communication path, and enabling verification at a high speed.

Note that with the access control processing in FIG. 23, description is given such as, in the case that the access code described in the access license ticket (Ticket 1-1) is not of the directory already authenticated in step S213, the file access processing unit 134 of the IC card 112-1 denies the license request, but should not be limited to this, and an arrangement may be made wherein license is given regarding of whether the access code described in the access license ticket (Ticket 1-1) is of the directory already authenticated or not. For example, in the case wherein another service provider has to have access to a file it is managing itself, licensing access thereto is more convenient. In this case, the processing in step S213 is omitted.

Also, description is given above such that two types of system keys which are an authentication key and access license ticket generating key are prepared. As described above, a directory key (DirK) is used when generating access license ticket generating key for another service provider. If the third data is the same as the first data, a state occurs in the access license ticket generating key generating processing that is partially similar to the master key generating processing of the information processing terminal 111. A case may be supposed wherein, while the ACKs are constantly connected, for example the service provider 1 encrypts the fourth data with the DirK1-1, hands an intermediate value thereof to a service provider 2, and the service provider 2 encrypts this with the access control key of the service provider 2, after which the data is handed back to the service provider 1 and encrypted with the access control key of the service provider 1. In such a case, if the second data is used instead of the fourth data, the service provider 2 can result in obtaining the master key of the service provider 1.

Accordingly, in order to avoid such a case, encrypting with the access control key (ACK) after the directory key (DirK) is desirable. Also, it is desirable for the source data (first data) at the time that the master key and authentication key are generated, and the source data (third data at the time that the access license ticket generating key is generated are mutually different.

With the second method described above also, when executing processing similar to that of the first method upon obtaining an access license, simultaneous writing can be assured. That is to say, the file configuration is made as with the case of the first method, and for example the file 1 (File1) is an electronic money saving region, file 2 (File2) is a ticket saving region, and file 3 (File3) is a history saving region, whereby the remaining amount is subtracted from the file 1 with a writing command, ticket information is written in the file 2, and simultaneously history is written in the file 3. At this time, the communication system 100 can perform the above-described processing while securing consistency of data between the files, as with the first method.

Next, mutual authentication and access control method to assure simultaneous writing for a system wherein the first method and second method are mixed (a system wherein two regions co-exist that have different authentication methods and access control methods) will be described.

With the above-described first method, the authentication processing is the access control without change. That is to say, the information processing terminal can pass access control simply if the key is used to pass authentication. Conversely with the above-described second method, the authentication processing and access control differs. Thus, in the case of simultaneously accessing a region managing the first method and second method, basically the second method is employed, and in the event of generating the access license ticket generating key thereof, the service keys with the first authentication method (keys K1 through K3) are also used. However, the key bit length differs between the first method and second method, whereby the smaller key is set to match the longer key (modify the key information). For example, in the case that the key bit length of the first method key is 64 bits and the key bit length of the second method key is 128 bits, fixed data (e.g., 0) worth 64 bits is added to the upper level of the first method key, thereby creating an overall 128 bits.

Thus, in the event of generating (degenerating) the access license ticket generating key, the first method service key and second method access control key are used together. However, the second method is employed for the authentication method. Thus, a secure path with authentication can be created, and the key authentication with access control can be made with both the first method and second method. Thus, both services can be completed with one writing command.

Specific description will be given below. Note that an entity is the same as the case of the above-described communication system 1 and communication system 100.

Figure 27:
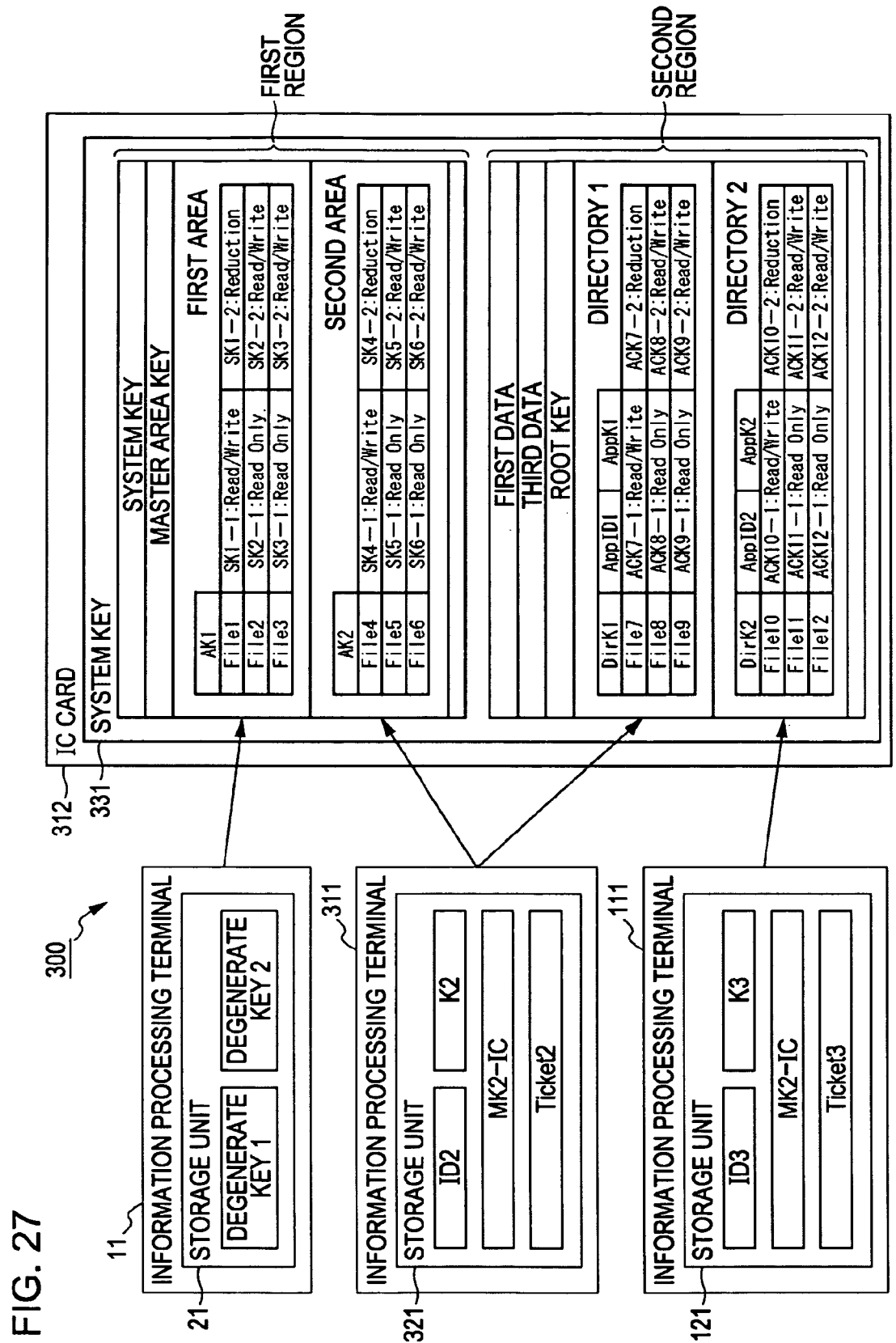
FIG. 27 is a diagram illustrating information which each device has of a communication system to which the present invention is applied.

FIG. 27 is a diagram illustrating a configuration example of the communication system to which the present invention is applied. In FIG. 27, similar to the above-described communication system 1 and communication system 100, a communication system 300 is a system wherein the information processing terminal and IC card having a communication function mutually communicate. The communication system 300 has the above-described information processing terminals 11 and 111, as well as an information processing terminal 311 and IC card 312.

The IC card 312 is basically a device similar to the above-described IC cards 12 and 112, and is a card-shaped device wherein an IC chip, loop antenna, or the like is embedded that has a non-volatile memory or communication circuit built therein, for example, and is a so-called non-contact type IC card which performs near-distance wireless communication with the information processing terminal 111 where the communicable range is roughly 10 cm, and exchanges information therewith. However, a storage unit 331 has a first region to perform authentication processing and access control with the first method, and a second region to perform authentication processing and access control with the second method.

The first region has a system key and master area key written therein, and further is formed into a first area and second area. An area key (AK1) and 3 files (File1, File2, and File3) are written in the first area. A service key (SK1-1) for permitting both reading and writing (Read/Write) serving as a service key for the file 1 (File1), and a service key (SK1-2) for permitting reduction processing (Reduction) are further written in the first area. A service key (SK2-1) for permitting reading only (Read Only) serving as a service key for the file 2 (File2), and a service key (SK2-2) for permitting both reading and writing (Read/Write) are further written in the first area. A service key (SK3-1) for permitting reading only (Read Only) serving as a service key for the file 3 (File3), and a service key (SK3-2) for permitting both reading and writing (Read/Write) are further written in the first area.

An area key (AK2) and 3 files (File4, File5, and File6) are written in the second area. A service key (SK4-1) for permitting both reading and writing (Read/Write) serving as a service key for the file 4 (File4), and a service key (SK4-2) for permitting reduction processing (Reduction) are further written in the second area. A service key (SK5-1) for permitting reading only (Read Only) serving as a service key for the file 5 (File5), and a service key (SK5-2) for permitting both reading and writing (Read/Write) are further written in the second area. A service key (SK6-1) for permitting reading only (Read Only) serving as a service key for the file 6 (File6), and a service key (SK6-2) for permitting both reading and writing (Read/Write) are further written in the second area.

The first data, third data, and root key are written in the second region, and further a directory 1 and directory 2 are formed therein. A directory key (DirK1), application ID (AppID1), and application key (AppK1), along with 3 files (File7, File8, and File9) are written in the directory 1. An access control key (ACK7-1) for permitting both reading and writing (Read/Write) serving as an access control key for the file 7 (File7), and an access control key (ACK7-2) for permitting reduction processing (Reduction) are further written in the directory 1. An access control key (ACK8-1) for permitting reading only (Read-Only) serving as an access control key for the file 8 (File8), and an access control key (ACK8-2) for permitting both reading and writing (Read/Write) are further written in the directory 1. An access control key (ACK9-1) for permitting both reading only (Read-Only) serving as an access control key for the file 9 (File9), and an access control key (ACK9-2) for permitting both reading and writing (Read/Write) are further written in the directory 1.

A directory key (DirK2), application ID (AppID2), and application key (AppK2), as well as 3 files (File10, File11, and File12) are written in the directory 2. An access control key (ACK10-1) for permitting both reading and writing (Read/Write) serving as an access control key for the file 10 (File10), and an access control key (ACK10-2) for permitting reduction processing (Reduction) are further written in the directory 2. An access control key (ACK11-1) for permitting reading only (Read-Only) serving as an access control key for the file 11 (File1), and an access control key (ACK11-2) for permitting both reading and writing (Read/Write) are further written in the directory 2. An access control key (ACK12-1) for permitting reading only (Read-Only) serving as an access control key for the file 12 (File12), and an access control key (ACK12-2) for permitting both reading and writing (Read/Write) are further written in the directory 2.

In order to access the data in the first region of the storage unit 331 of the IC card 312, authentication has to be performed with a service key is (authenticating that a user has or knows a service key). If the service key and file access method correspond one-to-one, and authentication with the degenerating key including a certain service key (SK) succeeds, the access method assigned to such service key (SK) is licensed.

Also, in order to access the second region of the storage unit 331 of the IC card 312, after mutual authentication, an access license ticket has to be presented. The MAC value appended to the access license ticket herein is created with an access license ticket generating key, and the access license ticket generating key encrypts (degenerates) the fourth (encrypts the third data with the root key) with the access control key (ACK), and is generated. Accordingly, a valid access license ticket being presented can be seen as a user who has or knows an access control key (ACK) having created the access license ticket generating key, whereby the file access method corresponding to the access control key (ACK) is licensed. From the above points, the functions of the access control key (ACK) and service key (SK) are the same.

The information processing terminal 11 is a terminal to access only the first region of the IC card 312, and two degenerating keys (degenerating key 1 and degenerating key 2) are written in the storage unit 21 thereof. The degenerating key 1 encrypts the system key (equates to the first data of the second region) with the master area key (equates to the root key of the second region), and result thereof is sequentially encrypted with the two area keys (AK1 and AK2) at the access destination. The degenerating key 2 is a key that the degenerating key 1 is further encrypted with 3 service keys (SK1-2, SK2-2, and SK4-1).

If we say that File 1 stores the electronic money, File 2 stores the ticket information, and File 4 stores the history, by performing mutually authentication with the above-described two degenerating keys (degenerating key 1 and degenerating key 2) the information processing terminal 11 can perform reduction processing from File 1, can write a ticket in File 2, and can retain history in File 4.

The information processing terminal 111 is a terminal to access only the second region of the IC card 312, and an ID (ID3) of the information processing terminal 111, a key (K3) unique to the information processing terminal 111, a master key (MK2-IC) for the IC card 312, and an access license ticket (Ticket3) assigned to the information processing terminal 111 is written in the storage unit 121.

At the time of mutual authentication, the IC card 312 encrypts the first data with the root key and generates the second data, encrypts this with the DirK1 and DirK2 which are directory keys, and generates a master key (MK2-IT) of the information processing terminal 111. The IC card 312 can further generate a key (K3) of the information processing terminal 111 by using the master key (MK2-IT) of the information processing terminal 111 and ID (ID3) of the information processing terminal 111. The IC card 312 encrypts the application IDs (AppID1 and AppID2) of the directory that the information processing terminal 111 accesses with the key (K3) of the information processing terminal 111 and replies. Also, the IC card 312 encrypts the key (K3) of the information processing terminal with the application keys (AppK1 and AppK2) of the directory that the information processing terminal 111 accesses, and generates an authentication key. The information processing terminal 111 decrypts the application IDs (AppID1 and AppID2) that have been sent with the key (K3) of the information processing terminal 111 and encrypts the application IDs (AppID1 and AppID2) with a master key (MK2-IC) for the IC card 312 to generate the application keys (AppK1 and AppK2). An authentication key is then generated using the key (K3) of the information processing terminal 111 and application keys (AppK1 and AppK2), and performs mutual authentication. After mutual authentication, the information processing terminal 111 presents the access license ticket (Ticket3). A MAC value is stored in the access license ticket. The IC card 312 encrypts the third data with the root key and further encrypts the access control keys (ACK7-2, ACK8-2, and ACK10-1) sequentially, thereby generating the access license ticket generating key.

Note that at this time, if the same functions are assigned to each of File 7, File 8, and File 10, as with the above-described File 1, File 2, and File 4, processing similar to the case of the first region as described above can be performed.

The information processing terminal 311 is a device basically similar to the above-described information processing terminal 11 and information processing terminal 111, and is an information processing device having a reading/writing function of the IC card 312 such as a train station turn stile or a vending machine, supplies and stores information in the IC card 312, and reads the information stored in the IC card 312.

The information processing terminal 311 is a terminal to access both the first region and second region of the storage unit 331 of the IC card 312, and an ID (ID2) of the information processing terminal 111, key (K2) unique to the information processing terminal 311, master key (MK2-IC) for the IC card 312, and the access license ticket (Ticket2) assigned to the information processing terminal 311 are written in the storage unit 321.

A method of authentication processing and access control for the information processing terminal 311 to access both the first region and second region of the storage unit 331 of the IC card 312 will be specifically described below.

First, the function blocks that each of the information processing terminal 311 and IC card 312 has will be described. FIG. 28 is a function block diagram illustrating a configuration example of the function blocks that each of the information processing terminal 311 and IC card 312 has.

As shown in FIG. 28, the information processing terminal 311 has basically the same configuration as the information processing terminal 111, and has a storage unit 321, authentication processing unit 323, file access processing unit 324, random number generating unit 325, encrypting unit 326, decrypting unit 327, and communication unit 328. The storage unit 321 is made up of a non-volatile memory device such as a flash memory or hard disk, and stores various types of information such as an ID and encryption key. The authentication processing unit 323 is made up of a computing processing device such as a CPU for example, and performs authentication processing to mutually authenticate the information processing terminal 311 and IC card 312 in the event of starting communication therebetween. The file access processing unit 324 is made up of a computing processing device such as a CPU for example, and performs processing to request file access license as to the IC card 312 that has performed mutual authentication. The random number generating unit 325 is made up of a computing processing device such as a CPU for example, and generates the random number used for authentication processing or the like. The encrypting unit 326 is made up of a computing processing device such as a CPU for example, and encrypts the information supplied to the IC card 312 via the communication unit 328 as appropriate. The decrypting unit 327 is made up of a computing processing device such as a CPU for example, and decrypts the encrypted information that is supplied from the IC card 312 via the communication unit 328, as appropriate. The communication unit 328 is made up of an IC chip or loop antenna including a communication circuit or the like, performs near-distance wireless communication with the IC card 312 positioned within a communicable range, and exchanges information therewith. It goes without saying that the information processing terminal 311 may have a functional block other than these.

Note that in FIG. 28, illustrations of arrows are omitted, but the authentication processing unit 323 and file access processing unit 324 perform information exchange also with the random number generating unit 325, encrypting unit 326, and decrypting unit 327, as appropriate.

The IC card 312 has basically the same configuration as the IC card 112, and has a storage unit 331, data setting processing unit 332, common key authentication processing unit 333A, authentication processing unit 333B, file access processing unit 334, random number generating unit 335, encrypting unit 336, decrypting unit 337, and communication unit 338. The storage unit 331 is made up of a non-volatile memory device such as a flash memory or hard disk, and stores various types of information such as information supplied from an external device such as the information processing terminal 311. The data setting processing unit 332 is made up of a computing processing device such as a CPU for example, and based on commands and information supplied from a device that is external to the IC card 312, performs data setting processing such as creating directories and files in the storage region of the storage unit 331, and writing in the setting information such as key information, IDs, and the like.

The common key authentication processing unit 333A is made up of a computing processing device such as a CPU for example, and performs the authentication processing according to the first method as described above. Conversely, the authentication processing unit 33B is made up of a computing processing device such as a CPU for example, and performs the authentication processing according to the second method as described above. The authentication processing unit 333B has a master key generating unit 341 that generates a master key to generate a key unique to the information processing terminal 311. The file access processing unit 334 is made up of a computing processing device such as a CPU for example, and performs processing relating to access control to a file written in the second region of the storage unit 331 by the information processing terminal 311. The file access processing unit 334 has an access license ticket generating key generating unit 342 to generate an access license ticket generating key which is key information that can create information similar to an access license ticket, in order to perform verification of such access license ticket supplied from the information processing terminal 311.

The random number generating unit 335 is made up of a computing processing device such as a CPU for example, and generates a random number used for authentication processing and so forth. The encrypting unit 336 is made up of a computing processing device such as a CPU for example, and encrypts the information supplied to the information processing terminal 311 via the communication unit 338 as appropriate. The decrypting unit 337 is made up of a computing processing device such as a CPU for example, and decrypts the encrypted information supplied from the information processing terminal 311 via the communication unit 338, as appropriate. The communication unit 338 is made up of an IC chip or loop antenna including a communication circuit or the like, performs near-distance wireless communication with the information processing terminal 311 positioned within communicable range, and exchanges information therewith. It goes without saying that the IC card 312 may have a functional block other than these.

Note that in FIG. 28, illustrations of arrows are omitted, but the data setting processing unit 332, authentication processing unit 333A, authentication processing unit 333B, and file access processing unit 334 perform information exchange also with the random number generating unit 335, encrypting unit 336, and decrypting unit 337, as appropriate.

Figure 29:
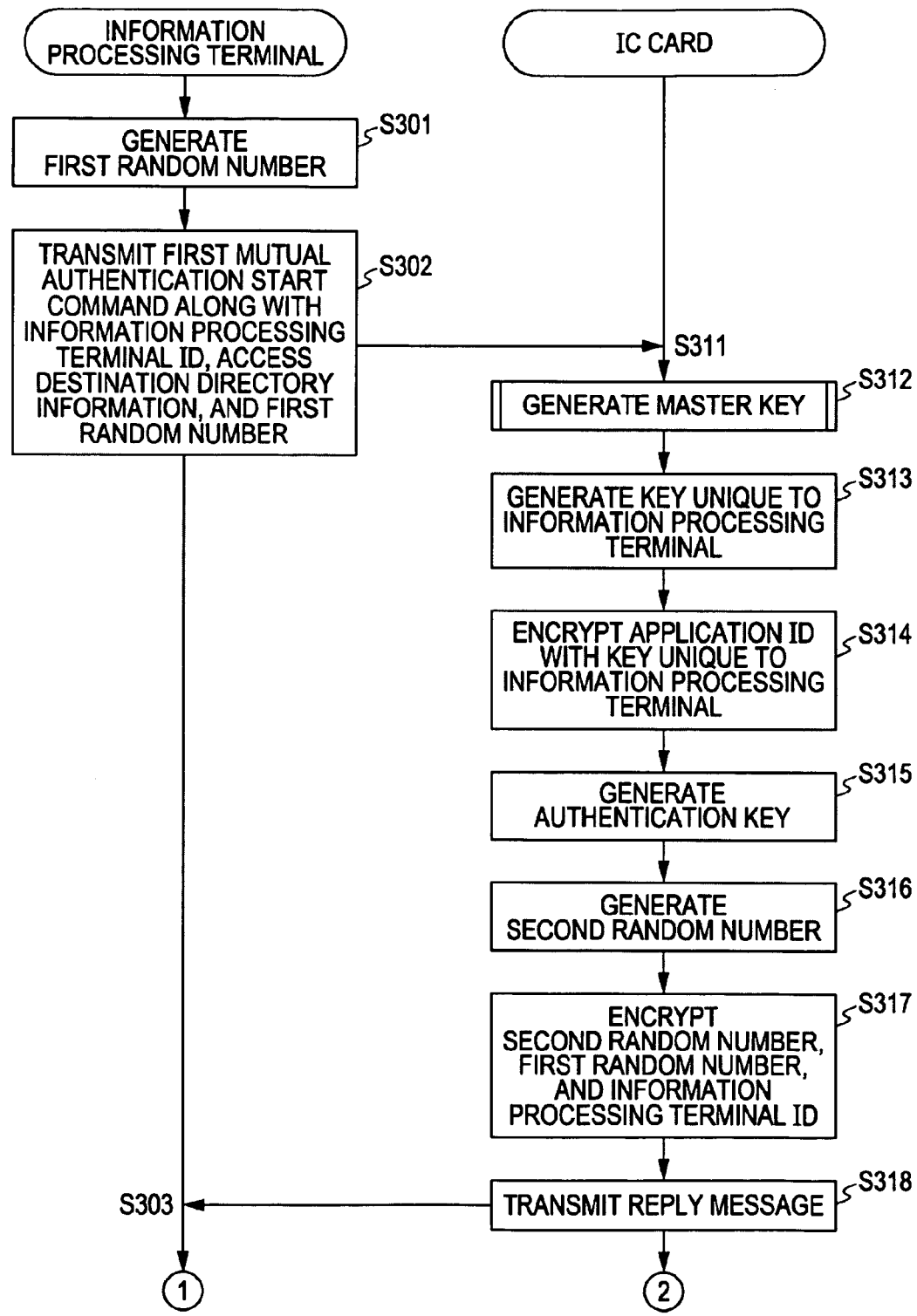
FIG. 29 is a flowchart to describe a configuration example of flow of mutual authentication processing and access control processing.

Next, an example of flow of the mutual authentication processing and access control processing in the event of the information processing terminal 311 accessing both the first region and second region of the IC card 312 will be described with reference to the flowchart in FIGS. 29 through 31. Note that as a specific example, the case of the information processing terminal 311 moving a value from the electronic money in File 7 of the IC card 312 to the electronic money in File 1 will be described.

Upon mutual authentication processing starting, in step S301 the authentication processing unit 323 of the information processing terminal 311 controls the random generating unit 325 to generate the first random number and in step S302 controls the communication unit 328 to transmit the first mutual authentication start command along with the ID (ID2) of the information processing terminal 311, access destination directory information (directory 1), and first random number, to the IC card 312.

In step S311, the communication unit 338 of the IC card 312 obtains the first mutual authentication starting command or the like. Upon obtaining the first mutual authentication starting command, the master key generating unit 341 of the authentication processing unit 333B encrypts the first data with the root key to create the second data, and further encrypts the second data thereof with the directory key (DirK1) to generate the master key (MK2-IT) of the information processing terminal 311. The detailed flow of the master key generating processing is similar to the case described with reference to the flowchart in FIG. 20, so the description is omitted here.

Upon the master key being generated, in step S313 the authentication processing unit 333B controls the encryption unit 336 to encrypt the ID (ID2) of the information processing terminal 311 using the master key (MK2-IT), and generates the key (K2) unique to the information processing terminal 311. In step S314, the authentication processing unit 333B controls the encryption unit 336 to encrypt the application ID (AppID1) of the access destination directory (directory 1) with the key (K2) unique to the information processing terminal 311, thereby creating the first reply message. At this time, the usage sequence of application IDs (AppID) follows the access destination directory information supplied from the information processing terminal 311. Let us say that the encryption method at this time is an encryption mode such as CBC mode or the like. Also, with the present example, encryption is described, but decryption may be used. In this case, encryption using the same key has to be performed at the information processing terminal 311 side that the first reply message is received.

Upon generating the first reply message, in step S315 the authentication processing unit 333B performs generation of the authentication key ($K_{Auth}$) used for mutual authentication. The authentication processing unit 333B controls the encrypting unit 336 to encrypt a key (K2) unique to the information processing terminal 311 employing an application key (AppK1) of the access destination directory (directory 1) (i.e. degenerating the various keys) and generates the authentication key ($K_{Auth}$).

In step S316, the authentication processing unit 333B controls the random number generating unit 335 to generate the second random number. In step S317, the authentication processing unit 333B uses the key ($K_{Auth}$) as an encryption key and controls the encrypting unit 336 to encrypt the second random number, first random number, and ID (ID2) of the information processing terminal 311 with a predetermined encryption mode, and generate the second reply message. Note that the second random number, first random number, and ID (ID2) of the information processing terminal 311 are encrypted with a predetermined sequence that is determined beforehand.

Now, in the present example, the first reply message is encrypted and generated with the key (K2) unique to the information processing terminal 311, and the second reply message is encrypted and generated with the authentication key ($K_{Auth}$), but an arrangement may be made wherein the encrypted first reply message and the second reply message before encryption may be encrypted all at once with a predetermined encryption usage mode. Further, the ID (ID2) of the information processing terminal 311 is included in the second reply message, but data other than the ID of the information processing terminal 311 may be used.

In step S318, the authentication processing unit 333B controls the communication unit 338, and replies to the information processing terminal 311 with the first reply message and second reply message. Upon ending the processing step S318, the authentication processing unit 333B of the IC card 312 advances the processing to step S341 in FIG. 30.

Figure 30:
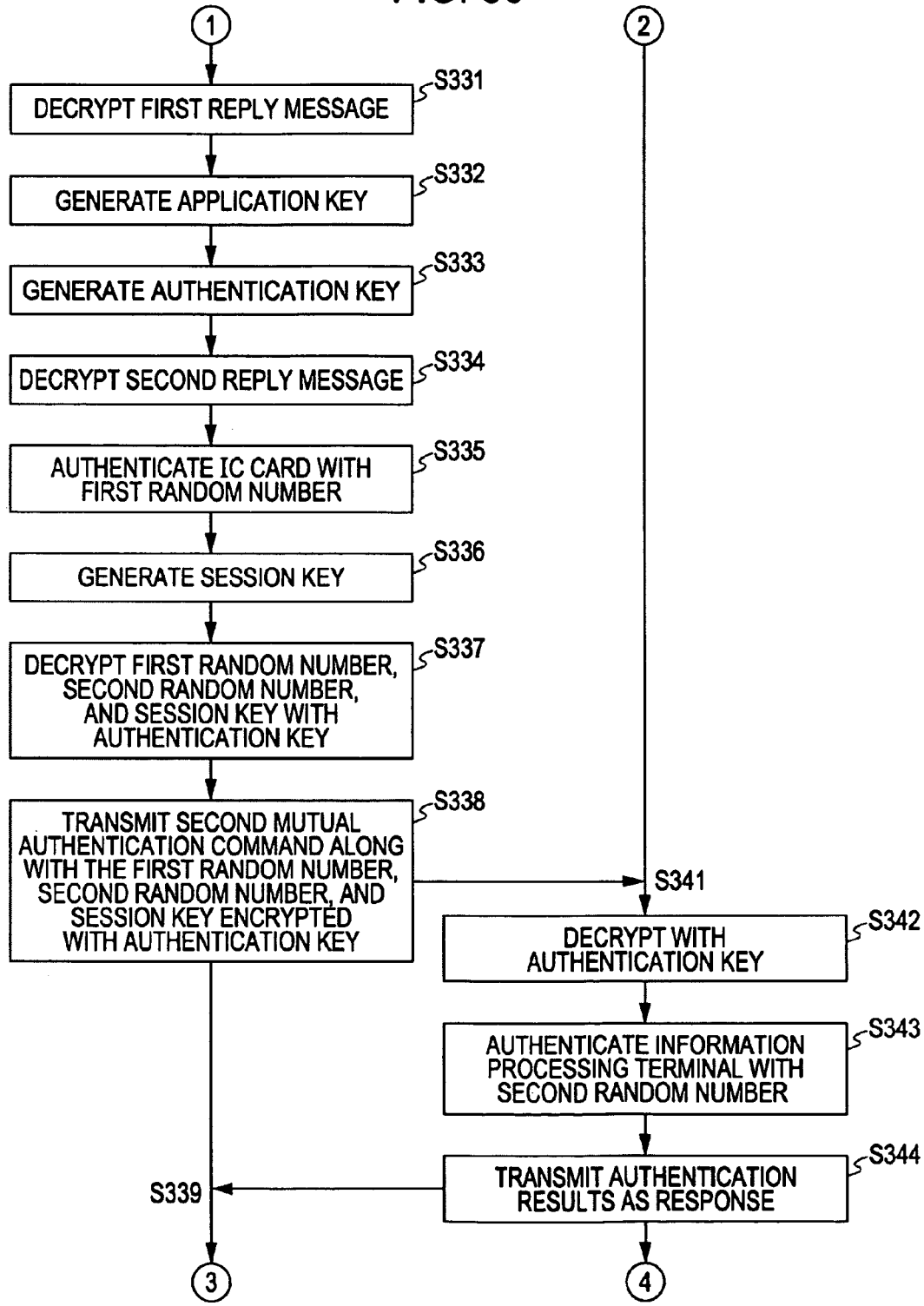
FIG. 30 is a flowchart continuing from FIG. 29 to describe a configuration example of flow of mutual authentication processing and access control processing.

Also, upon receiving the response thereof in step S303 (the first reply message and second reply message) the communication unit 328 of the information processing terminal 311 advances the processing to step S331 in FIG. 30.

In step S331 in FIG. 30, the authentication processing unit 323 of the information processing terminal 311 controls the decryption unit 327 to decrypt the first reply message with a decryption method corresponding to the encryption method used, using a key (K2) unique to the information processing terminal 311 stored in the storage unit 321 beforehand, and extract the application ID (AppID1). In step S332, the authentication processing unit 323 uses the master key (MK2-IC) stored in the storage unit 321 beforehand to encrypt the application ID (AppID1), thereby generating the application key (AppK1).

In step S333, the authentication processing unit 323 controls the encryption unit 326 to encrypt the key (K2) unique to the information processing terminal 311 using the application key (AppK1) generated in step S332 to generate the authentication key ($K_{Auth}$). In step S334, the authentication processing unit 323 controls the decrypting unit 327 to decrypt the second reply message obtained from the IC card 312, and extracts the second random number, first random number, and ID (ID2) unique to the information processing terminal 311.

In step S335, the authentication processing unit 323 performs authentication of the IC card 312 with the extracted first random number. The authentication processing unit 323 determines whether or not the first random number extracted from the second reply message matches the first random number generated in step S301 in FIG. 29, and in the case that the two first random number values match one other, the IC card 312 is authenticated. Conversely, in the case that the two first random number values do not match one other, the authentication processing unit 323 determines that the IC card 312 is invalid, and ends the mutual authenticating processing as an error.

Upon the two first random number values matching one other and the IC card 312 being authenticated, the authentication processing unit 323 controls the random number generating unit 325 in step S336 to generate a random number, and sets this random number as the session key. The session key is used for securing privacy in the communication path after the mutual authentication is completed. In step S337, the authentication processing unit 323 encrypts the first random number, second random number, and the generated session key with a predetermined encryption usage mode using the authentication key ($K_{Auth}$). In step S338, the authentication processing unit 323 controls the communication unit 328 to transmit the second mutual authentication command to the IC card 312 along with the first random number, second random number, and session key encrypted with the authentication key ($K_{Auth}$). In step S341, the communication unit 338 of the IC card 312 obtains the second mutual authentication command thereof and the first random number, second random number, and the session key encrypted with the authentication key ($K_{Auth}$).

In step S342, the authentication processing unit 333B of the IC card 312 controls the decrypting unit 337 to decrypt the first random number, second random number, and session key encrypted with the authentication key ($K_{Auth}$), using the authentication key ($K_{Auth}$). In step S343, the authentication processing unit 333B performs authentication of the information processing terminal 311 with the extracted second random number. The authentication processing unit 333B determines whether or not the second random number supplied along with the second mutual recognition command matches the second random number generated in step S316 in FIG. 29, and in the case that the two second random number values match one another, the information processing terminal 311 is authenticated. Conversely, in the case that the two second random number values do not match one another, the information processing terminal 311 is determined to be invalid, and the mutual authentication processing is ended as an error.

Upon the two second random number values matching one another, and the information processing terminal 311 being authenticated, the authentication processing unit 333B controls the communication unit 338 in step S344, to transmit the authentication results thereof as a response, and advances the processing to step S371 in FIG. 31.

In step S339, the communication unit 328 of the information processing terminal 311 obtains the response thereof, comprehends the mutual authentication, and advances the processing to step S361 in FIG. 31.

In step S361, the file access processing unit 324 of the information processing terminal 311 controls the communication unit 328 to issue a file permission command including the access license ticket (Ticket2) as to the IC card 312. At this time, the command text may be arranged so as to be encrypted with the session key. The communication unit 338 of the IC card 312 obtains the file permission command thereof in step S371.

Upon obtaining the file permission command, in step S372 the file access processing unit 334 of the IC card 312 verifies the ID of the user of the tickets described in the access license ticket (Ticket2). The information processing terminal 311 (ID2) has already been authenticated, so the file access processing unit 334 verifies whether or not the user ID described in the access license ticket (Ticket2) matches the already-authenticated ID herein, and only in the case that the IDs match one other is the use of the access license ticket (Ticket2) authenticated. In the case that the user ID of the access license ticket (Ticket2) does not match the already-authenticated ID, the file access processing unit 334 force-quits the access control processing herein, and denies the access license request.

Note that an arrangement may be made wherein, regardless of the already-authenticated ID, a special ID to license the user of the access control ticket (almighty ID) is provided. For example, a predetermined ID can be set as the almighty ID, and in the case that the ID of the user of the access license ticket is the almighty ID, the file access processing unit 334 of the ID card 312 only has to authenticate the user, regardless of whether or not the ID matches the already-authenticated ID. That is to say, the almighty ID is described as the ID of the user, whereby the access control ticket becomes a ticket that can be used with any information processing terminal 311.

Upon authenticating the user of the access control ticket (Ticket2), in step S373 the file access processing unit 334 confirms whether or not the access code described in the access control ticket (Ticket2) is of the already-authenticated directory as an access destination of the information processing terminal 311 with the mutual authentication processing. In the case that an access code for a directory other than the directory specified at the time of mutual authentication is included (i.e. in the case that access to a directory other than the directory specified at the time of mutual authentication is requested), the file access processing unit 334 force-quits the access control processing, and denies the access license request.

In the case that the access code described in the access control ticket (Ticket2) is of the already-authenticated directory as an access destination of the information processing terminal 311 with the mutual authentication processing, the file access processing unit 334 continues access control processing. Note that in the case that the access code for the already-authenticated directory and an access code for a directory not yet authenticated are both included, an arrangement may be made wherein the file access processing unit 334 force-quits the access control processing and denies the access license request, or only the access code of the directory not yet authenticated may be denied, and processing continued as to the access code for the already-authenticated directory.

Note that only the directory of the second region is verified with this processing, and the first region is not verified. Also, the processing in step S373 may be omitted.

In step S374, the file access processing unit 334 encrypts the third data ($K_{System2}$) with the root key ($K_{Root}$) and generates the fourth data (System Data).

Also, data differing from the first data is used here, but the first data may be used. Note that the fourth data may be calculated beforehand and stored in the storage unit 331. In such a case, the processing in step S374 is omitted.

In step S375, the access license ticket generating key generating unit 342 of the file access processing unit 334 performs processing to create the access license ticket generating key to compute the check digit (MAC) of the access license ticket from the fourth data.

At this time, the access license ticket generating key generating unit 342 generates the access license ticket generating key using not only the access control key corresponding to the access code described in the access control ticket (Ticket2), but also using the area key (AK1) and service key (SK1-2) relating to the access destination (File 1) of the first region.

Figure 32:
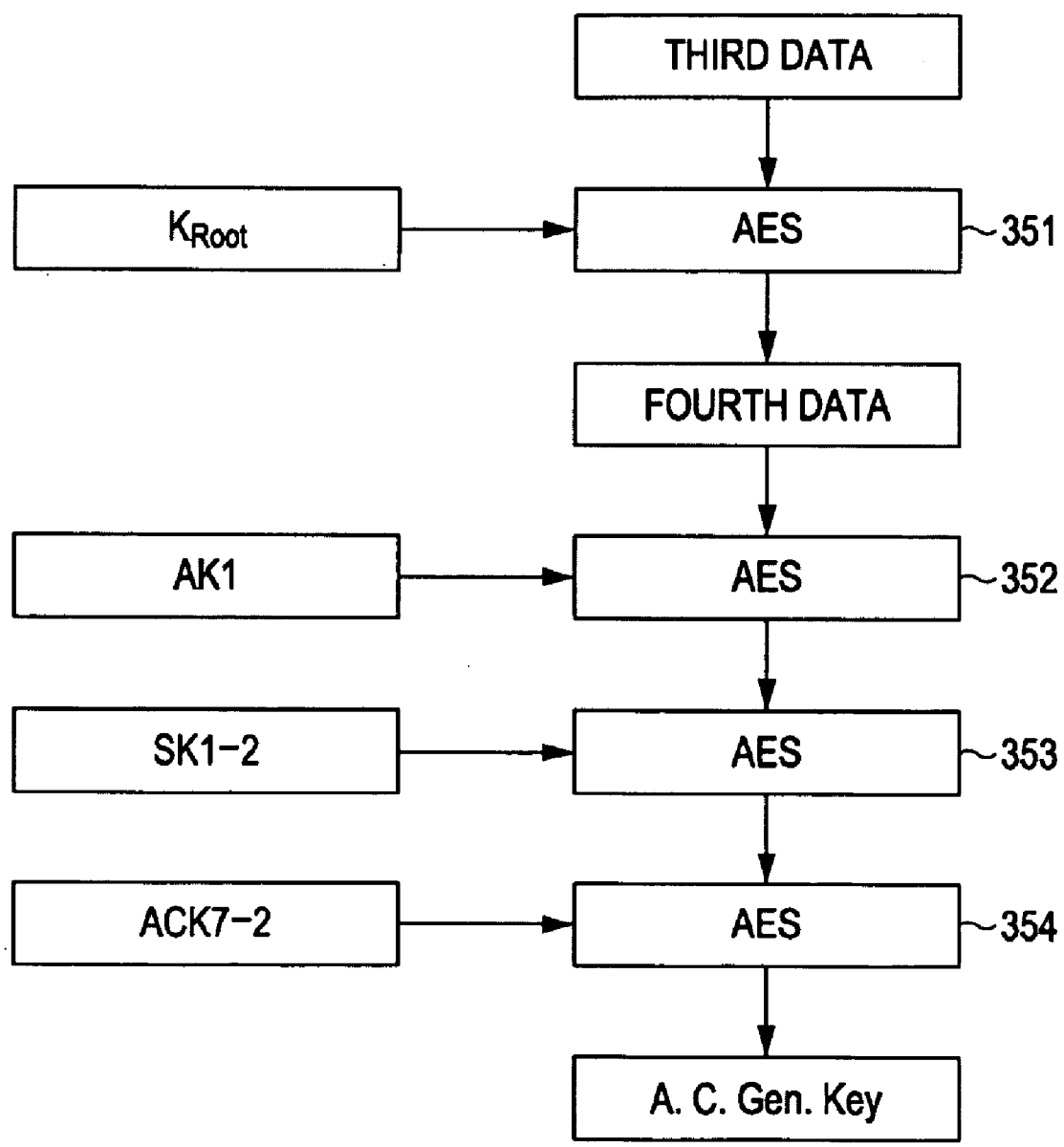
FIG. 32 is a functional block diagram illustrating another configuration example of details of access license ticket generating key generating unit.

That is to say, the access license ticket generating key generating unit 342 obtains the third data ($K_{System2}$), $K_{Root}$, AK1, SK1-2, and ACK7-2 from the storage unit 331-1 with the processing in steps S374 and S375, and as shown in FIG. 32 degenerates these keys. In FIG. 32, the access license ticket generating key generating unit 342 has a function block of an encrypting processing unit (AES) 351 through encrypting processing unit (AES) 354. The encrypting processing unit (AES) 351 controls the encrypting unit 336 to encrypt the third data ($K_{System2}$) with the AES method using the root key ($K_{Root}$), and generates the fourth data (System Data) (step S374). The encrypting processing unit (AES) 352 controls the encrypting unit 336 to encrypt the fourth data (System Data) with the AES method using the area key AK1. The encrypting processing unit (AES) 353 controls the encrypting unit 336 to encrypt the encryption results from the encrypting processing unit (AES) 352 with the AES method, using a service key SK1-2. Further, the encrypting processing unit (AES) 354 controls the encrypting unit 336 to encrypt the encryption results from the encrypting processing unit (AES) 353 with the AES method, using ACK7-2, and generates an access license ticket generating key (A.C.Gen.Key). Note that with the encrypting processing units (AES) 351 through 354, instead of AES, another common key encrypting method may be used, such as DES or the like. Note that another method of access license ticket generating key generating processing will be described later (see FIG. 33).

Upon the access license ticket generating key being generated, in step S376 the access processing unit 334 calculates the check digit (MAC value) of the access license ticket using the access license ticket generating key (e.g. using CBC mode or the like as an encryption usage mode).

In step S377, the file access processing unit 334 compares the value of the generated check digit with the value of the check digit of the access license ticket (Ticket2), and verifies the access license ticket (Ticket2). In the case that the value of the generated check digit does not match the value of the check digit described in the access license ticket (Ticket2), the file access processing unit 334 determines that the license ticket (Ticket2) is invalid (tampered), force-quits the access control processing, and denies the access license request. In the case that the values match, the file access processing unit 334 determines that the license ticket (Ticket2) is valid, and performs authentication.

The file access processing unit 334 permits access to the file according to the access license ticket (Ticket2), and in step S378 supplies a response with a notification to that effect to the information processing terminal 311 of the request source. That is to say, the file access processing unit 334 licenses Read/Write as to File 1 and the reduction processing as to the File 7.

The communication unit 328 of the information processing terminal 311 obtains the responses thereof in step S362. The file access processing unit 324 accesses the file in accordance with the access method for which an access license is obtained. For example, the information processing terminal 311 issues a writing command, and performs processing to reduce $xxx from File 7 and to add $xxx to File 1. Of these, in the case that processing is not completed on one side, the command results are all invalid. Note that so that writing commands can all be processed at once as to multiple files, it is desirable to have transmitted all argument data to be used.

By performing the authentication processing and file access control processing, even if in a case that the managing method accesses multiple regions that are mutually different, the information processing terminal 311 can perform rewriting processing while retaining data consistency.

Note that with the present description, the system key and master area key are not used, but there is no change to the key managing the first region, whereby in the event of creating an access license ticket creating key, this key may also be included (i.e. used similar to AK1 and SK1-2). Also, it is assumed that SK and ACK have different key bit sizes. Also, there is a possibility that the encryption algorithms may be different. Thus, the key size is set to match the longer key and appropriate fixed data is added to the short key so that the bit number becomes the same as the long key. A strong encryption algorithm is used here. Since the access control and authentication processing is only checking whether valid keys are being held, so changes from a weak encryption algorithm to a strong encryption algorithm itself is not a problem.

Also, as described above, in the case of simultaneously accessing regions managing two methods (first region and second region), not only the directory of the second region but also an area of the first region may be specified as the access destination. That is to say, in this case, in the processing in step S302 in FIG. 29 the information processing terminal 311 treats the area of the first region to be similar to the directory of the second region, and specifies the area of the first region also with the transmitted access destination directory information.

The authentication processing unit 333B of the IC card 312 uses the area key (AK1) of the area of the first region specified at the access destination, for the generating of the authentication key. That is to say, the authentication processing unit 333B controls the encrypting unit 336 to encrypt the key (K2) unique to the information processing terminal 311 using the area key (AK1) of the access destination area, and further, the encryption results thereof are encrypted using the application key (AppK1) of the access destination directory (directory 1), and the authentication key ($K_{Auth}$) is generated.

Similarly, the authentication processing unit 323 of the information processing terminal 311 controls the encrypting unit 326 in step S333 to encrypt the key (K2) unique to the information processing terminal 311, using the area key (AK1) of the access destination area, and further encrypts the encryption result thereof by employing the application key (AppK1) of the access destination directory (directory 1) to generate the authentication key ($K_{Auth}$).

The information processing terminal 311 and IC card 312 use the authentication keys here to perform mutual authentication as described above. Thus, the area of the first region can also be authenticated as an access destination similar to the case of the second region.

Note that in the case of authenticating the area of the first region as an access destination, the use of the area key can be omitted in the event of generating an access license ticket. That is to say, in step S375 in FIG. 31 the access license ticket generating key generating unit 342 uses the access control key corresponding to the access code described in the access control ticket (Ticket2) and the service key (SK1-2) relating to the access destination (File1) of the first region (degenerates each key as described above) and generates the access license ticket generating key.

Figure 33:
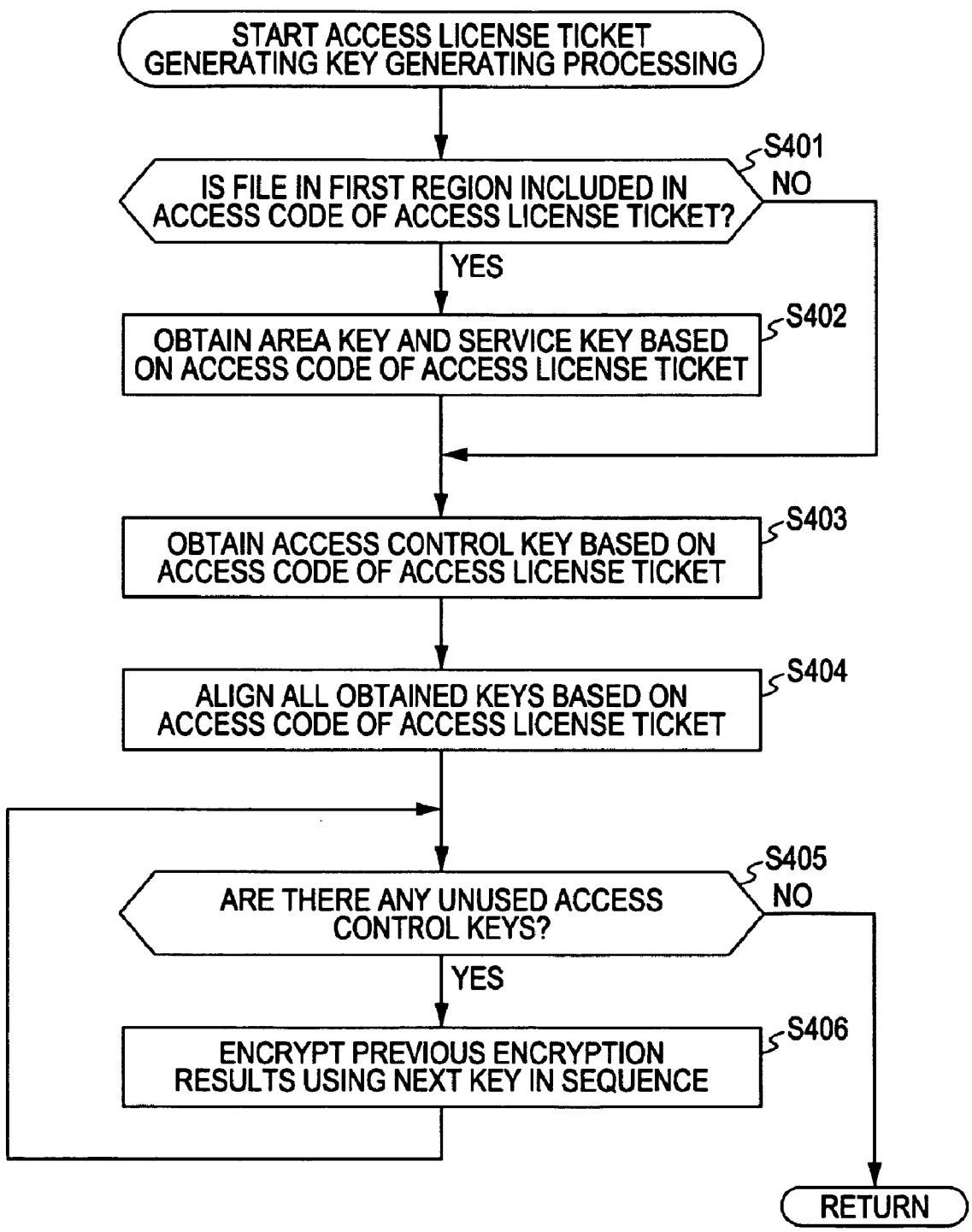
FIG. 33 is a flowchart to describe another example of flow of access license ticket generating key generating processing.

Next, an example of flow of the access license ticket generating key generating processing executed in step S375 of FIG. 31 will be described with reference to the flowchart in FIG. 33. Note that hereafter, a case of executing with the IC card 312 is described, but the descriptions hereafter are also applicable to cases of executing with other IC cards 312.

Upon the access license ticket generating key generating processing being started, in step S401 the access license ticket generating key generating unit 342 references a list of access codes described in the access license ticket (Ticket2), and determines whether or not a file of the first region is included in the access codes.

In the case determination is made that the file of the first region is included in the access codes indicating the access destination, the access license ticket generating key generating unit 342 advances the processing to step S402, and based on the access code of the access license ticket (Ticket2), obtains all of the area keys and service keys of the access destination. Upon the processing in step S402 ending, the access license ticket generating key generating unit 342 advances the processing to step S403. Also, in step S401, in the case determination is made that the file of the first region is not included in the access codes, the access license ticket generating key generating unit 342 omits the processing in step S402 and advances the processing to step S403.

In step S403, the access license ticket generating key generating unit 342 references the list of access codes described in the access license ticket (Ticket2), and obtains the access control keys corresponding to the access codes included in the list thereof from the storage unit 331.

Upon obtaining the access control keys, in step S404 the access license ticket generating key generating unit 342 arrays the obtained access control keys in the same sequence as the list of access codes described in the access license ticket (Ticket2). Note that in the case that the file of the first region is included in the access codes showing the access destination, the area key and service key are also arrayed.

In step S405, the access license ticket generating key generating unit 342 determines whether or not any unused keys exist in the obtained various types of keys, and in the case determination is made that an unused key exists, the processing is advanced to step S406, the encrypting unit 366 is controlled to further encrypt the encryption results of the previous time using the access control key next in sequence. Note that in the case of encrypting the first time, the access license ticket generating key generating unit 342 controls the encrypting unit 336 to encrypt the fourth data (System Data) with the initial key. Upon the encrypting ending, the access license ticket generating key generating unit 342 returns the processing to step S405. That is to say, by repeating steps S405 and S406, the access license ticket generating key generating unit 342 degenerates all of the obtained access control keys, area keys and service keys in the array sequence thereof, and generates an access license ticket generating key.

In the case determination is made in step S405 that there are no unused keys, the access license ticket generating key generating unit 342 ends the access license ticket generating key generating processing, returns the processing to step S375 in FIG. 31, and executes the processing thereafter.

Thus, by degenerating the access control key and generating the access license ticket generating key, even if in a case that the managing method accesses multiple regions that are mutually different, the file access processing unit 334 can perform verification of the access control ticket (Ticket2) accurately and at high speed. That is to say, validation verification can be performed by processing only one time, with multiple keys as to the access license ticket regulated with multiple file access methods, thereby preventing a decrease in security level, suppressing the increase in processing, and enabling verification at a high speed.

By thus performing the authentication processing and file access control, the information processing terminal 311 can assure data consistency, even in a case of two or more data regions having different managing methods, in the event of crossing over to access data and perform rewriting and updating.

Note that the width of the communicable range for the communication between the information processing terminal and IC card described above is arbitrary, and for example, this range may be several meters or more, or may be less than several centimeters. Also, the communication method is also arbitrary, and cable communication may be used instead of wireless communication. In this case, the IC card is a so-called contact-type IC card, and instead of a loop antenna, and external connection terminal for electrically connecting mutually is provided on the information processing terminal and IC card.

Also, the IC card and information processing terminal are described as examples of devices of the communication system, but any mutually communicable device may be used. For example, an IC card may be in the shape of a stamp, for example, or may be in the shape of a dollar coin, and does not have to be a card-shaped device. Also, the IC card may be a portable telephone, music player, digital camera, notebook-type personal computer, or PDA (Personal Digital Assistant) that has an IC card function mounted thereon. Further, a desk-top type personal computer may be used, as the IC card does not have to be a portable type device. Also, the IC card may be an item that a user (person) carries, or may be an item built into a device or the like, and used for moving processing of the device thereof.

Similarly, the information processing terminal also has the above-described functions, and any type of device may be used so long as the device can communicate with the IC card. For example, a reader/writer built into an automatic turn stile, vending machine, institution doors, and the like, or may be a card access port built into a notebook-type personal computer, PDA, desktop type personal computer with a simple reader/writer with a USB (Universal Serial Bus) connection, or may be a portable telephone or the like having a reader/writer mounted therein.

The above-described series of processing can be executed with hardware, or can be executed with software. In this case, for example, a configuration may be made as a personal computer as shown in FIG. 34, for example.

In FIG. 34, the CPU 401 of the personal computer 400 executes various types of processing according to a program stored in a ROM (Read Only Memory) 402, or a program loaded from a storage unit 413 to a RAM (Random Access Memory) 403. The RAM 403 has data to be used and the like stored therein as appropriate for the CPU 401 to execute various types of processing. The CPU 401, ROM 402, and RAM 403 are mutually connected via a bus 404. This bus 404 is also connected to an input/output interface 410.

The input/output interface 410 is connected to an input unit 411 made up of a keyboard, mouse, and the like, an output unit 412 made up of a display made of a CRT (Cathode Ray Tube) or LCD (Liquid Crystal Display) and a speaker and the like, a storage unit 413 made up of a hard disk or the like, and a communication unit 414 made up of a modem or the like. The communication unit 414 performs communication processing via the network including the Internet.

A drive 415 is connected as appropriate to the input/output interface 410, whereby removable media such as a magnetic disk, optical disc, magneto-optical disk, or semiconductor memory or the like is mounted as appropriate, and a computer program read therefrom is installed as appropriate in the storage unit 413.

In the case that the series of processing described above is executed with software, a program making up such software is installed from a network or a recording medium.

The recording medium may be configured, not only of a removable media 121 made up of a magnetic disk (including flexible disk), optical disc (including CD-ROM (Compact Disk-Read only Memory) and DVD (Digital Versatile Disk)), magneto-optical disk (including MD (Mini Disc)), or semiconductor memory, wherein a program is recorded, such removable media 121 being distributed in order to distribute the program to the user as a separate device from the main unit of an apparatus, but also as the ROM 402 or a hard disk included in the storage unit 413 wherein the program is recorded, the program being distributed in a state of being built into the main unit of an apparatus.

Note that with the present Specification, the steps describing the program recorded in the recording medium include the processing performed in a time-series manger along the described sequence, which goes without saying, but also includes processing that is not necessarily in a time-series manner but in a parallel manner or individually.

Also, with the present Specification, the term "system" represents the entirety of equipment made up of multiple devices.

Note that the configuration described above as one apparatus can be divided, and configured into multiple devices.

Conversely, the configuration described as multiple devices may be integrated and configured as one apparatus. Also, it goes without saying that configurations other than the configuration of the various devices described above may be added. Further, a part of a certain device configuration may be included in the configuration of another device, as long as the configuration and operations as an entire system are substantially the same. That is to say, the embodiments of the present invention are not limited to the above-described embodiments, and various modifications may be made within the scope and essence of the present invention.

The present application contains subject matter related to that disclosed in Japanese Priority Patent Application JP 2008-105023 filed in the Japan Patent Office on Apr. 14, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device regarding which access as to data held by the information processing device itself, in a plurality of regions wherein information managing methods mutually differ, is requested from another information processing device, said information processing device comprising:

authenticating means to perform authenticating processing of said other information processing device by an information managing method of said plurality of regions, with regard to an access destination as to a predetermined region within said plurality of regions, out of access destinations of said other information processing device;

receiving means to receive an access license ticket including an access code indicating data for said other information processing device to access and a check digit, from said other information processing device that is authenticated by said authenticating means as a valid partner;

access license ticket generating key generating means to generate an access license ticket generating key, which is key information for computing a check digit, using predetermined data held beforehand in said predetermined region, a root key that is key information corresponding to a root directory of said predetermined region, wherein the root key is used to encrypt data within said predetermined region, an access control key that is key information to control an access method to data within said predetermined region, corresponding to an access code described in said access license ticket received by said receiving means, other key information, used for authentication processing with the information managing method of said predetermined region, which is key information to manage data of a region other than said predetermined region, corresponding to an access code described in said access license ticket received by said receiving means, an area key that is key information corresponding to said predetermined region, wherein the area key is used to encrypt data within said predetermined region, and a service key to control the access method of data within the access destination, wherein the service key is used to authenticate data access to the predetermined region; and check digit computing means to compute a check digit corresponding to the access code described in said access license ticket received by said receiving means, using said access license ticket generating key generated with said access license ticket generating key generating means; and access license ticket validating means to validate said access license ticket received by said receiving means, using said check digit computed by said check digit computing means.

2. The information processing device according to claim 1, wherein said access license ticket generating key generating means organizes said key information such that, in the case that key bit length is different between said access control key and said service key, the shorter of said key bit length is made to match the longer of said key bit length.

3. The information processing device according to claim 1, wherein said access license ticket generating key generating means encrypt said predetermined data with said root key, and further encrypts the encryption results with other key information, and further encrypts the encryption results thereof, each with an access control key, thereby degenerating the key information and generating said access license ticket generating key.

4. An information processing method of an information processing device regarding which access as to data held by the information processing device itself, in a plurality of regions wherein information managing methods mutually differ, is requested from another information processing device, said information processing device comprising the steps of:

performing authenticating processing of said other information processing device by an information managing method of said plurality of regions, with regard to an access destination as to a predetermined region within said plurality of regions, out of access destinations of said other information processing device;

receiving an access license ticket including an access code indicating data for said other information processing device to access and a check digit, from said other information processing device that is authenticated as a valid partner;

generating an access license ticket generating key to generate an access license ticket generating key, which is key information for computing a check digit, using predetermined data held beforehand in said predetermined region, a root key that is key information corresponding to a root directory of said predetermined region, wherein the root key is used to encrypt data within said predetermined region, an access control key that is key information to control an access method to data within said predetermined region, corresponding to an access code described in said received access license ticket, other key information used for authentication processing with the information managing method of said region, which is key information to manage data of a region other than said predetermined region, corresponding to an access code described in said received access license ticket, an area key that is key information corresponding to said predetermined region, wherein the area key is used to encrypt data within said predetermined region, and a service key to control the access method of data within the access destination, wherein the service key is used to authenticate data access to the predetermined region; and computing a check digit corresponding to the access code described in said access license ticket, using said generated access license ticket generating key; and validating said access license ticket, using said computed check digit.

5. A non-transitory recording medium wherein a computer-readable program is recorded, such program to control an information processing device regarding which access as to data held by the information processing device itself, in a plurality of regions wherein information managing methods mutually differ, is requested from another information processing device, said program comprising the steps of:

performing authenticating processing of said other information processing device by an information managing method of said plurality of regions, with regard to an access destination as to a predetermined region within said plurality of regions, out of access destinations of said other information processing device;

receiving an access license ticket including an access code indicating data for said other information processing device to access and a check digit, from said other information processing device that is authenticated as a valid partner;

generating an access license ticket generating key, which is key information for computing a check digit, using predetermined data held beforehand in said predetermined region, a root key that is key information corresponding to a root directory of said predetermined region, wherein the root key is used to encrypt data within said predetermined region, an access control key that is key information to control an access method to data within said predetermined region, corresponding to an access code described in said received access license ticket, other key information used for authentication processing with the information managing method of said region, which is key information to manage data of a region other than said predetermined region, corresponding to an access code described in said received access license ticket, an area key that is key information corresponding to said predetermined region, wherein the area key is used to encrypt data within said predetermined region, and a service key to control the access method of data within the access destination, wherein the service key is used to authenticate data access to the predetermined region; and computing a check digit corresponding to the access code described in said access license ticket, using said generated access license ticket generating key; and validating said access license ticket, using said computed check digit.

6. An information processing system in which a first information processing device requests access as to data held by a second information processing device, in a plurality of regions wherein information managing methods mutually differ;

said first information processing device including first mutual authenticating means to perform mutual authentication processing with said second information processing device; and transmitting means to transmit an access license ticket including an access code indicating the data to access, and a check digit, to said second information processing device;

and said second information processing device including authenticating means to perform authenticating processing of said first information processing device by an information managing method of said plurality of regions, with regard to an access destination as to a predetermined region within said plurality of regions, out of access destinations of said first information processing device;

receiving means to receive an access license ticket, from said first information processing device that is authenticated by said authenticating means as a valid partner;

access license ticket generating key generating means to generate an access license ticket generating key, which is key information for computing a check digit, using predetermined data held beforehand in said predetermined region, a root key that is key information corresponding to a root directory of said predetermined region, wherein the root key is used to encrypt data within said predetermined region, an access control key that is key information to control an access method to data within said predetermined region, corresponding to an access code described in said access license ticket received by said receiving means, other key information, used for authentication processing with the information managing method of said region, which is key information to manage data of a region other than said predetermined region, corresponding to an access code described in said access license ticket received by said receiving means, an area key that is key information corresponding to said predetermined region, wherein the area key is used to encrypt data within said predetermined region, and a service key to control the access method of data within the access destination, wherein the service key is used to authenticate data access to the predetermined region; and check digit computing means to compute a check digit corresponding to the access code described in said access license ticket received by said receiving means, using said access license ticket generating key generated with said access license ticket generating key generating means; and access license ticket validating means to validate said access license ticket received by said receiving means, using said check digit computed by said check digit computing means.

7. An information processing device regarding which access as to data held by the information processing device itself, in a plurality of regions wherein information managing methods mutually differ, is requested from another information processing device, said information processing device comprising:

an authenticating unit to perform authenticating processing of said other information processing device by an information managing method of said plurality of regions, with regard to an access destination as to a predetermined region within said plurality of regions, out of access destinations of said other information processing device;

a receiving unit to receive an access license ticket including an access code indicating data for said other information processing device to access and a check digit, from said other information processing device that is authenticated by said authenticating unit as a valid partner;

an access license ticket generating key generating unit to generate an access license ticket generating key, which is key information for computing a check digit, using
predetermined data held beforehand in said predetermined region,
a root key that is key information corresponding to a root directory of said predetermined region, wherein the root key is used to encrypt data within said predetermined region,
an access control key that is key information to control an access method to data within said predetermined region, corresponding to an access code described in said access license ticket received by said receiving unit,
other key information, used for authentication processing with the information managing method of said region, which is key information to manage data of a region other than said predetermined region, corresponding to an access code described in said access license ticket received by said receiving unit,
an area key that is key information corresponding to said predetermined region, wherein the area key is used to encrypt data within said predetermined region, and
a service key to control the access method of data within the access destination, wherein the service key is used to authenticate data access to the predetermined region; and a check digit computing unit to compute a check digit corresponding to the access code described in said access license ticket received by said receiving unit, using said access license ticket generating key generated with said access license ticket generating key generating unit; and an access license ticket validating unit to validate said access license ticket received by said receiving unit, using said check digit computed by said check digit computing unit.

8. An information processing system in which a first information processing device requests access as to data held by a second information processing device, in a plurality of regions wherein information managing methods mutually differ;

said first information processing device including
a first mutual authenticating unit to perform mutual authentication processing with said second information processing device; and
a transmitting unit to transmit an access license ticket including an access code indicating the data to access, and a check digit, to said second information processing device;

and said second information processing device including
an authenticating unit to perform authenticating processing of said first information processing device by an information managing method of said plurality of regions, with regard to an access destination as to a predetermined region within said plurality of regions, out of access destinations of said first information processing device;
a receiving unit to receive an access license ticket, from said first information processing device that is authenticated by said authenticating unit as a valid partner;
an access license ticket generating key generating unit to generate an access license ticket generating key, which is key information for computing a check digit, using
predetermined data held beforehand in said predetermined region,
a root key that is key information corresponding to a root directory of said predetermined region, wherein the root key is used to encrypt data within said predetermined region,
an access control key that is key information to control an access method to data within said predetermined region, corresponding to an access code described in said access license ticket received by said receiving unit,
other key information, used for authentication processing with the information managing method of said region, which is key information to manage data of a region other than said predetermined region, corresponding to an access code described in said access license ticket received by said receiving unit,
an area key that is key information corresponding to said predetermined region, wherein the area key is used to encrypt data within said predetermined region, and
a service key to control the access method of data within the access destination, wherein the service key is used to authenticate data access to the predetermined region; and
a check digit computing unit to compute a check digit corresponding to the access code described in said access license ticket received by said receiving unit, using said access license ticket generating key generated with said access license ticket generating key generating unit; and
an access license ticket validating unit to validate said access license ticket received by said receiving unit, using said check digit computed by said check digit computing unit.

* * * * *